(12) United States Patent
Singh

(10) Patent No.: US 12,051,517 B2
(45) Date of Patent: Jul. 30, 2024

(54) NUCLEAR WASTE STORAGE CANISTERS AND METHOD OF FABRICATING THE SAME

(71) Applicant: Holtec International, Camden, NJ (US)

(72) Inventor: Krishna P. Singh, Jupiter, FL (US)

(73) Assignee: Holtec International

( * ) Notice: Subject to any disclaimer, the term of this patent is extended or adjusted under 35 U.S.C. 154(b) by 0 days.

(21) Appl. No.: 17/977,342

(22) Filed: Oct. 31, 2022

(65) Prior Publication Data

US 2023/0110615 A1 Apr. 13, 2023
US 2024/0013944 A9 Jan. 11, 2024

Related U.S. Application Data

(63) Continuation of application No. 17/073,939, filed on Oct. 19, 2020, now Pat. No. 11,515,056, which is a
(Continued)

(51) Int. Cl.
*B23K 5/00* (2006.01)
*B23K 5/02* (2006.01)
(Continued)

(52) U.S. Cl.
CPC ............. *G21F 5/12* (2013.01); *B23K 5/02* (2013.01); *G21F 5/005* (2013.01); *G21F 5/10* (2013.01);
(Continued)

(58) Field of Classification Search
CPC ..... B23K 9/028; B23K 2101/12; G21F 5/008; G21F 5/005; G21F 5/015
See application file for complete search history.

(56) References Cited

U.S. PATENT DOCUMENTS 2,222,621 A 11/1940 Vsevolod
2,287,198 A 6/1942 Sandberg
(Continued)

FOREIGN PATENT DOCUMENTS

CN 201698778 1/2011
CN 104272398 1/2015
(Continued)

OTHER PUBLICATIONS

A. Machiels (EPRI Project Manager), "Effects of Marine Environments on Stress Corrosion Cracking of Austenitic Stainless Steels", Sep. 2005, Electric Power Research Institute (EPRI), Inc., www.epri.com, 3420 Hillview Avenue, Palo Alto, California 94304-1395.
(Continued)

*Primary Examiner* — Erin B Saad
(74) *Attorney, Agent, or Firm* — The Belles Group, P.C.

(57) ABSTRACT

A dry storage systems for radioactive nuclear waste materials may include a double-walled canister system. The canister system may include a canister having a tubular inner shell defining an internal cavity for storing nuclear waste material, a first lid sealably welded to a first end of the inner shell, a primary base plate defining a peripheral edge portion and having an annular closure flange, and an annular full thickness butt weld formed at an abutment joint between the annular closure flange and a second end of the inner shell. The inner shell, first lid, and first end closure may collectively define a sealed primary pressure retention barrier. A tubular outer shell may adjoin the inner shell. The outer shell may be welded to the canister to form a hermetically sealed secondary pressure retention barrier.

14 Claims, 41 Drawing Sheets

Related U.S. Application Data continuation-in-part of application No. 16/695,450, filed on Nov. 26, 2019, now Pat. No. 11,289,227, and a continuation-in-part of application No. 15/294,896, filed on Oct. 17, 2016, now Pat. No. 10,872,707, and a continuation-in-part of application No. 15/709,098, filed on Sep. 19, 2017, now Pat. No. 11,250,962, and a continuation-in-part of application No. 16/116,994, filed on Aug. 30, 2018, now abandoned.

(60) Provisional application No. 62/772,986, filed on Nov. 29, 2018, provisional application No. 62/242,458, filed on Oct. 16, 2015, provisional application No. 62/396,565, filed on Sep. 19, 2016, provisional application No. 62/551,914, filed on Aug. 30, 2017.

(51) Int. Cl.
| | |
|---|---|
| *G21F 5/00* | (2006.01) |
| *G21F 5/005* | (2006.01) |
| *G21F 5/10* | (2006.01) |
| *G21F 5/12* | (2006.01) |
| *G21F 9/34* | (2006.01) |
| *G21F 5/012* | (2006.01) |
| *G21F 9/36* | (2006.01) |

(52) U.S. Cl.
CPC ............... *G21F 9/34* (2013.01); *G21F 5/012* (2013.01); *G21F 9/36* (2013.01)

(56) References Cited

U.S. PATENT DOCUMENTS

| | | | |
|---|---|---|---|
| 2,329,410 | A | 9/1943 | Morrison |
| 2,618,572 | A | 11/1952 | Parrish |
| 3,425,308 | A | 2/1969 | Krainer et al. |
| 3,425,380 | A | 2/1969 | Krainer et al. |
| 4,274,007 | A | 6/1981 | Baatz et al. |
| 4,447,729 | A | 5/1984 | Doroszlai et al. |
| 4,818,878 | A | 4/1989 | Popp et al. |
| 5,061,858 | A | 10/1991 | Mallory |
| 5,102,615 | A | 4/1992 | Grande et al. |
| 5,274,682 | A | 12/1993 | McDaniels, Jr. |
| 5,546,436 | A | 8/1996 | Jones et al. |
| 5,670,072 | A | 9/1997 | Offer et al. |
| 5,852,643 | A | 12/1998 | Copson |
| 5,898,747 | A | 4/1999 | Singh |
| 6,064,710 | A | 5/2000 | Singh |
| 6,064,711 | A | 5/2000 | Copson |
| 6,238,187 | B1 | 5/2001 | Dulaney et al. |
| 6,467,321 | B2 | 10/2002 | Prokopenko et al. |
| 6,949,005 | B1 * | 9/2005 | Larsen .................... B24B 5/047 451/259 |
| 7,743,962 | B2 | 6/2010 | Cocq et al. |
| 7,786,456 | B2 * | 8/2010 | Singh ....................... G21F 5/005 250/507.1 |
| 7,994,380 | B2 * | 8/2011 | Singh ....................... G21F 5/005 588/1 |
| 8,067,659 | B2 * | 11/2011 | Singh ....................... G21F 5/10 588/1 |
| 8,135,107 | B2 | 3/2012 | Singh et al. |
| 8,415,521 | B2 * | 4/2013 | Singh ....................... G21F 5/10 588/259 |
| 10,008,299 | B2 | 6/2018 | Wellwood et al. |
| 2002/0014100 | A1 | 2/2002 | Prokopenko et al. |
| 2003/0024918 | A1 | 2/2003 | Offer et al. |
| 2004/0109523 | A1 | 6/2004 | Singh et al. |
| 2004/0125906 | A1 | 7/2004 | Gluschke et al. |
| 2005/0220257 | A1 * | 10/2005 | Singh ....................... G21F 5/10 376/272 |
| 2005/0224729 | A1 | 10/2005 | Tamaki |
| 2005/0286674 | A1 | 12/2005 | Fischer et al. |
| 2006/0006158 | A1 | 1/2006 | Lawrence et al. |
| 2006/0171500 | A1 * | 8/2006 | Pennington ............... G21F 5/12 376/272 |
| 2007/0003000 | A1 * | 1/2007 | Singh ....................... G21C 19/32 376/272 |
| 2007/0138234 | A1 | 6/2007 | Waskey et al. |
| 2008/0069291 | A1 | 3/2008 | Singh et al. |
| 2009/0069621 | A1 * | 3/2009 | Singh ....................... G21F 5/005 588/16 |
| 2009/0198092 | A1 * | 8/2009 | Singh ....................... G21F 5/10 588/16 |
| 2010/0133269 | A1 | 6/2010 | Moricca |
| 2010/0230854 | A1 | 9/2010 | Stengrimsen |
| 2010/0272225 | A1 | 10/2010 | Singh |
| 2011/0014353 | A1 | 1/2011 | Choi et al. |
| 2011/0150164 | A1 | 6/2011 | Singh et al. |
| 2012/0037632 | A1 | 2/2012 | Singh et al. |
| 2012/0142991 | A1 * | 6/2012 | Singh ....................... G21F 5/005 588/16 |
| 2014/0077105 | A1 | 3/2014 | Kawahara |
| 2014/0219408 | A1 | 8/2014 | Singh |
| 2014/0263073 | A1 | 9/2014 | Barker |
| 2015/0069274 | A1 | 3/2015 | Agace |
| 2015/0243390 | A1 | 8/2015 | Bracey et al. |
| 2016/0012926 | A1 | 1/2016 | Lehnert et al. |
| 2016/0375518 | A1 | 12/2016 | Revel-Muroz et al. |
| 2017/0110210 | A1 | 4/2017 | Singh |
| 2018/0005717 | A1 | 1/2018 | Singh et al. |
| 2018/0322970 | A1 | 11/2018 | Singh et al. |
| 2023/0136825 | A1 * | 5/2023 | Lloyd ....................... G21F 5/06 376/272 |
| 2023/0268095 | A1 * | 8/2023 | Singh ....................... G21F 5/08 250/517.1 |

FOREIGN PATENT DOCUMENTS

| | | |
|---|---|---|
| DE | 102013006792 | 10/2014 |
| JP | 2003-207592 A1 | 7/2003 |

OTHER PUBLICATIONS

Chapter 6. Weld Joints and Weld Types, Gas Arc Welding Handbook, pp. 57-68. The Goodheart-Wilcox Co. US.

Duane K. Miller, Use Double Sided Groove Welds (But Think About It First); Article: Practical Cost-Saving Ideas for the Design Professional: Welding, No. 5, Modern Steel Construction, Feb. 1998. US.

European Supplemental Search Report for related application EP 16866818.4, dated Jun. 5, 2019.

International Search Report and Written Opinion for International Application No. PCT/US19/63174 mailed on Aug. 11, 2020.

International Search Report and Written Opinion for priority application No. PCT/US2016/057273 dated Jun. 12, 2017.

Paul Denney, "Hybrid Laser Arc Welding—Has Its Time Finally Arrived?", Lincoln Electric Corporation, pp. 1-4, www.lincolnelectric.com/automated-solutions, 22221 Saint Clair Avenue, Cleveland, Ohio 44117-2522.

U.S. Nuclear Waste Technical Review Board, "Chloride-Induced Stress Corrosion Cracking Potential in Dry-Storage Canisters for Spent Nuclear Fuel", pp. 1-5, Mar. 1, 2017.

* cited by examiner

NUCLEAR WASTE STORAGE CANISTERS AND METHOD OF FABRICATING THE SAME

CROSS-REFERENCE TO RELATED APPLICATIONS

This application is continuation of U.S. patent application Ser. No. 17/073,939 filed Oct. 19, 2020.

This application is a continuation-in-part of U.S. patent application Ser. No. 16/695,450, filed Nov. 26, 2019, (now U.S. Pat. No. 11,289,227), which claims the benefit U.S. Provisional Patent Application Ser. No. 62/772,986 filed Nov. 29, 2018.

This application is also a continuation-in-part of U.S. patent application Ser. No. 15/294,896, filed Oct. 17, 2016, (now U.S. Pat. No. 10,872,707), which claims the benefit of U.S. Provisional Patent Application Ser. No. 62/242,458, filed Oct. 16, 2015.

This application is also a continuation-in-part of U.S. patent application Ser. No. 15/709,098, filed Sep. 19, 2017, (now U.S. Pat. No. 11,250,962), which claims the benefit of U.S. Provisional Patent Application Ser. No. 62/396,565, filed Sep. 19, 2016.

This application is also a continuation-in-part of U.S. patent application Ser. No. 16/116,994, filed Aug. 30, 2018, which claims the benefit of U.S. Provisional Patent Application Ser. No. 62/551,914, filed Aug. 30, 2017.

The entirety of each of the aforementioned applications is incorporated herein by reference.

BACKGROUND

In the operation of nuclear reactors, the nuclear energy source is in the form of hollow zircaloy tubes filled with enriched uranium, collectively arranged in multiple assemblages referred to as fuel assemblies. When the energy in the fuel assembly has been depleted to a certain predetermined level, the used or "spent" nuclear fuel (SNF) assemblies are removed from the nuclear reactor. It is necessary to remove these fuel assemblies from the reactor after their energy has been depleted to a predetermined level. Upon depletion and subsequent removal from the reactor, these spent nuclear fuel ("SNF") rods are still highly radioactive and produce considerable heat, requiring that great care be taken in their subsequent packaging, transporting, and storing. Specifically, the SNF emits extremely dangerous neutrons and gamma photons. It is imperative that these neutrons and gamma photons be contained at all times subsequent to removal from the reactor core.

The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a cylindrical metallic storage canister (typically stainless steel), which is often referred to as a multi-purpose canister (MPC), which forms the primary containment. The canister is then placed into an outer ventilated overpack or cask, which forms the secondary containment, for safe transport and storage of the multiple spent fuel assemblies. The ventilation utilizes ambient cooling air to dissipate the considerable heat still emitted by the spent fuel.

The used or spent nuclear fuel contained in the fuel basket inside the fuel canister is stored in an inert gas atmosphere formed within the canister. Guaranteed sequestration of heat and radiation emitting used nuclear fuel from the environment under all storage or transport conditions is an essential design requirement for the canister. This assurance of confinement requirement has been fulfilled in the present state-of-the-art by hermetically seal welding the top lid to the canister shell after the spent fuel has been loaded into the canister (typically under water such as in the spent fuel pool of a nuclear reactor). The all-welded canister provides guaranteed confinement of the contents, but makes the stored fuel difficult-to-access if repackaging is required at a later date. While lid cutting tools to sever the lid from the canister shell have been successfully developed and demonstrated, the cutting operation is inherently dose-accretive, cumbersome, and time-consuming requiring metal chip and lubricant management during the process.

In defueling a nuclear reactor, the SNF may be removed from the reactor and placed under water, in what is generally known as a spent fuel pool or pond storage. The pool water facilitates cooling of the SNF and provides adequate radiation shielding. The SNF is stored in the pool for a period of time that allows the heat and radiation to decay to a sufficiently low level so that the SNF can be transported with safety. However, because of safety, space, and economic concerns, use of the pool alone is not satisfactory where the SNF needs to be stored for any considerable length of time. Thus, when long-term storage of SNF is required, it is standard practice in the nuclear industry to store the SNF in a dry state subsequent to a brief storage period in the spent fuel pool. Dry storage of SNF typically comprises storing the SNF in a dry inert gas atmosphere encased within a structure that provides adequate radiation shielding.

Maintaining confinement of radioactive material contents such as SNFs or other contaminated waste materials is a principal function of welded canisters used heretofore. One such canister, known as a multi-purpose canister ("MPC"), is described in U.S. Pat. No. 5,898,747, to Krishna P. Singh, issued Apr. 27, 1999, the entirety of which is hereby incorporated by reference. Typically, the SNF is loaded into an open canister that is submerged under water in a fuel pool. Once loaded with SNF, the canister is removed from the pool, placed in a staging area, dewatered, evacuated, dried, hermetically sealed, and transported to a long-term storage facility. The canister typically contains an internal basket comprising an array of cells for storing and supporting a plurality of SNF rods positioned within the cavity of the canister (see, e.g. U.S. Pat. No. 5,898,747).

In its standard form, the confinement boundary of the canister consists of a thick base plate welded to a relatively thin walled cylindrical shell. A thick walled top lid is typically welded to the top extremity of the shell after the used fuel is loaded in the canister leading to an all-welded confinement boundary. Thus, the so-called "high level waste," which includes used nuclear fuel, is confined in a space enclosed by a cylindrical canister consisting of a relatively thin wall shell welded to a thick baseplate and a thick top lid welded to its lower and upper extremity, respectively (see, e.g. FIG. 26A). The bottom and top enclosures are plate-type structures that must be sufficiently thick to withstand the design pressure applicable to the canister's role as a pressure vessel for forming an appropriate pressure retention boundary. The base plate and the top lid are typically in the range of about 3 to 9 inches thick, respectively (the top lid is usually much thicker than the base plate to limit the radiation dose to the lid welding crew).

Sometimes, a narrow annular top closure ring is welded to the canister lid to protect vent and drain ports, as illustrated for example in FIG. 26B.

The welded canisters are generally stored inside ventilated outer modules called "casks" or "overpacks" which come in two known storage system variations: horizontal storage systems in which the canisters are stored horizontally (see, e.g. FIG. 27A) and vertical storage systems in which the canisters are stored vertically (see, e.g. FIG. 27B). The material of construction that is almost universally used in the nuclear waste material storage inner canister is classically austenitic stainless steel or one of its more recent adaptations known as Duplex stainless steel. Stainless steel is remarkably resistant to all types of corrosion except stress corrosion cracking (SCC), whose occurrence requires three parameters to be simultaneously present, namely a tensile stress field in the surface exposed to the environment, an adequate concentration of halides, and all accompanied by a high relative humidity in the ambient air. An adequate halide concentration level is typically present at storage facilities located at seasides which help trigger SCC. The threshold humidity level, typically considered to be 20%, is also present at coastal sites. Because the used fuel packaged in a canister is heat emitting (as much as 50 kilowatts, in some cases), most of the surface of the canister is heated which results in a concomitant reduction in the humidity of the air in contact with the external surface of the canister (as the air heats up, its relative humidity decreases). Thus, the portion of the canister surface vulnerable to SCC is the shell (the top and bottom plates are thick and therefore have a far larger reserve against thru-wall crack propagation). More specifically, the most vulnerable portion of the shell is the region that is not sufficiently hot and hence in contact with humid air. In vertical canisters, the bottom region or portion where the coldest air hits the canister in the ventilated cask/overpacks is most vulnerable to SCC.

As storage of the nuclear fuel in welded canisters for extended periods has increasingly become the most preferred approach in the U.S., UK, Spain and many other countries, the need to assure a long service life has become important. Peening the vulnerable surfaces to introduce a compressive stress state appears to be an effective means to eliminate one of the trio of SCC (tensile stress) inducing parameters. However, the results of this measure will not be known for a long time.

Improvements in the traditional spent nuclear fuel canisters which overcomes the foregoing deficiencies are desired.

The canister used to store hazardous materials such as used or spent nuclear fuel (SNF) is typically made from multiple courses of shell segments butt welded to each other leading to discrete linear seams or joints, thereby forming circumferential joints as shown. In addition, each shell segment in turn may also be formed of a cylindrically rolled plate or sheet of material which is butt welded at the adjoining ends or edges forming longitudinal joints. The typical material of construction used to store high level nuclear waste is austenitic stainless steel. Stainless is extremely ductile, has a high fracture resistance at even cryogenic temperatures and it resists corrosion in a wide variety of environments. These properties of stainless steel have made it a prized material for making components that may be exposed to adverse environmental conditions in open air settings. In the nuclear power industry, the canisters used to store used nuclear fuel (often called the multi-purpose canister or "MPC") are almost always made from a stainless alloy. While the wide usage of austenitic stainless steel is grounded on its solid track record, a stainless weldment has one notable vulnerability: the material is susceptible to stress corrosion cracking (SCC) if its exposed surface has a tensile stress field and is subjected to a prolonged exposure to a salt-laden atmosphere such as a chloride or halide-bearing moist marine air of certain relative humidity. It is recognized that residual tensile stresses created in the weld and adjoining heat affected zones (HAZ) by welding the canister shell are a source of such stress fields. A high level of tensile stress on the exposed surface, humid air, and a salt species must be all present to initiate stress corrosion cracking.

Prior experience shows that a stainless shell of an MPC withstands humid marine air and have remained intact (without any breach) for decades in service which provides comforting assurance to the canister users in the nuclear industry. There is general consensus in the scientific community that there is no credible threat to the integrity of the canisters stored even in salt air environments for several decades. However, the potential for eventual degradation has been sufficient to prompt the efforts to extend the canister's service life. Towards this end, several organizations in the nuclear industry have launched programs for comprehensive "Aging Management" of MPCs.

A need exists for an improved welded nuclear waste storage canister which can prolong the onset of SCC.

Manufacturing a welded cylindrical shell-type structure or weldment requires rolling or forming of metal plate stock followed by welding to close the seams or joints. The multi-purpose canister (MPC) is an example of a cylindrical shell-type structure or weldment used in the nuclear power generation industry. Such canisters, used to store spent nuclear fuel (SNF) and other forms of nuclear high-level waste (HLW), are typically made of austenitic stainless steel. Stainless is an excellent material for this application for a variety of reasons such as high ductility and excellent fracture resistance in the entire range of temperatures for which the canisters are designed (−40 deg. C. to 400 deg. C.).

Austenitic stainless, however, has one drawback: while otherwise extremely resistant to general corrosion effects, it is somewhat vulnerable to stress corrosion cracking (SCC) under certain set of environmental conditions. The conditions necessary to induce SCC in the stainless-steel canister exposed to the ambient environment are: (1) A state of tensile surface stress on the surface exposed to the environment; (2) Presence of halides in the ambient environment; and (3) A state of high relative humidity in the ambient air.

Canisters stored inside an outer ventilated module or overpack in a salt water environment may fulfill all of the above conditions most of the time, thereby making them vulnerable to the onset of SCC. The region of the canister most susceptible to SCC is where the state of surface stress in the shell-type structure is invariably tensile. Such tensile regions are the weld seams and possibly the adjacent heat affected zones in the shell base material adjoining the welds where residual tensile stress is caused by the shrinkage of the weld puddle and thermal transient effects.

Such rolled cylindrical shell-type structures are further characterized by residual stresses from rolling as well as welding operations, further exacerbating the SCC problem. Rolling produces a radially symmetric stress field which is compressive on the outside surface and tensile on the inside. This is a favorable situation for the shell to prevent to SCC because the surface exposed to the ambient environment with the compressive stress field is the outer surface. FIG. 45 shows the typical residual stress distribution in the circumferential direction in the shell subsequent to rolling the originally flat plate into a cylinder.

Unlike the residual stress field from plate rolling, the residual tensile stress produced by welding of the seams or joints is locally concentrated reaching its peak in the center of the weld line and attenuating gradually away from it. The weld along the weld line is usually in a tensile state on the outer surface of the weld exposed to the ambient environment, which unfortunately makes it the prime location for SSC attack.

An improved method or process to form and protect shell-type weldments from SCC, such as particularly those used to create the multi-purpose canister (MPC) for storing spent nuclear fuel discussed above, is needed.

BRIEF SUMMARY

To overcome the foregoing limitations in the art for retrieving the spent nuclear fuel (SNF) contents from "all-welded" fuel canister constructions presently used in the nuclear industry, a new and improved spent nuclear fuel canister is disclosed herein which not only maintains the essential features of the canister's structural ruggedness for protecting the fuel, but also makes the fuel more readily accessible without the foregoing cutting process, and with minimum human effort and radiation exposure to the workers. Some embodiments further include heat dissipation features for significantly increasing the heat rejection capability of the canisters, thereby safeguarding the structural integrity of the SNF stored therein. Also importantly, the SNF canisters disclosed herein advantageously maintain the same preferred small dimensions and profile (i.e. height and diameter) of prior canisters with seal welded lids, thereby allowing the new canisters to be used interchangeably in existing outer transport and storage overpacks or casks without modification.

The SNF canister according to the present disclosure includes a multi-thickness shell and compact bolted closure lid-to-shell joint for ready access to the fuel contents inside. This eliminates the time-consuming and cumbersome prior cutting processes described above which are required to sever a welded joint between the lid and shell in welded lid designs. In one embodiment, the present lid may be directly bolted to the top of the shell.

To accommodate the bolting and seals required, a multi-thickness shell is provided having a top fastening portion that comprises a reinforcement structure in the form of an annular mounting boss integrally formed with the shell. The top fastening portion of the shell has a greater transverse wall thickness than the wall portion of the shell below, thereby providing additional purchase for engaging the bolts at the bolted lid joint. In some embodiments, the mounting boss may have a wall thickness equal to or greater than at least twice the thickness of the lower shell wall.

In various embodiments described herein, the upper annular mounting boss may protrude radially inwards into the cavity of the shell beyond its lower inner surface, or alternatively protrude radially outwards beyond the lower outer surface of the shell. The boss or fastening portion of the shell comprises a plurality circumferentially spaced and upwardly open threaded bores formed in the top of the shell at the fastening portion. The bores threadably engage the bolts which extend longitudinally through the lid. An inner and outer seal are provided to seal the containment cavity of the SNF canister and provide redundant high integrity leak barriers.

In some preferred embodiments, the top mounting boss/fastening portion may be formed as a monolithic unitary structural portion of the shell which may be one piece. In other embodiments, the mounting boss/fastening portion may be a discrete element seal welded to the lower smaller thickness portion of the shell.

The closure lid has an annular mounting flange receiving the through bolts. The flange is seated on the top end of canister shell. Significantly, the mounting flange does not protrude radially beyond the outer surface of the either the upper fastening portion or lower portions shell to minimize the outside diameter of the canister necessary for storing the canister inside the an outer radiation shielded overpack or cask for transport/storage. This unique lid and bolting construction and arrangement advantageously results in a compact lid design, thereby keeping the outer cask's outside diameter to the smallest possible which is an essential part of a design that complies with the NRC's 10CFR71 regulations. Although bolted lids may be used in the bulker radiation shielded outer transport/storage casks, such bulkier designs are not suit for the inner SNF canister which must maintain the smallest outer diameter and profile possible without substantially reducing the number of spent fuel assemblies which be storage inside the canister.

In one embodiment, the canister may further comprise a plurality of radial cooling fins arranged perimetrically on the outer surface of the shell to enhance heat dissipation. The fins may be welded directly to the outer surface of the shell or may be integrally formed therewith to provide direct contact. This ensures an effective conductive heat transfer path from the shell to the outer environment surrounding the canister, thereby allowing the fins to act as heat radiators. In some constructions, the fins may be disposed in an annular 360 degree recessed lower area of the outer shell formed by the mounting boss. By locating the fins in the recessed area below the mounting boss, the fins advantageously do not protrude radially outwards beyond the lid, shell, and bottom baseplate of the canister in some implementations to maintain the desired small outside diameter of the canister package, and importantly to protect the fins from damage when handling and moving the canister during the spent fuel dewaters, staging, and transport operations.

In one aspect, a canister for spent nuclear fuel storage comprises: a longitudinal axis; an elongated shell extending along the longitudinal axis, the shell including a top end and a bottom end; a cavity extending along the longitudinal axis inside the shell for storing spent nuclear fuel; a baseplate attached to the bottom end of shell and enclosing a lower portion of the cavity; a closure lid detachably fastened to the top end of the shell and enclosing an upper portion of the cavity; and a plurality of mounting bolts extending longitudinally through the lid and threadably engaging the top end of the shell; wherein the canister is configured for placement inside an outer overpack with radiation shielding.

In another aspect, a canister for spent nuclear fuel storage comprises: a vertical longitudinal axis; a cylindrical shell extending along the longitudinal axis, the shell including a top end, a bottom end, and an outer surface; an internal cavity extending between the top end and bottom end of the shell along the longitudinal axis for storing spent nuclear fuel; a baseplate attached to the bottom end of the shell and enclosing a lower portion of the cavity; a closure lid detachably fastened to the top end of the shell and enclosing an upper portion of the cavity, the lid having a circular body comprising a first portion and a second mounting flange portion protruding radially outwards beyond the first portion; and a plurality of mounting bolts extending longitudinally through the mounting portion of the lid and threadably engaging the top end of the shell; wherein the mounting flange portion of the lid does not protrude radially outwards beyond the outer surface of the shell; wherein the canister is configured for placement inside an outer overpack with radiation shielding.

In another aspect, a canister for spent nuclear fuel storage comprises: a vertical longitudinal axis; a cylindrical shell extending along the longitudinal axis, the shell including a top end and a bottom end; a cavity extending along the longitudinal axis inside the shell for storing spent nuclear fuel; a baseplate attached to the bottom end of shell and enclosing a lower portion of the cavity; a closure lid detachably fastened to the top end of the shell and enclosing an upper portion of the cavity; and a plurality of mounting bolts extending longitudinally through the lid and threadably engaging the top end of the shell; and a plurality of longitudinally-extending cooling fins protruding radially outwards from the shell, the fins spaced perimetrically apart around the shell; wherein an outer surface of the lid is substantially flush with an outer surface of the top end of the shell; wherein the canister is configured for placement inside an outer overpack with radiation shielding.

A system for storing spent nuclear fuel comprises: a longitudinal axis; an elongated outer cask comprising a double-walled first shell including a radiation shielding material, a first lid attached to a top end of the first shell, and an internal first cavity; an elongated inner cylinder canister positioned in the first cavity of the first shell, the cylinder comprising: a single-walled second shell extending along the longitudinal axis, the second shell including a top end and a bottom end; a second cavity extending along the longitudinal axis inside the second shell, the second cavity containing spent nuclear fuel; a baseplate attached to the bottom end of shell and enclosing a lower portion of the second cavity; a second lid detachably fastened to the top end of the second shell and enclosing an upper portion of the second cavity; and a plurality of mounting bolts extending longitudinally through the second lid and threadably engaging a plurality of blind threaded bores formed the top end of the second shell; the threaded bores formed in a radially projecting mounting boss extending circumferentially around the top end of the second shell, the mounting boss having a greater transverse first wall thickness than a transverse second wall thickness of lower portions of the second shell below the mounting boss.

In one aspect, a canister for dry storage of nuclear waste material comprises: a tubular first shell defining an internal cavity for storing nuclear waste material; a lid sealably attached to a first end of the first shell; an end closure attached to a second end of the first shell, the first end closure comprising a base plate and an upturned annular closure flange disposed on a peripheral portion of the base plate; a circumferentially-extending butt joint formed between the annular closure flange and the second end of first shell; and a circumferentially-extending butt weld formed at the butt joint which hermetically seals the annular closure flange to the second end of the first shell.

In another aspect, a double-walled canister system for dry storage of nuclear waste material comprises a canister including: a tubular inner shell defining an internal cavity for storing nuclear waste material and having a first height; a first lid sealably welded to a first end of the inner shell; a primary base plate defining a peripheral edge portion and having an upturned annular closure flange disposed on the peripheral edge portion; and an annular full thickness butt weld formed at an abutment joint between the annular closure flange and second end of the inner shell which sealably attaches the first end closure to the inner shell. The inner shell, first lid, and first end closure collectively define a hermetically sealed primary pressure retention barrier. A tubular outer shell adjoins the inner shell, the outer shell having a second height which is at least coextensive with the first height of the inner shell; wherein the outer shell is welded to the canister to form a hermetically sealed secondary pressure retention barrier.

A method for fabricating a canister system for dry storage of nuclear waste materials is provided. The method comprises: providing a tubular first shell having a first end, a second end, and cavity extending between the first and second ends for storing nuclear waste materials, and a first base plate having an upturned annular flange defining a circumferential edge; abutting the circumferential edge of the annular flange against the first end of the first shell to form a butt joint; welding the circumferential edge to the first end of the first shell with a full thickness butt weld to form a hermetic seal; and welding an annular peripheral edge of a first lid to the second end of the first shell to form a hermetic seal.

In certain parts of the present disclosure, certain preemptive measures effective against stress corrosion cracking (SCC) in the MPC are presented that can be implemented during the nuclear waste canister's fabrication to forestall the incidence of SCC after prolonged exposure in an adverse ambient environment for many more decades. The first measure generally comprises using a welding process which minimizes the quantity of weld metal for making a thru-thickness but weld, such as for example by hybrid laser welding. If a double bevel conventional welding technique such as MIG or submerged arc welding must be used, then the weld is preferably made from the outside first to minimize the size of the outer exposed bevel and thus amount of filler wire. By making the outside weld first, the weld can shrink freely thus minimizing residual tensile stress imparted to the HAZ of the shell by welding. A direct result of the reduced weld mass is reduction in the magnitude and extent of the tensile stress particularly on the outer exposed surface of the weld and the HAZ which forms a potential initiation site for SCC.

The second measure generally comprises forcibly compacting and compressing the exterior convex weld crown to plastically deform and flatten it causing a through-thickness compaction (TTC) and state of compressive stress in the HAZ. The size of the crown to yield best results may preferably be determined by a finite element analysis using the actual geometry of the weld, material properties of the base and weld materials, and thickness of the canister shell parts being joined. Preferably, the foregoing two measure or techniques can be used together for best results. Optionally, surface peening may be applied subsequently to weld and HAZ after TTC to further reinforce the state of compressive stress in the weld region.

A method or process for fabricating a nuclear waste canister weldment formed from stainless steel plate or sheet susceptible to SCC may therefore generally include in one embodiment forming a weld at a seam or joint in the sheet or sheets, and compressively compacting and flattening the weld with sufficient force to convert the residual stress field in the weld and HAZ resulting from welding to a compressive stress field for a full depth or thickness of the shell base material. The weld preferably may be formed of a type and with profile characteristics which reduce tensile stresses initially created in the weld and HAZ by heat produced during the welding operation, thereby mitigating or postponing the occurrence of stress corrosion cracking (SCC) in these vulnerable zones. As noted above, the compaction and flattening step convert the tensile stresses created in the weld and HAZ material of the shell base material to a full depth or thickness of the weld and base material. The peening step may optionally be used after TTC to impart a further degree of compressive stresses in the weld and HAZ at the outer surface region of the canister shell (i.e. less than full depth), thereby forming an additional shield against SCC.

In one aspect, a method for fabricating a nuclear waste canister comprises: providing a stainless steel sheet or sheets for a nuclear waste canister, the sheet or sheets including an exterior surface, an interior surface, and an open joint defined between adjacent edges of the sheet or sheets; forming a full thickness weld in the open joint, the weld extending from the interior surface of the sheet or sheets to a convexly rounded crown at the exterior surface of the sheet or sheets; compressing the weld for a full thickness of the weld; and flattening the crown of the weld such that the crown after compressing is substantially flush with the exterior surface of the sheet or sheets adjoining the weld.

In another aspect, a method for fabricating a nuclear waste canister comprises: providing a stainless steel shell or shells for a nuclear waste canister, the shells or shells including an exterior surface, an interior surface, a thickness defined therebetween, a pair of spatially separated opposing edges to be joined defining an open weld joint; and forming a full thickness weld in the weld joint by first forming an exterior weld mass at an exterior of the weld joint followed by forming an interior weld mass at an interior of the weld joint, the weld extending from the interior surface to the exterior surface of the shell or shells.

In another aspect, a method for fabricating a nuclear waste canister comprises: providing a stainless steel shell or shells for a nuclear waste canister, the shells or shells including an exterior surface, an interior surface, a thickness defined therebetween, and an open weld joint; forming a full thickness weld in the weld joint; and compressing the full thickness weld from the interior surface to the exterior surface of the shell or shells.

In another aspect, a nuclear waste canister comprises: a welded cylindrical stainless steel shell having a thickness and including an exterior surface, an interior surface, and an interior space configured for storing nuclear waste; the shell comprising at least one full thickness butt weld extending from the interior surface to the exterior surface of the shell, the butt weld defining an adjoining heat affected zone resulting from formation of the weld; the weld and heat affect zone of the shell being compacted for an entirety of the thickness of the shell such that a compressive stress field exists in the weld and heat affect zone from the interior surface to the exterior surface.

Embodiments according to additional embodiments of the present disclosure provide a method or process for forming a cylindrical shell-type weldment structure in a manner which inhibits the onset of stress corrosion cracking (SCC). In one implementation, the method may comprise steps including forming the shell such as via mechanical rolling, welding open butt joints or seams of the rolled shell, a second hard (cold) rolling of at least the surfaces of the weld seam or joint regions (i.e. weld and adjacent heat affect zones—HAZ) under relatively high compressive forces produced by the roller, and peening the seam or joint regions in multiple passes with each pass creating successively and progressively wider peening strips or regions along the weld lines. The rolling operations may be performed by a commercial mechanical roller machine. In the implementation of the method, the second hard rolling may involve re-rolling the entire shell including the welds and HAZ.

In one embodiment, the structure comprises a cylindrical shell formed from multiple rolled and welded stainless steel (e.g. austenitic stainless) shell segments which are welded together along a circumferential butt seam to create a welded assembly (i.e. weldment). The multiple shell segments may be necessary depending on the length of the structure or vessel being created (shorter structures requiring only a single shell segment in some instances). Each shell segment comprises a respective welded longitudinal seam as further described herein.

In one aspect, a method for fabricating a shell weldment includes: providing a cylindrical shell of stainless steel having an open butt seam; welding the butt seam to close the butt seam with a weld, the welding creating a heat affected zone in the shell adjoining the weld; rolling a weld zone collectively comprising the weld and heat affected zone under a compressive force after welding; and peening the weld zone. In one embodiment, the shell and weld zone is peened in multiple passes, each of the peening passes being selected to successively and progressively produce wider peened strips or regions on the shell along the weld zone and adjacent portions of the shell.

In another aspect, a method for fabricating a stainless steel shell weldment includes: rolling a flat workpiece of stainless steel to form a cylindrical shell, opposing side edges of the shell meeting at an open longitudinal butt joint; forming a double-V weld in the longitudinal butt joint to close the joint; rolling the weld and a heat affected zone in the shell adjoining the weld by applying a compressive force with a mechanical roller, the weld and heat affected zone collectively defining a weld zone; and peening the weld zone at an exterior surface of the shell.

In another aspect, a method for fabricating a stainless steel cylindrical shell weldment includes: providing a first cylindrical shell segment and a second cylindrical shell segment, each shell segment being formed of austenitic stainless steel and comprising having an open longitudinal butt seam; closing the butt seams of each of the first and second shell segments by forming a double-V longitudinal weld in the longitudinal butt seams, the formation of the longitudinal welds creating a respective heat affected zone in the shell segments adjoining each longitudinal weld; placing the first and second shell segments in abutting end-to-end relationship forming a circumferential butt seam therebetween; closing the circumferential butt seam by forming a double-V circumferential weld in the circumferential butt seam, the formation of the circumferential weld creating a respective heat affected zone in the shell segment adjoining the circumferential weld; applying an inward directed compressive force against the longitudinal and circumferential welds and their heat affected zones by a mechanical roller; and peening the shell segments along the longitudinal and circumferential welds and their respective heat affected zones in multiple peening passes, each of the peening passes being selected to successively and progressively produce wider peened strips on the shell in vicinity of the welds and their respective heat affected zones; wherein a residual stress field proximate to the longitudinal and circumferential welds on an exterior of the shell segments is compressive after the peening step.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which:

All drawings are schematic and not necessarily to scale. Parts shown and/or given a reference numerical designation in one figure may be considered to be the same parts where they appear in other figures without a numerical designation for brevity unless specifically labeled with a different part number and described herein. References herein to a whole figure number (e.g. FIG. 1) shall be construed to be a reference to all subpart figures in the group (e.g. FIGS. 1A, 1B, etc.) unless otherwise indicated.

DETAILED DESCRIPTION

Figure 1:
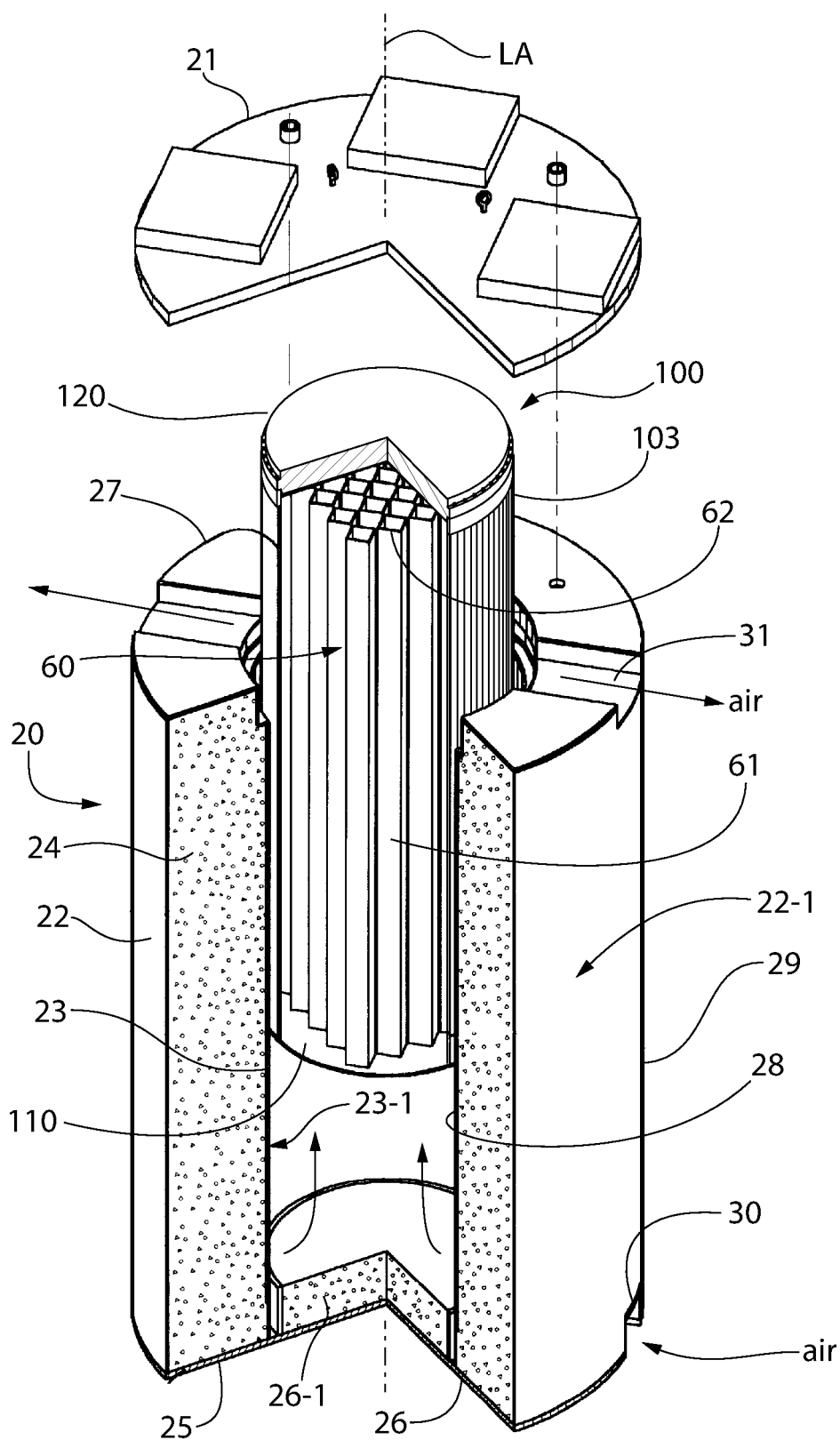
FIG. 1 is a partial cross-sectional perspective view of a cask and canister system for the storage and transport of spent nuclear fuel according to the present disclosure.
Figure 2:
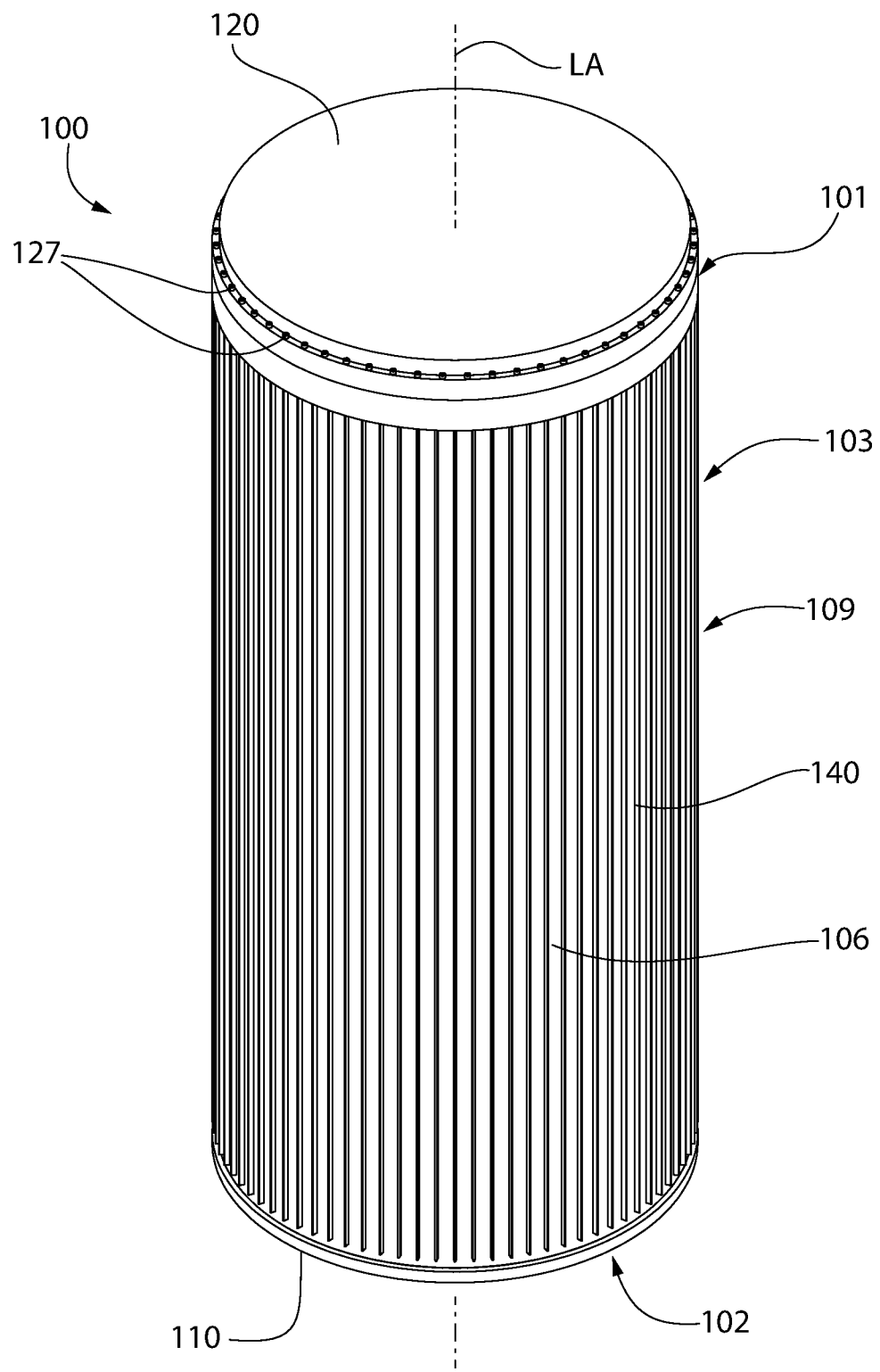
FIG. 2 is a top perspective view of the canister and bolted lid thereof.
Figure 3:
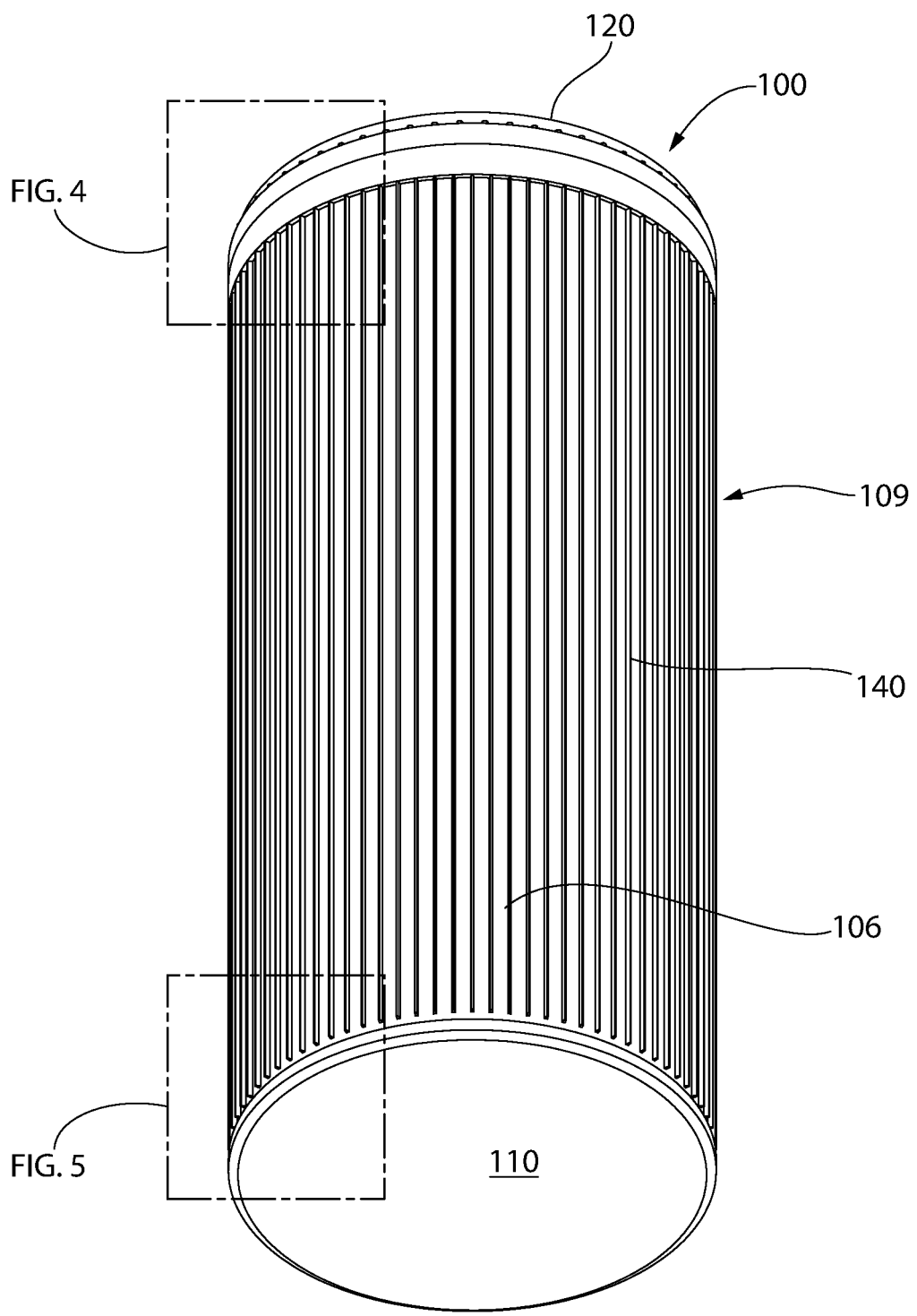
FIG. 3 is a bottom perspective view thereof.
Figure 4:
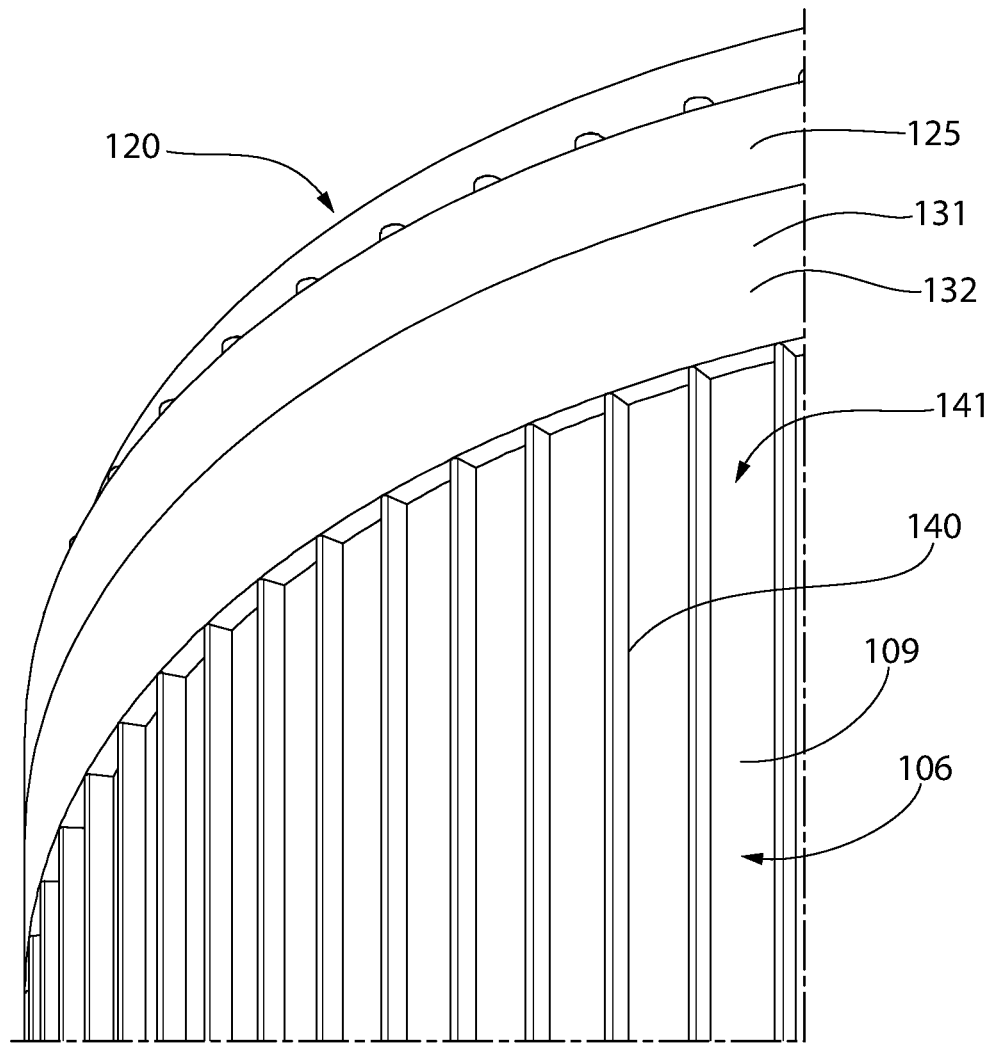
FIG. 4 is a first detail view from FIG. 3.
Figure 5:
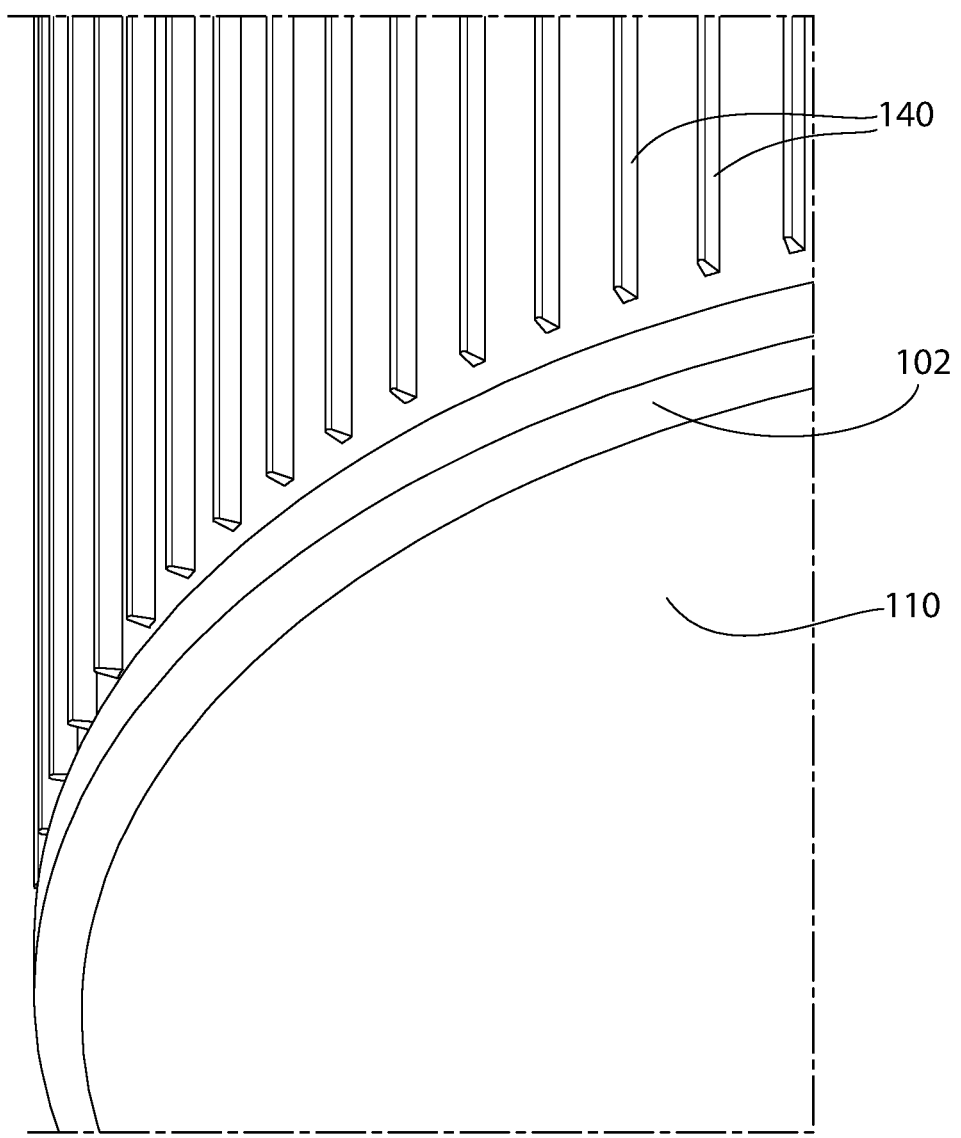
FIG. 5 is a second detail view from FIG. 3.
Figure 6:
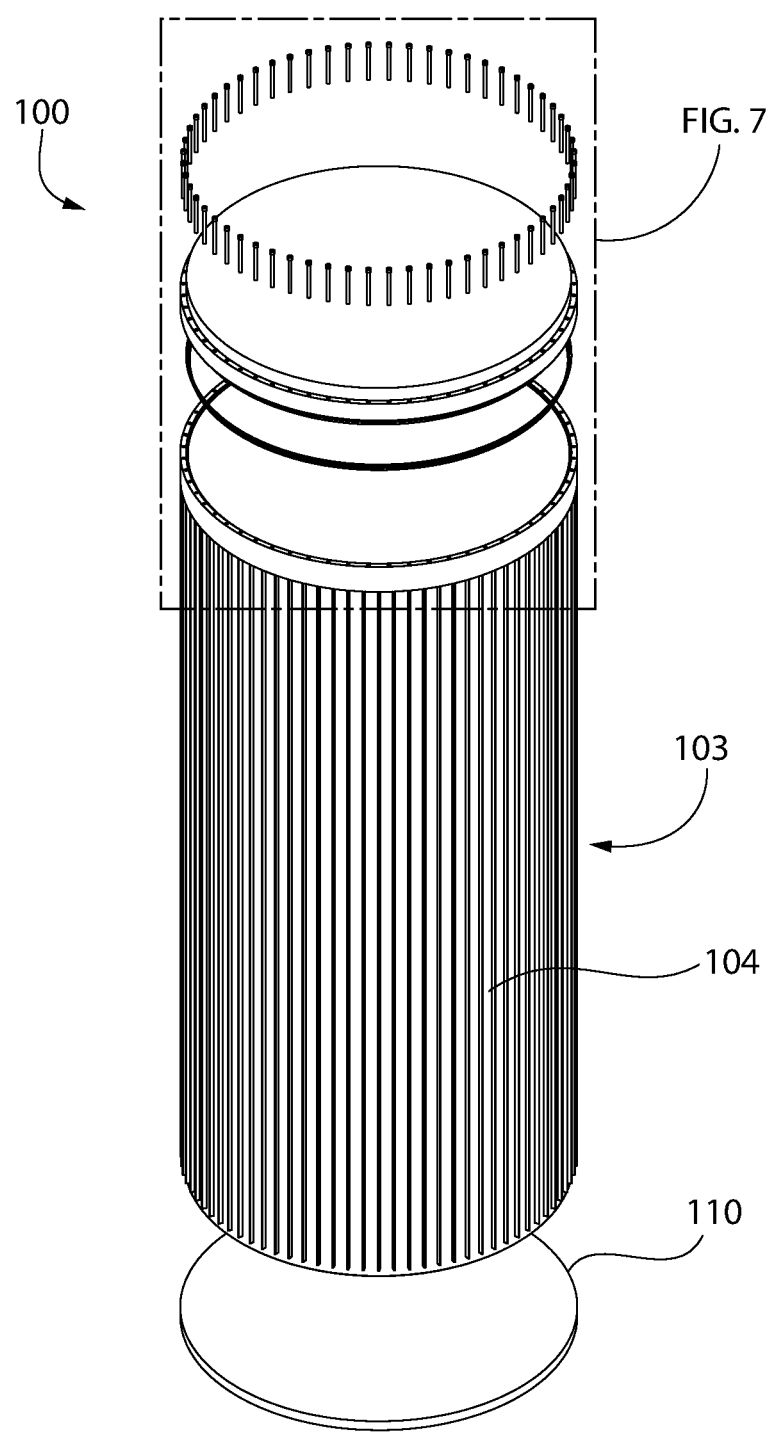
FIG. 6 is an exploded perspective view of the canister.
Figure 7:
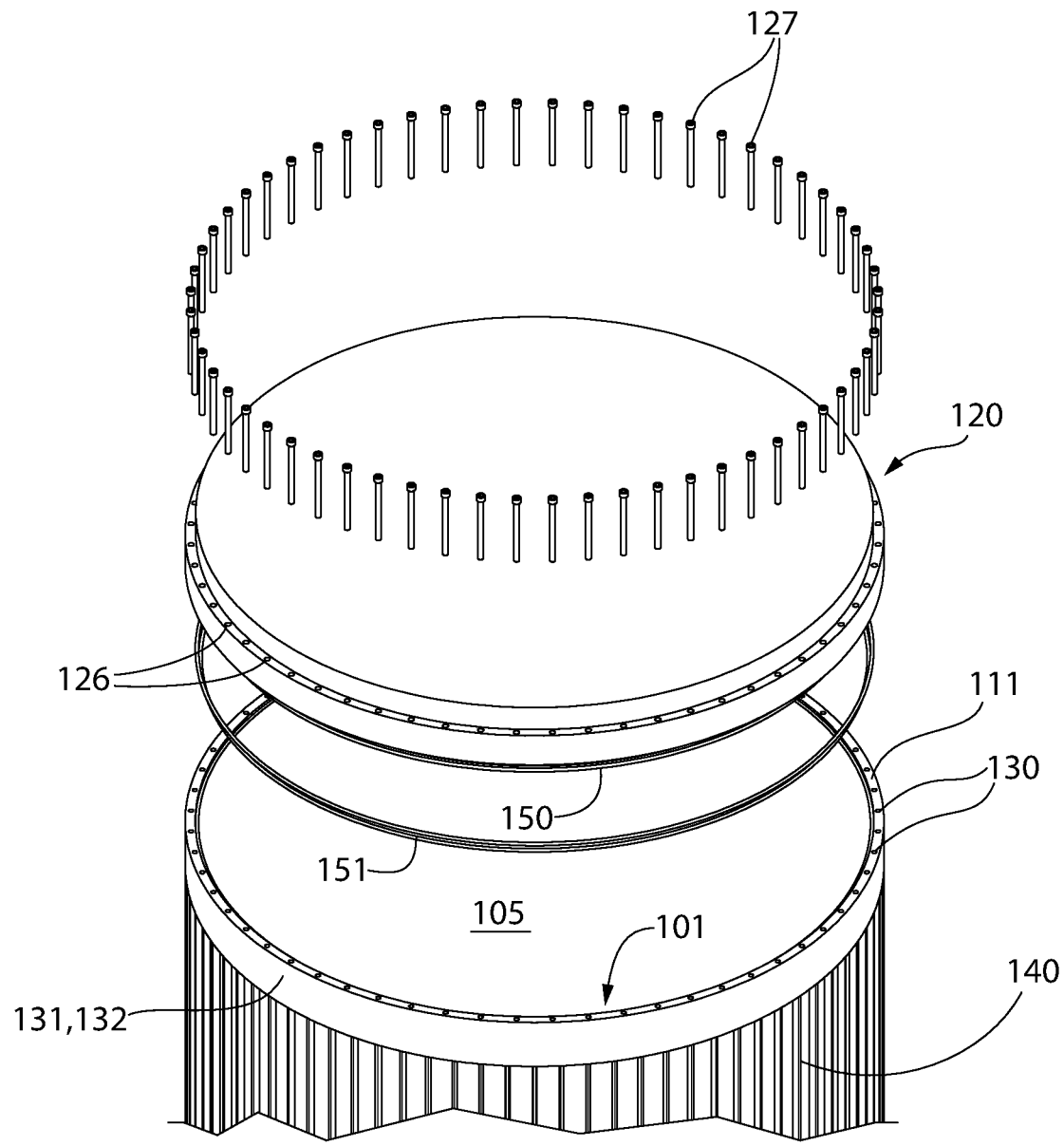
FIG. 7 is a detail view from FIG. 6.
Figure 8:
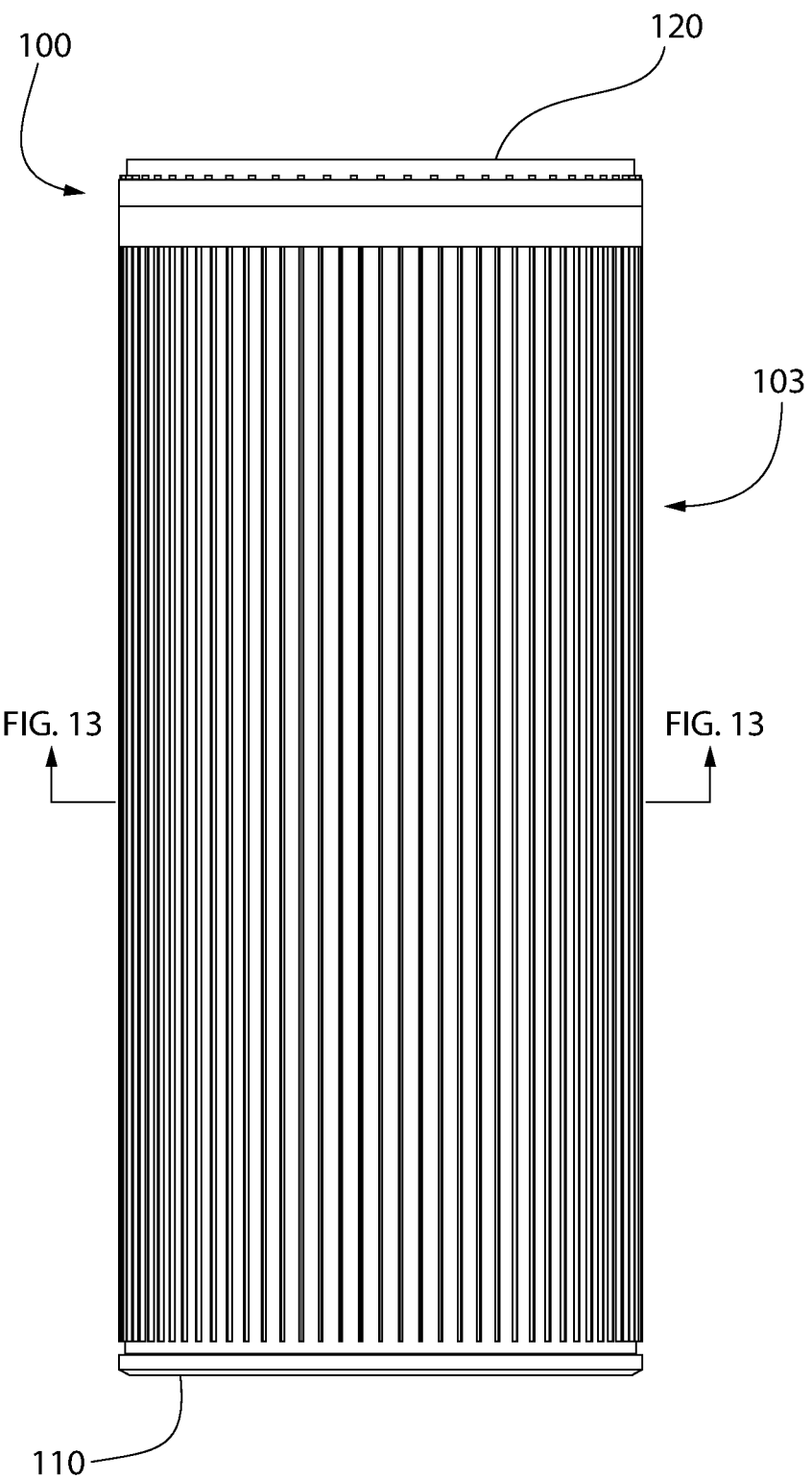
FIG. 8 is a side view of the canister.
Figure 9:
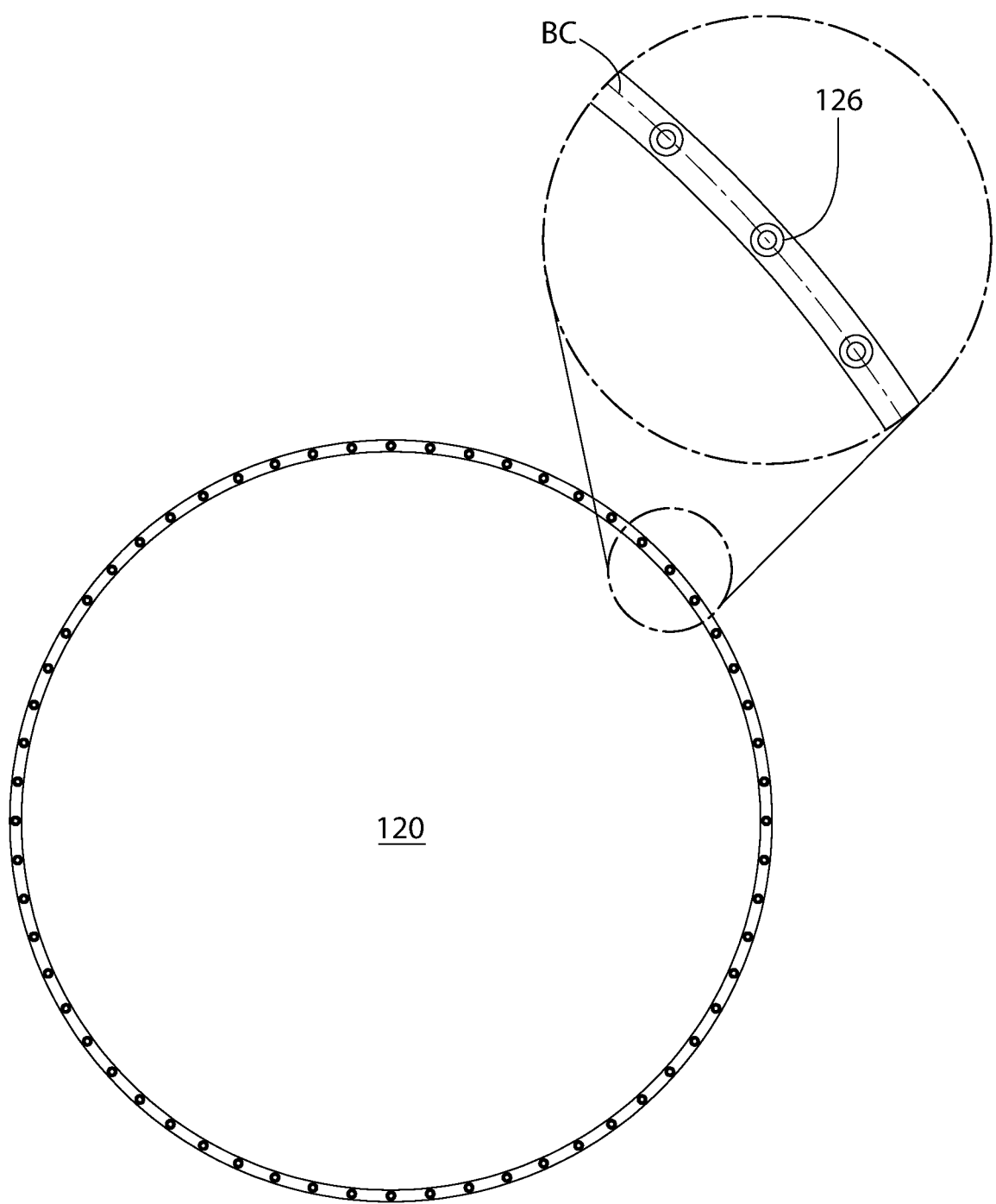
FIG. 9 is a top plan view of the canister.

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Multiple inventive concepts are described herein and are distinguished from one another using headers in the description that follows. Specifically, FIGS. 1-25 are relevant to a first inventive concept, FIGS. 26A-35 are relevant to a second inventive concept, FIGS. 36-43 are relevant to a third inventive concept, and FIGS. 44-49 are relevant to a fourth inventive concept. The first through fourth inventive concepts should be considered in isolation from one another. It is possible that there may be conflicting language or terms used in the description of the first through third inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed. Similarly, the section of the description describing a particular inventive concept being claimed should be used to interpret claim language when necessary.

I. Inventive Concept 1

With reference to FIGS. 1-25, a first inventive concept will be described.

FIG. 1 depicts a system for storing and transporting radioactive spent nuclear fuel (SNF) which incorporates a spent fuel canister 100 with compact bolted lid according to the present disclosure. The system generally includes an outer vertically ventilated overpack (VVO) or cask 20 defining a vertical longitudinal axis LA. Cask 20 may have a composite construction including an outer cylindrical shell 22, inner cylindrical shell 23, and radiation shielding material 24 disposed in the annulus between the shells. In some embodiments, the shielding material 24 may comprise concrete, lead, boron-containing materials, or a combination of these or other materials effective to block and/or attenuation gamma and neutron radiation emitted by the SNF enclosed by the cask.

Cask 20 has an elongated body including an open top 27 for inserting canister 100 into cavity 28, a bottom end 25, cylindrical sidewall 29 extending between the ends, and an internal canister cavity 28 defined by the inner shell 23. Cavity 28 extends completely through the cask along the longitudinal axis LA from the top to bottom end. The cavity 28 has dimensions and a transverse cross-sectional area which holds only a single SNF canister 100 in one embodiment. Cask 20 includes an interior surface 23-1 adjacent to canister cavity 28 and opposing exterior surface 22-1. Cask 201 may be comprised of a single long cylinder body, or alternatively may be formed by a plurality of axially aligned and vertically stacked cylinder segments seal welded together at the joints between the segments to collectively form the cask body.

The bottom end 25 of cask 20 may be enclosed by circular base 26 attached thereto, such as via circumferential seal welding. A canister support pad 26-1 of cylindrical shape may be disposed on top of the base 26 inside canister cavity 28 to support the spent fuel canister 100. The pad may be formed of concrete in one embodiment. The cavity 28 of cask 20 may be ventilated by ambient cooling air to remove decay heat emitted by the SNF stored inside the canister 100. Cask 20 may therefore include one or more air inlets 30 communicating with a lower portion of cavity 28 and one or more air outlets 31 communicating with an upper portion of the cavity. Air flows radially inwards through inlets 30, upwards through the cavity, and radially outwards through outlets 31 (see directional airflow arrows). The open top end 27 of the cask 20 is closed by a removable lid detachably mounted to the cask. The outlet ducts 31 may be formed between the lid and top of the cask in some embodiments as shown.

FIGS. 1-14 depict spent fuel canister 100 with compact bolted lid according to a first embodiment of the present disclosure in further detail. The present canister advantageously comprises a bolted joint between the removable top closure lid and the canister body as previously described herein, thereby advantageously providing ready access to the SNF therein for repackaging or other purposes. The bolted lid joint is further described in the discussion which follows.

Canister 100 includes an elongated cylindrical body 103 comprising a single shell 106 including an open top 101, an open bottom 102, and sidewall 109 extending therebetween along a vertical longitudinal axis LA of the canister. Axis LA coincides with the geometric vertical centerline of the canister. Canister 100 further includes a bottom baseplate 110 and a top closure lid 120. Shell 106 may be of monolithic unitary structure in one embodiment formed of a single material.

Shell 106 further includes an inner surface 107 and opposing outer surface 108. A longitudinally-extending fuel cavity 105 extends between the top and bottom ends 101, 102 of the shell along longitudinal axis LA. Cavity 105 is configured to hold a conventional fuel basket 60 comprising a prismatic array of longitudinally-extending fuel storage cells 62. Cells 62 of the fuel basket may be defined by a cluster of elongated tubes 61 (shown), or alternatively interlocked cell dividers. Both designs are used and well known in the art without further elaboration necessary. The invention is not limited by the construction or configuration of the fuel basket used. The cells 62 are each configured for holding a single spent fuel assembly containing plural used or spent fuel rods removed from the reactor core. Such fuel assemblies are well known in the art without further elaboration. The spent fuel still emits considerable amounts of decay heat which is removed by the air-cooled ventilation system of the outer cask 20, as previously described herein.

The baseplate 110 is hermetically seal welded to the bottom end 102 of the shell 106. In one embodiment, the baseplate may have a larger diameter than bottom end of the shell such that the baseplate protrudes radially outwards beyond the shell (see, e.g. FIG. 10). This arrangement protects the longitudinal cooling fins 140 if provided, as further described herein. In other embodiments without fins, the baseplate 110 may have the same diameter as the bottom end of shell 106 such that the outward side surface of the baseplate is substantially flush with the outer surface 108 of the shell (see, e.g. FIG. 19).

Figure 10:
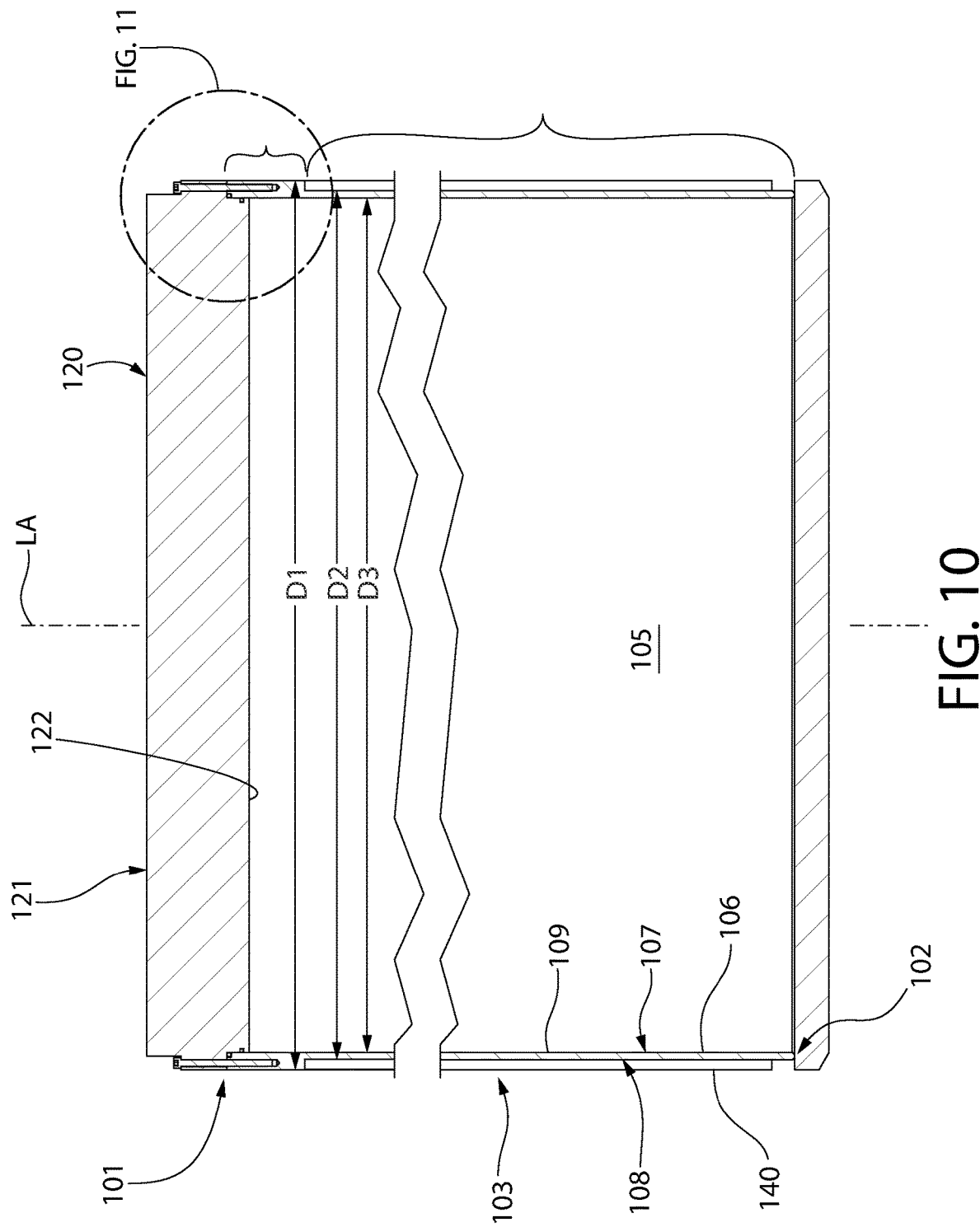
FIG. 10 is a side cross-sectional view of the canister.
Figure 11:
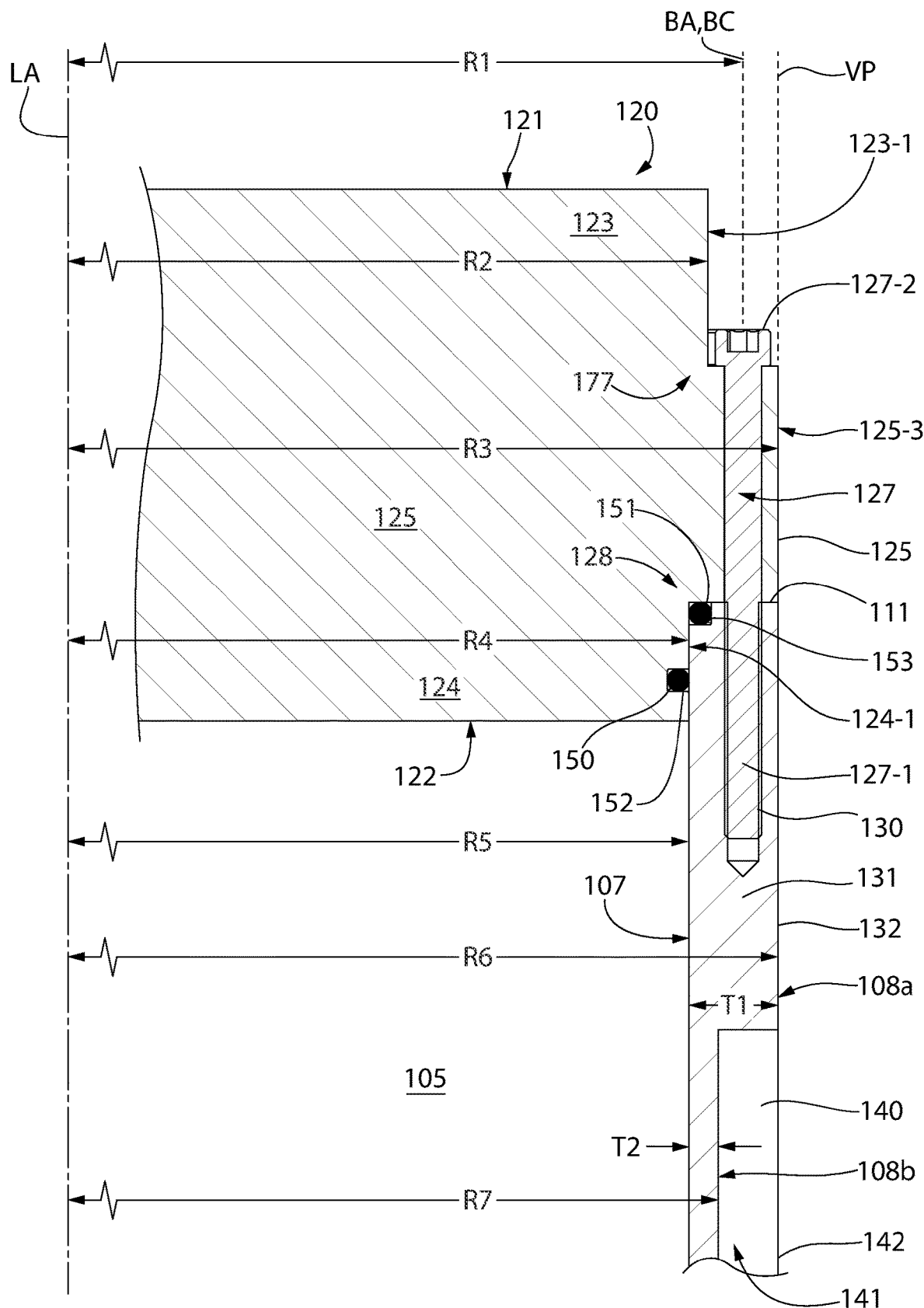
FIG. 11 is a detail view taken from FIG. 10.
Figure 12:
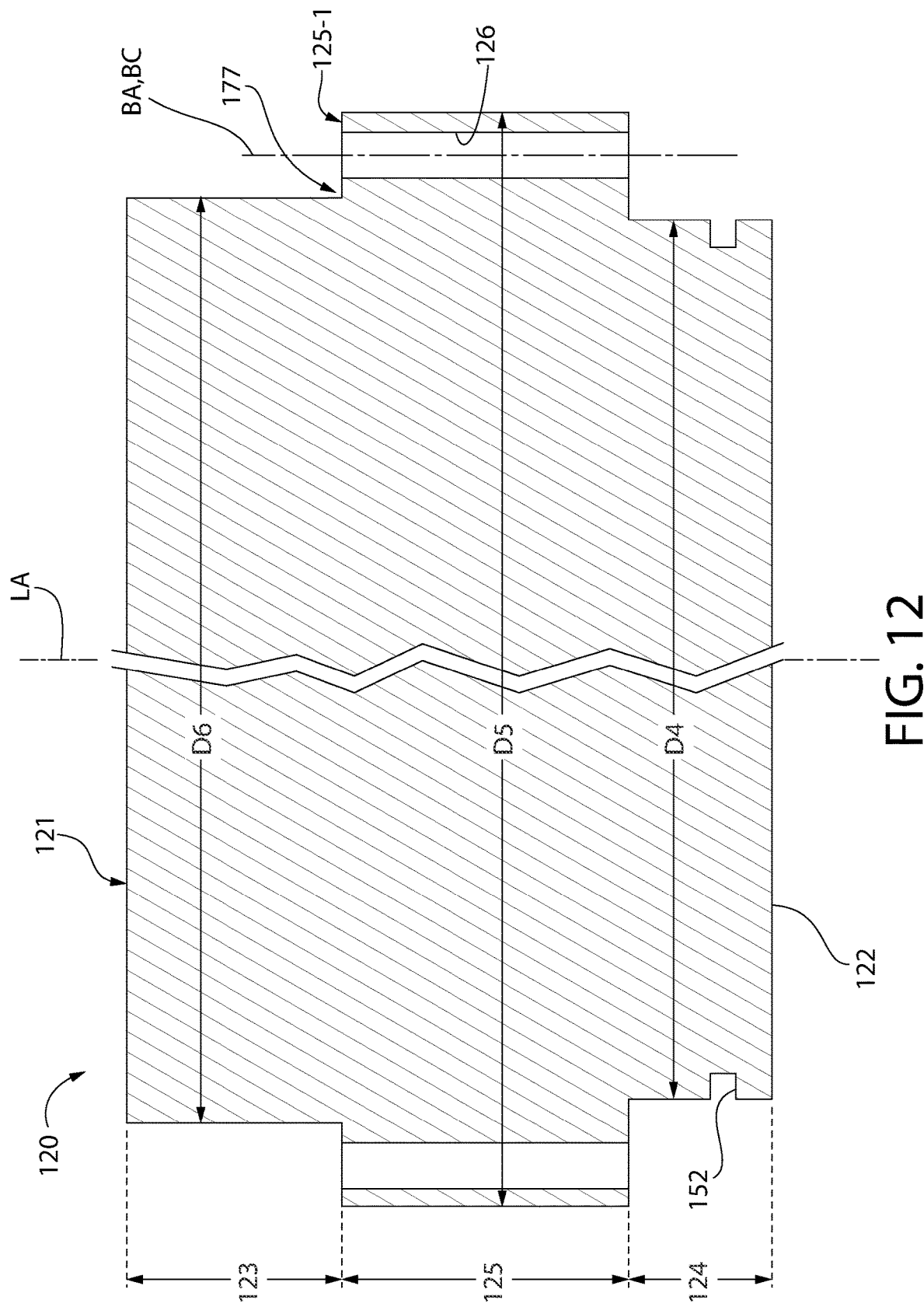
FIG. 12 is a side cross-sectional view of the lid of the canister.
Figure 13:
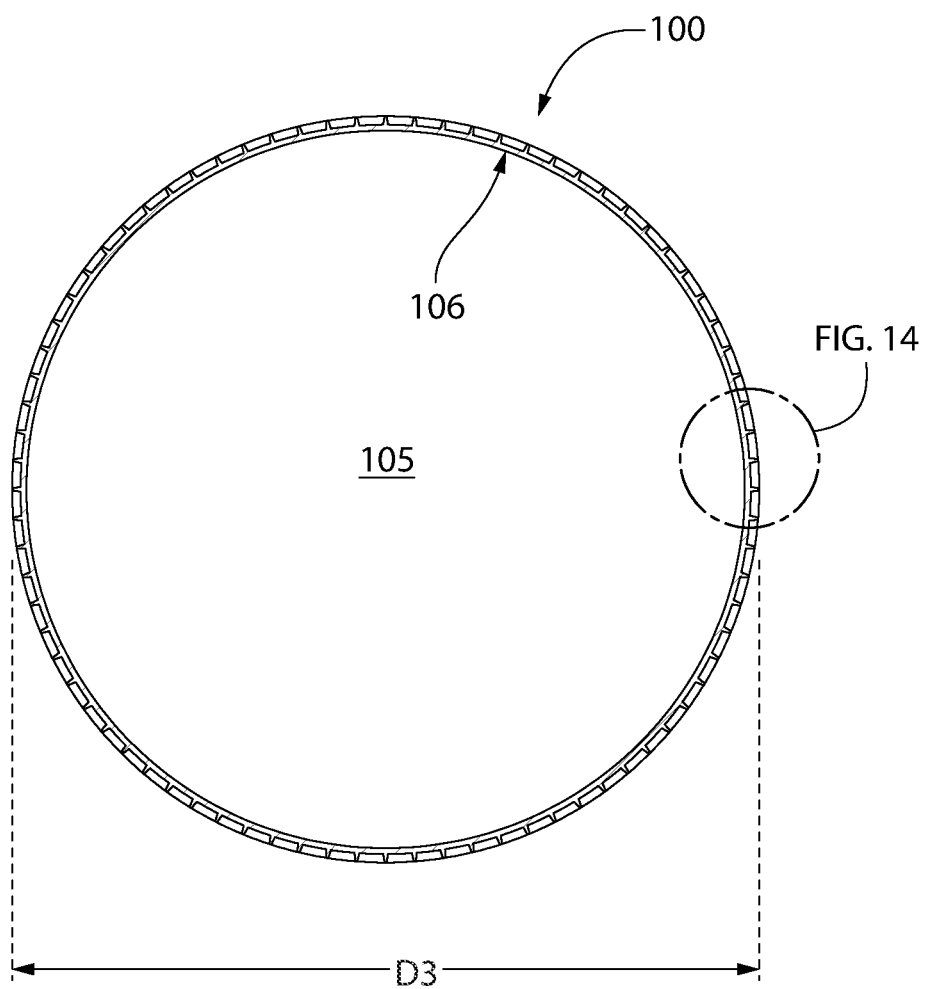
FIG. 13 is a transverse cross sectional view taken from FIG. 8.
Figure 14:
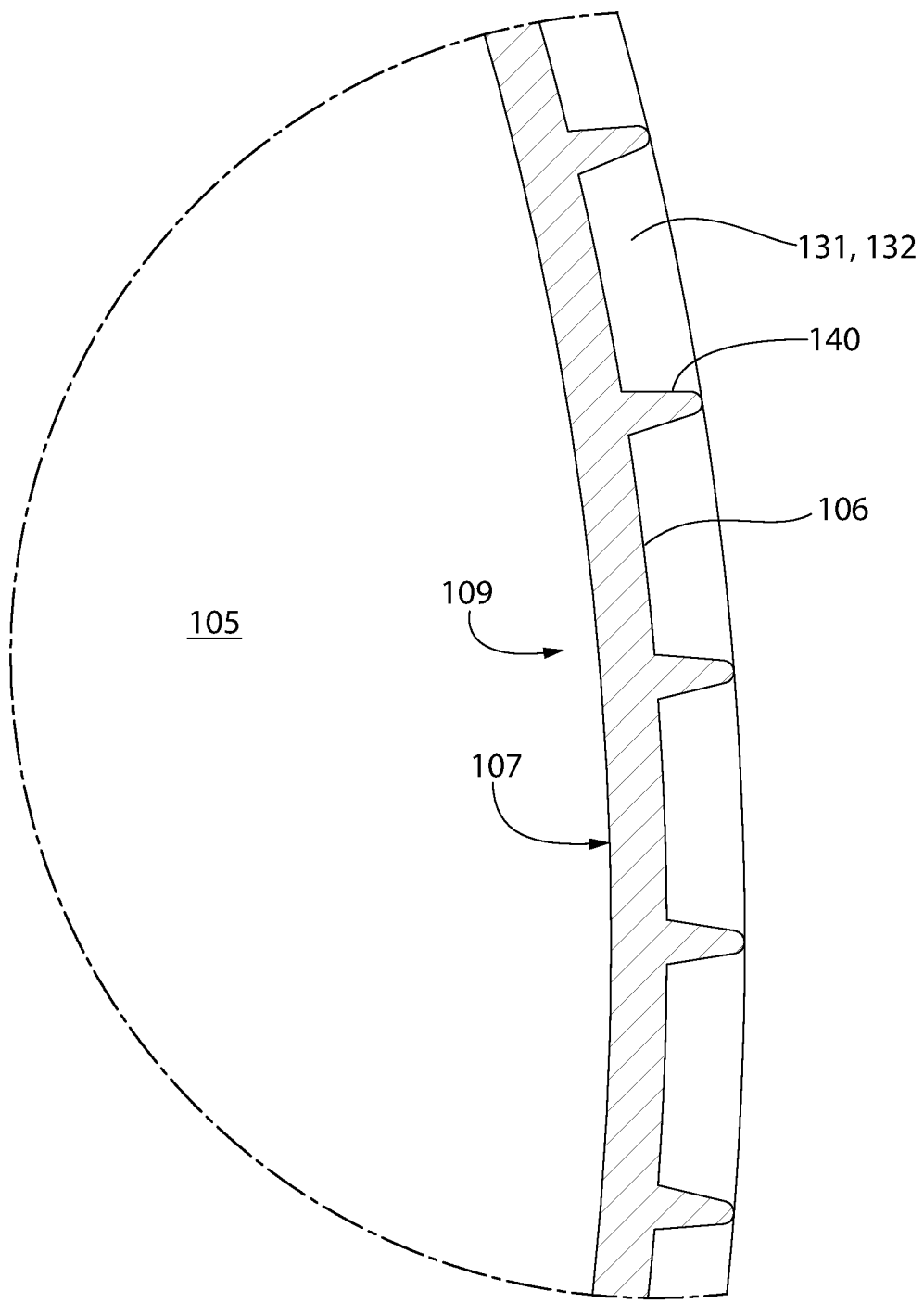
FIG. 14 is a detail view taken from FIG. 13.
Figure 15:
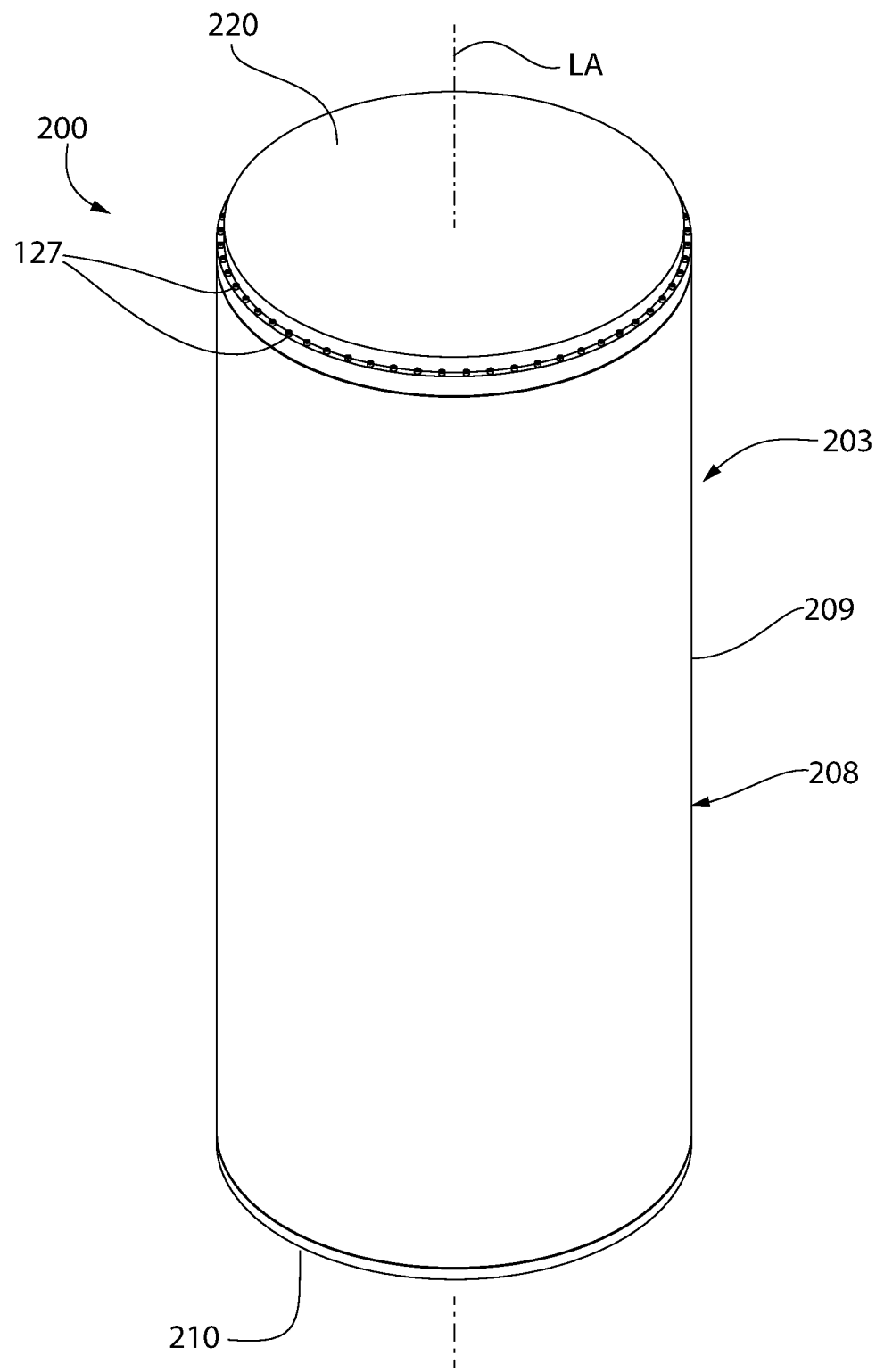
FIG. 15 is a top perspective view of a second embodiment of a canister and bolted lid.
Figure 16:
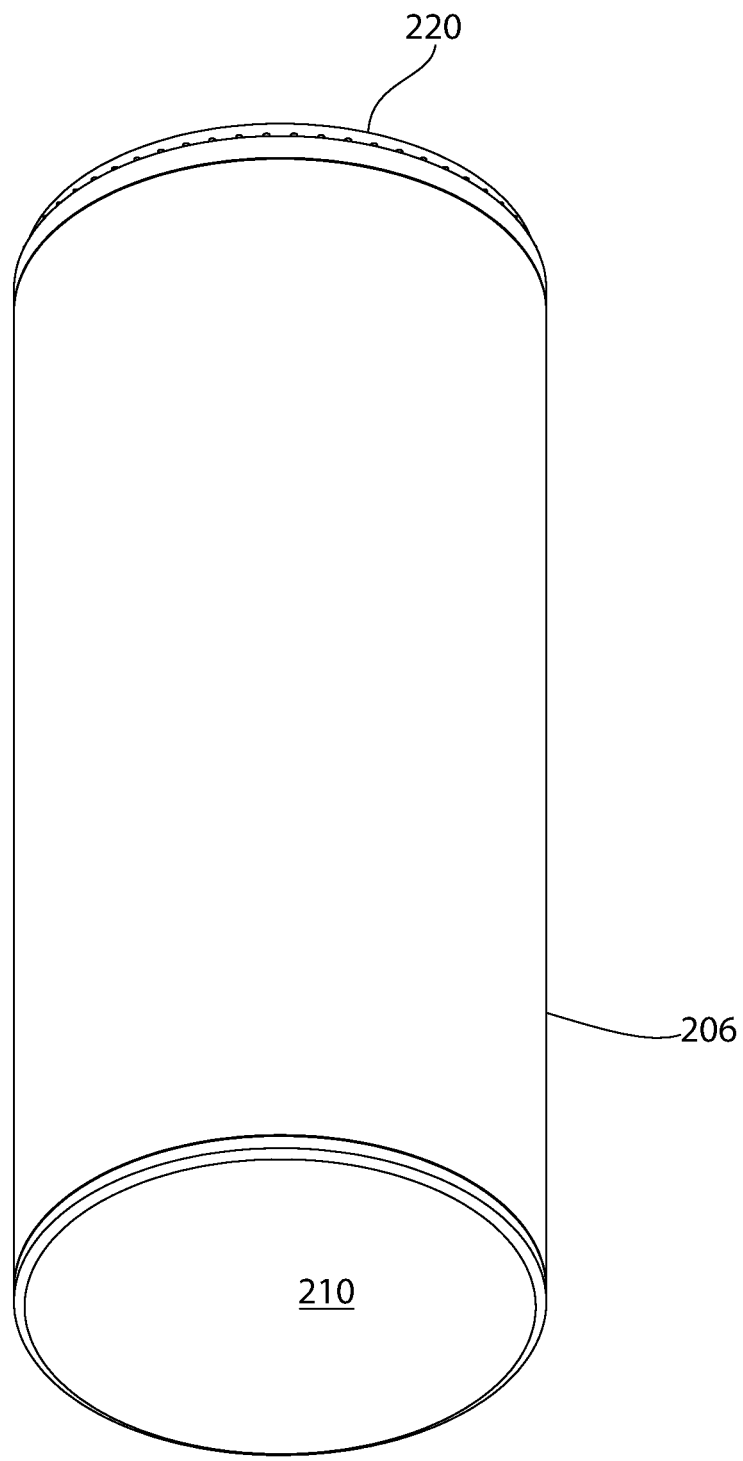
FIG. 16 is a bottom perspective view thereof.
Figure 17:
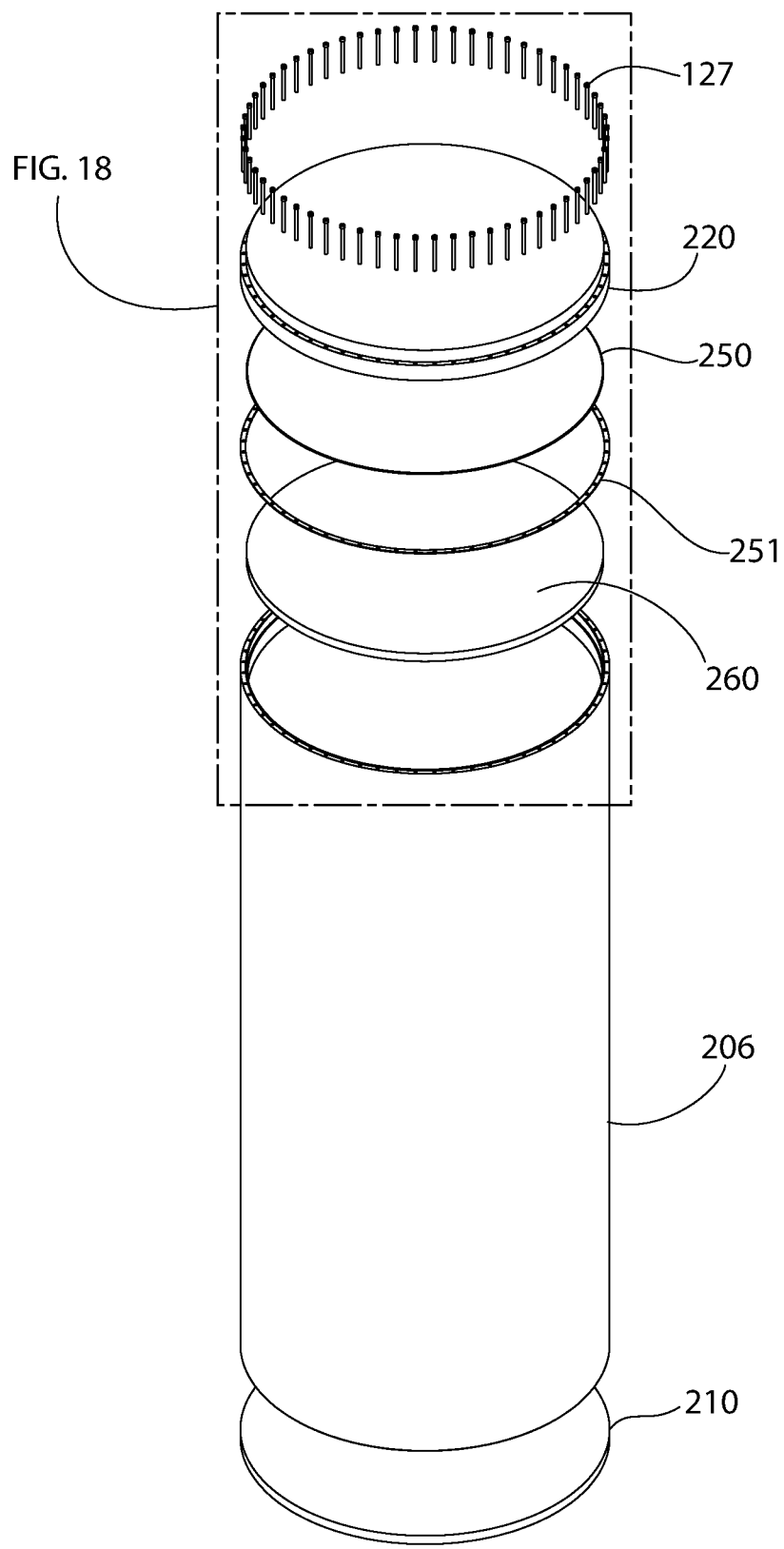
FIG. 17 is an exploded perspective view of the second canister.
Figure 18:
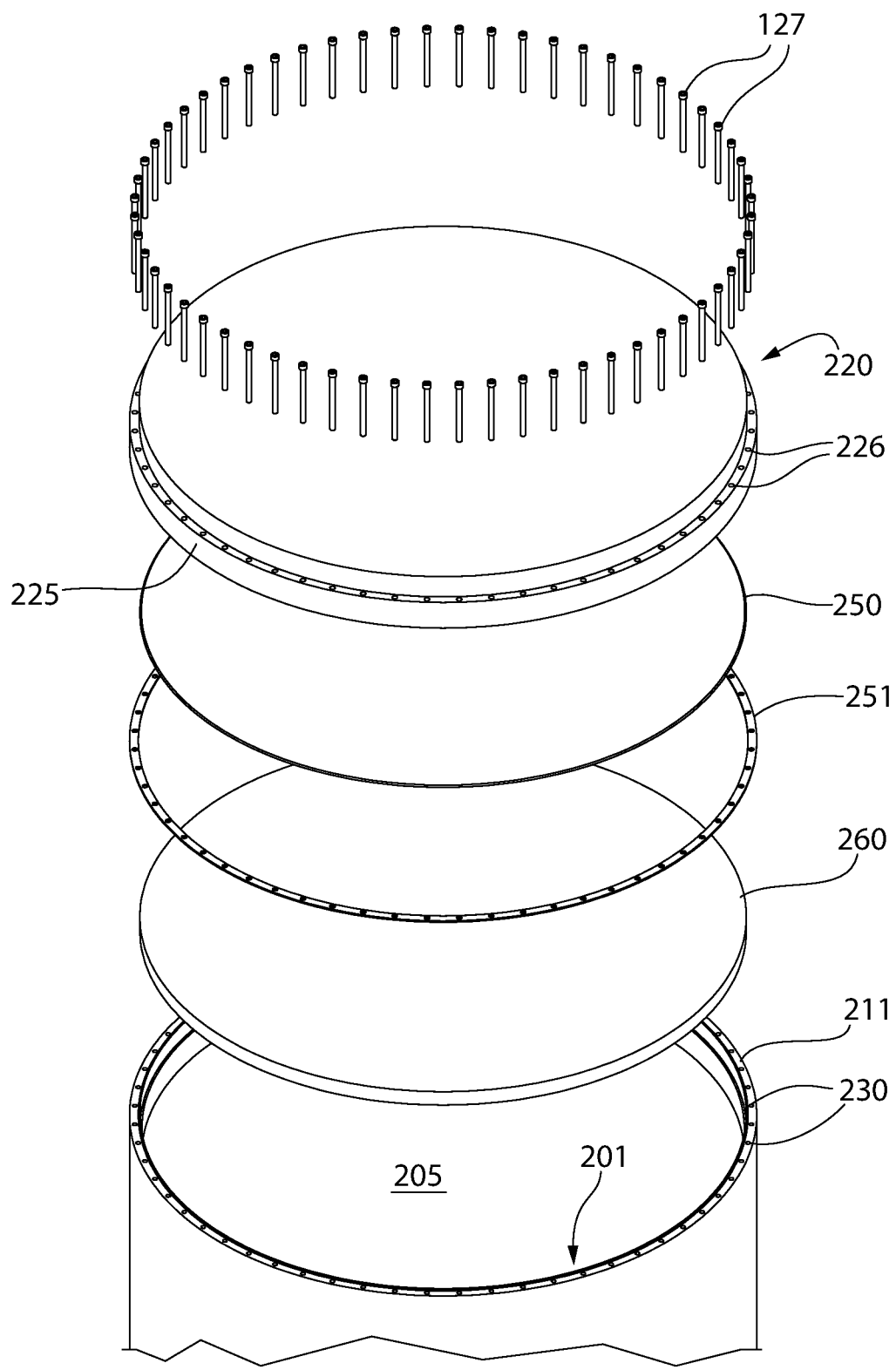
FIG. 18 is a detail view from FIG. 17.
Figure 19:
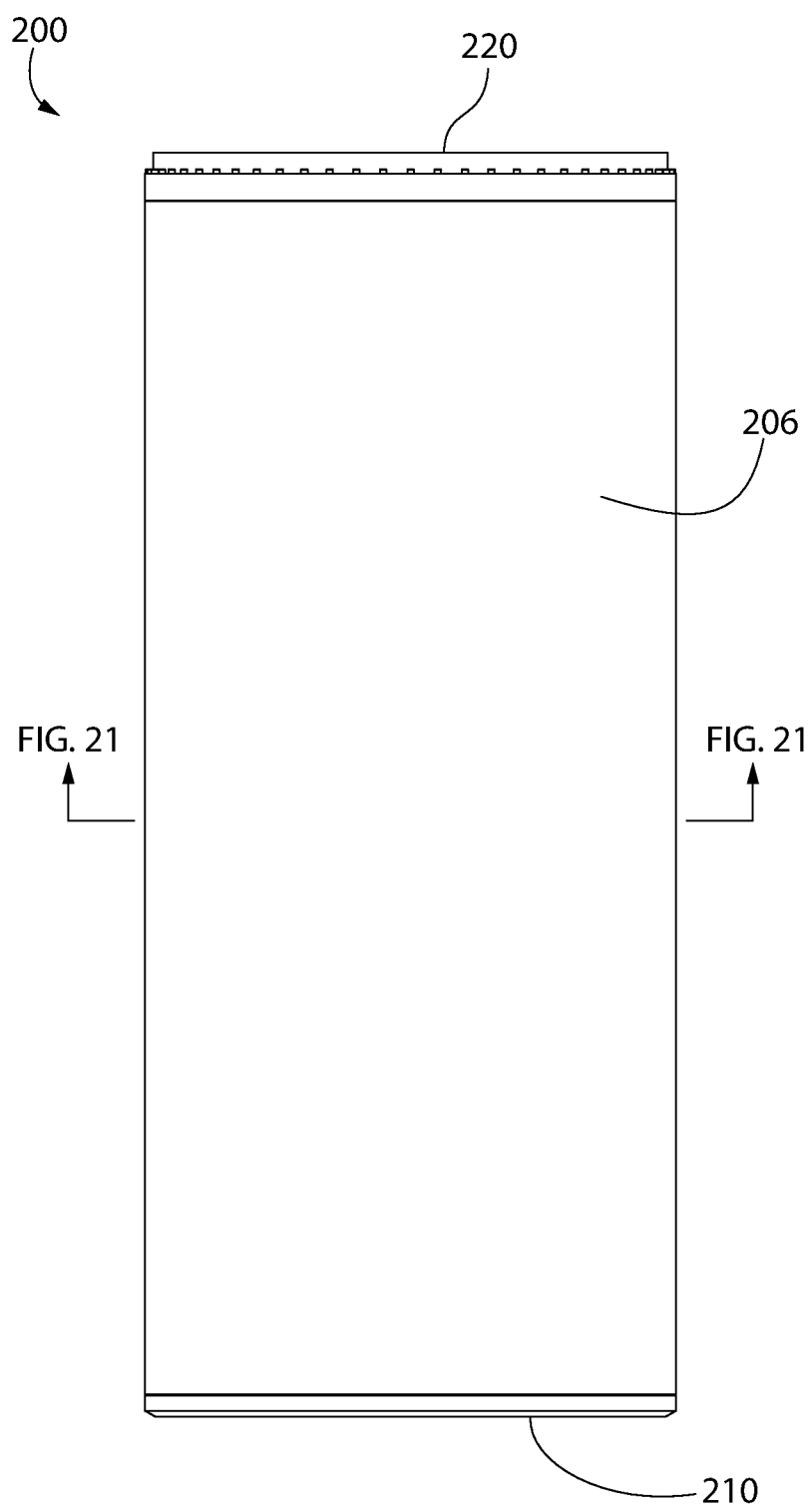
FIG. 19 is a side view of the second canister.
Figure 20:
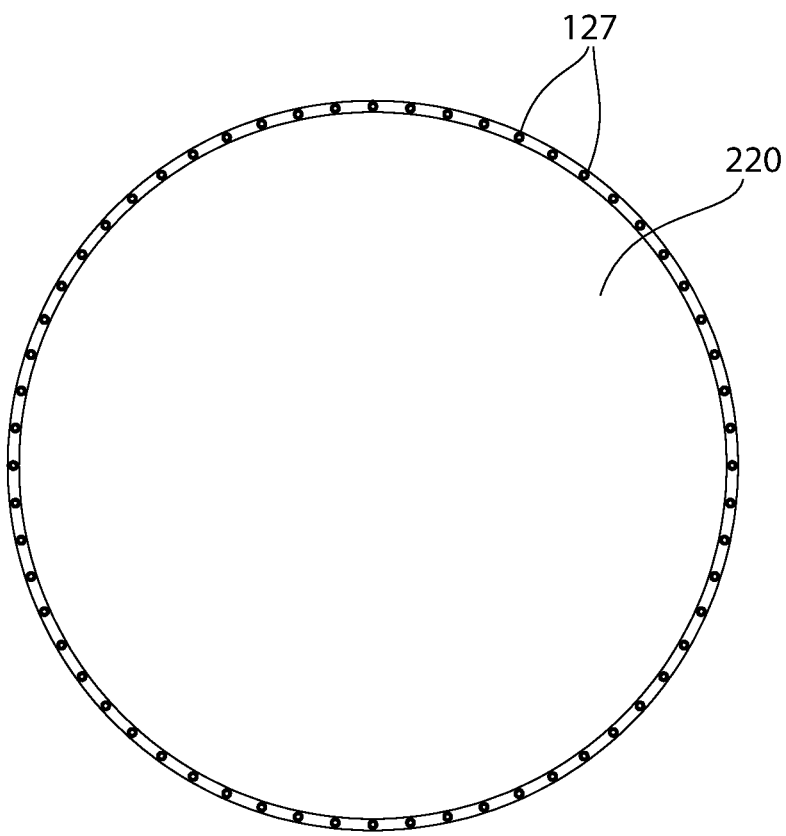
FIG. 20 is a top plan view of the second canister.
Figure 21:
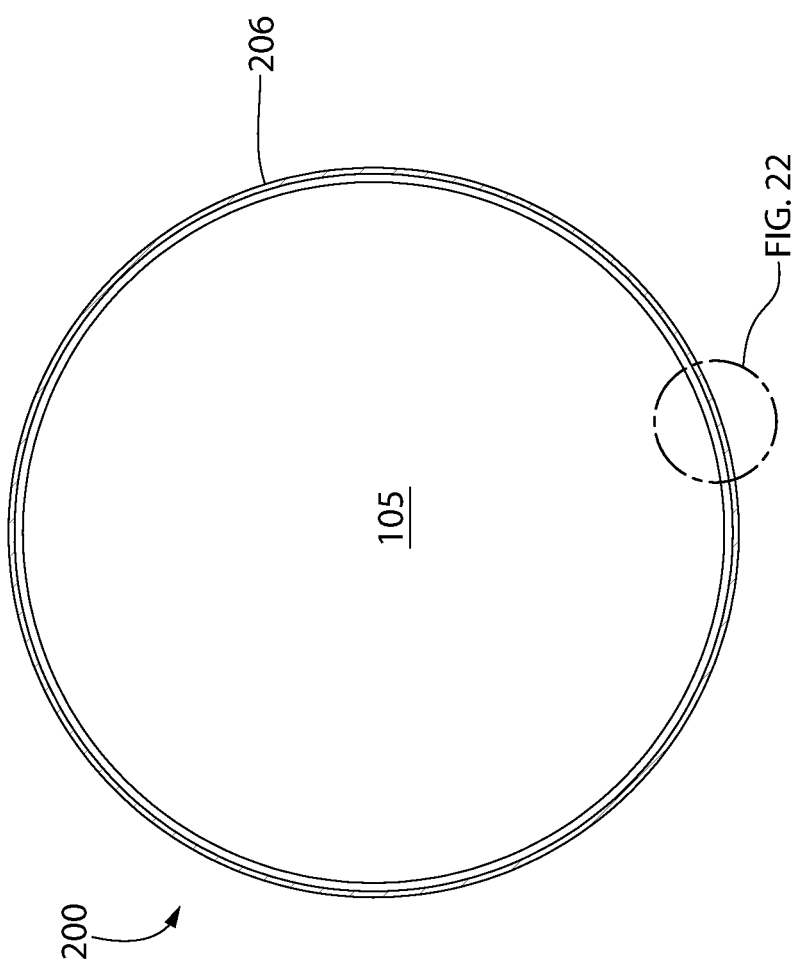
FIG. 21 is a transverse cross-sectional view taken from FIG. 19.
Figure 22:
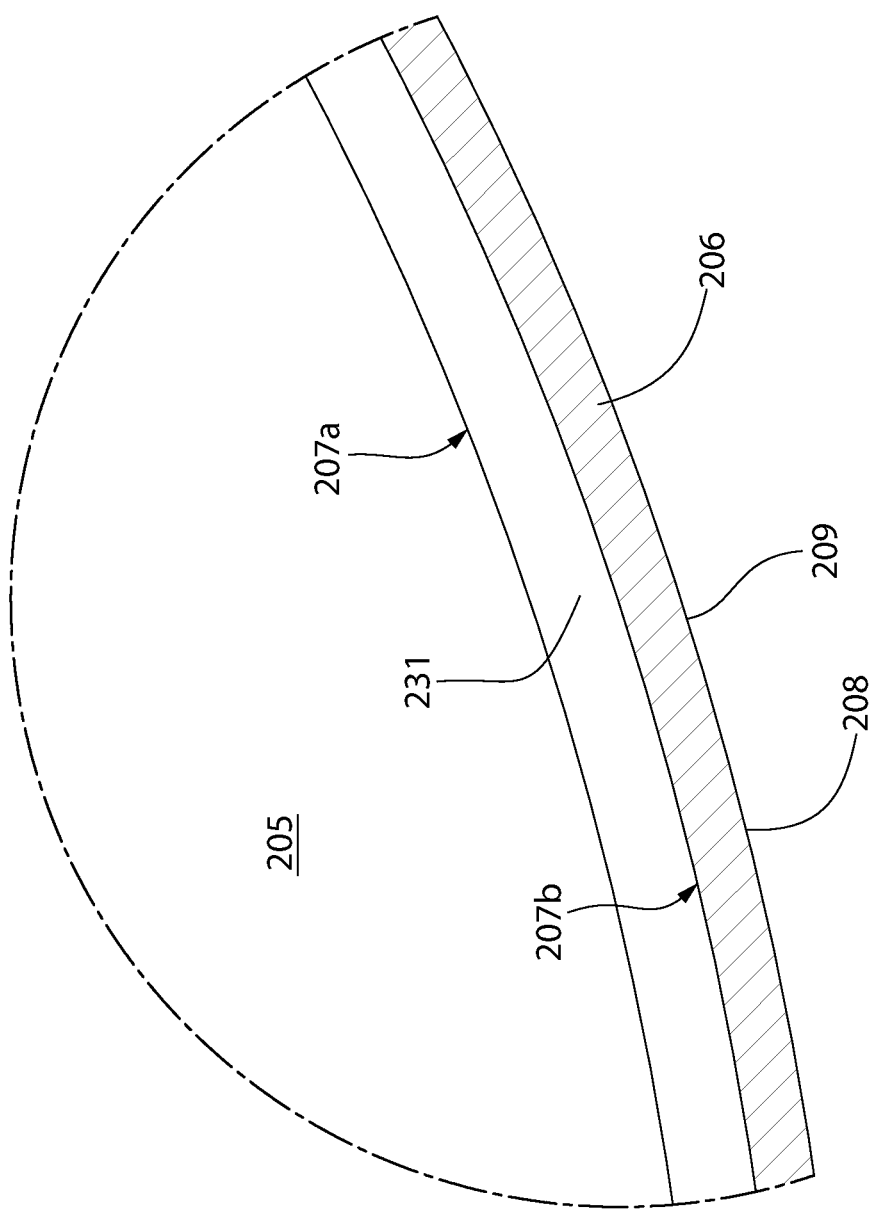
FIG. 22 is a detail view taken from FIG. 21.

The first embodiment of a top closure lid 120 variously seen in FIGS. 1-14 will now be described in greater detail. FIGS. 10-12 show the lid in larger detail.

Lid 120 may have a multi-stepped construction in one embodiment comprising a circular body including a top surface 121, bottom surface 122, an upper portion 123 adjacent the top surface, lower portion 124 adjacent the bottom surface, and an intermediate portion 125. Lower portion is configured for insertion into the upper portion of cavity 105 of canister shell 106 as shown. Accordingly, lower portion has an outside diameter D4 which is smaller than the inside diameter D3 of at least the top end 101 of shell 106 measured inside cavity 105.

Intermediate portion 125 protrudes radially outwards beyond the upper and lower portions 123, 124 and defines an upwardly and downwardly exposed portion thereby forming an annular mounting flange 125-1 which is part of the bolted lid-to-shell joint. The mounting flange has an outside diameter D5 which is larger than outside diameter D4 of lower portion 124 and inside diameter D3 of shell 106. Preferably, in one embodiment, diameter D5 is substantially the same as outside diameter D1 of the shell 106 measured proximate to the top end 101 of shell 106 such that flange 125-1 does not protrude substantially beyond the shell in the radial direction. This advantageously maintains the narrow profile and dimensions of the canister 100 which keeps the inside diameter of the outer overpack or cask 20 as smaller as possible. The canister thus has an overall and collective diameter (i.e. D5 and D1) commensurate with existing SNF canisters having seal welded lids. The underside (i.e. downward facing surface) of mounting flange 125-1 defines an annular sealing surface 125-2 configured to abut and seat on the top end of the shell when the lid is emplaced thereon (see, e.g. FIG. 11). The interface between the sealing surface 125-2 and top end 101 of shell 106 is preferably one of flat-to-flat.

Lid 120 further includes an annular step-shaped upper shoulder 177 at a transition between the intermediate mounting flange 125-1 and upper portion 123, and an annular step-shaped lower shoulder 128 at a transition between mounting flange and the lower portion 124. Lower shoulder 128 engages the inside edge of the top end of the shell 106 inside cavity 105 at to center the lid on the shell. Lower shoulder 128 further provides a sealing interface, as further described herein.

Mounting flange 125-1 comprises a plurality of longitudinal bolt through bores or holes 126 which extend completely through the flange. Bolt through holes 126 are configured for receiving the at least partially threaded shanks 127-1 of threaded fasteners which may be bolts 127 in one embodiment (see, e.g. FIGS. 10-12). Bolts 127 further have a diametrically enlarged tooling head 127-2 configured for engaging and applying a tool thereto to tighten or loosen the bolts. The underside of tooling heads 127-2 engage the upward facing surface of the mounting flange 125-1 (best shown in FIG. 11). Through holes 126 may be unthreaded in one preferred embodiment, but can be threaded in other embodiments. Top portion 123 may have any suitable outside diameter D6 which is smaller than diameter D5 of the intermediate portion 125/mounting flange 125-1 to provide access to the through holes 126 for inserting the bolts therethrough. The lid bolts preferably may be slender, for example about ½-inch diameter in some embodiments with long threaded length (e.g. at least 4 inches long). By using a greater number of smaller diameter slender bolts rather than few larger diameter bolts, the radial projection of the lid 120 may advantageously be kept to a minimum without adversely affecting the lid-to-shell hermetic seal and in turn minimizes the outside diameter of the canister 100.

Bolt through holes 126 are arranged perimetrically around the mounting flange 125-1 and spaced circumferentially apart covering a full 360 degrees of the flange. Preferably, through holes 126 are uniformly spaced apart to provide even sealing pressure around the entire perimeter of the closure lid 120 when the bolts are tightened. The centerline of through holes 126 each defines a bolt axis BA. The plurality of through holes 126 collectively fall on and define a bolt circle BC intersecting bolt axes BA and extending circumferentially around the mounting flange 125-1.

The top end 101 of shell 106 comprises a plurality of perimetrically arranged and circumferentially spaced apart threaded sockets or bores 130 formed in the top end of the body of the shell 106. Bores 130 are vertically oriented and upwardly open for threadably receiving and engaging the threads on shanks 127-1 of bolts 127. Preferably, at least the lower portion of bolt shanks 127-1 are therefore threaded. Bores 130 are blind bores meaning the bottom ends of the bores are closed (see, e.g. FIG. 11). Bores 130 fall on the bolt circle BC and thus may each be coaxially aligned with a bolt axis BA of lid through holes 126 by proper rotational positioning of the lid on the shell. The bores 130 are formed between the inner surface 107 and upper outer surface 108a of shell 106 in the annular mounting boss 132 of the shell which defines top fastening portion 131, as further described below.

To structurally reinforce the canister shell 106 for the bolting, the top end 101 of shell 106 is radially thickened to form an outwardly protruding annular mounting boss 132 integrally formed with the shell. Boss 132 extends around the entire circumference of the upper portion of the shell and vertically downwards from top end 101 of the shell 106. Boss 132 may be about 6 inches high in one non-limiting embodiment. The boss defines a top fastening portion 131 of the shell having a greater transverse wall thickness T1 (measured perpendicularly to longitudinal axis LA) than the wall thickness T2 of the portions of the shell below between the bottom end 102 of the shell and the fastening portion 131. This additional thickness provides extra purchase and structurally reinforces the top end of shell 106 for forming the threaded bores 130. In the illustrated embodiment, the annular mounting boss 132 may protrude radially outwards beyond the lower outer surface 108b of the lower portion of the shell 106 giving the shell a stepped outer surface 108. The lower outer surface 108b is thus recessed radially inwards from the upper outer surface 108a defined by the boss 132 such that outer surface 108a lies in a circular vertical plane which is offset and spaced farther away from the longitudinal axis LA of shell 106 than the lower outer surface 108b which lies in a different circular vertical plane (see, e.g. FIG. 11).

It bears noting that the mounting boss 132/fastening portion 131 of the canister shell 106 is distinct from merely forming a conventional radially projecting flange on the top end of a shell used in bolted head flanged joints in which the shank of the fastener projects completely through mating flanges and a nut is threaded onto the bottom exposed shank portion. By contrast, the present mounting boss 132/fastening portion 131 of shell 106 is a substantially taller/higher thickened portion at the top end of the shell as shown in FIG. 11 which provides the important function of structurally reinforcing the shell for forming the threaded blind bores 130, not merely for accommodating a bolted lid-to-shell joint. Accordingly, embodiments of the present mounting boss 132/fastening portion 131 preferably have a height measured parallel to longitudinal axis LA which is greater than at least three times its radial/transverse wall thickness T1, and some embodiments greater than at least five times.

The radially offset between the upper outer surface 108a and lower outer surface 108b of the canister shell 106 defines an outwardly open annular recess 141 extending a full 360 degrees around the circumference of the shell in preferred embodiments. The annular recess extends from the bottom of the mounting boss 132 to the bottom baseplate 110.

According to another aspect of the invention, the canister 100 may comprise a plurality of longitudinally-extending cooling fins 140 protruding radially outwards from the shell. This provides additional cooling surface area for dissipating the heat emitted by the SNF stored inside canister 100. The fins are arranged perimetrically around the entire circumference of the shell 106 and spaced circumferentially apart, preferably at regular intervals with uniform spacing therebetween. The fins have a vertical length which extends for a majority of the vertical length of the shell to maximize the effective heat transfer area of the canister. Fins 140 may be formed integrally with the shell as a monolithic unitary structural portion thereof using a thick plate stock for the shell machined to form the fins. A typical plate stock may be 1¼-inch thick with machined rectangular fins ¾-inch high by ½-inch thick space at a 1¼-inch pitch around the circumference of the canister shell 106. Alternatively, the fins 140 may be discrete structures welded to the outer surface 108 of the shell 106. Fins 140 may be longitudinally straight structures including opposing side major surfaces and a straight vertical longitudinal edge as shown. In one embodiment, the fins 140 may have a wedge-shaped transverse cross section in which the side major surfaces converge moving radially outwards (best shown in FIG. 14). In other possible, embodiments, the side major surfaces may be parallel to each other. In one preferably arrangement, the fins 140 may be disposed on the lower outer surface 108b of shell 106 below the enlarged mounting boss 132-fastening portion 131 of the shell. Fins 140 extend vertically from the bottom of mounting boss 132 to the bottom baseplate 110 of the canister.

In one preferred but non-limiting arrangement, the cooling fins 140 may be completely disposed within the outwardly open annular recess 141 of the shell 106. This protects the fins from damage during handling and transport of the canister and advantageously maintain the desired small outside diameter of the canister 100 for storage in the outer radiation shielded cask 20. Accordingly, in this embodiment, fins 140 do not protrude radially outwards beyond the upper reinforced fastening portion 131 (i.e. boss 132) of the shell 106. The fins further may additionally not protrude radially beyond the mounting flange 125 of lid 120. And in some embodiments, the fins may further also not protrude radially beyond the baseplate 110 of the canister 100 to maximize protection of the fins from structural damage during handling of the canister and minimize the radial projection of the fins to maintain the small canister diameter.

In one embodiment, the top ends of the fins 140 may abut the underside (i.e. downward facing surface) of the annular boss 132 (see, e.g. FIG. 11), or alternatively terminate proximate thereto without contact. The opposite bottom ends of the fins 140 may terminate at a point proximate to but slightly spaced above the baseplate 110 to provide access for circumferentially seal welding the baseplate to bottom end 102 of the shell (see, e.g. FIGS. 5 and 10).

For canisters containing a moderate heat load, its finned surface may be sufficiently effective to keep the peak fuel cladding temperature of the SNF inside the canister moderate (defined as <300 degrees C.) and thus advantageously permit the use of a less expensive inert gas such as nitrogen in lieu of helium, as the fill gas in the canister.

Any suitable metallic materials may be used for constructing the lid 120, shell 106, plate 108, and fins 140. In one embodiment, stainless steel may be used for corrosion protection. Welding-friendly copper-nickel alloys and duplex stainless steel are also acceptable materials.

The longitudinal fin 140 arrangement discussed above applies to vertically stored canisters such as in the HI-STORM storage system available from Holtec International. In storage systems that employ horizontally oriented canisters, the direction of the fin on the shell must be circumferential (preferably, helical) to effect improvement in heat rejection. Circumferentially oriented fins can also be effectively utilized to eliminate hide-out crevices formed at the junction of the horizontal canister and rails that support it.

FIGS. 10 and 11 show the lid 120 fully seated, bolted, and sealed to the top fastening portion 131 of canister shell 106. The outer surface 125-3 of the mounting flange 125 of lid 120 does not project radially outwards beyond the upper outer surface 108a formed by the top fastening portion 131 defined by the annular mounting boss 132 of the shell. Accordingly, surfaces 125-3 and 108a lies in the same circular vertical plane Vp. The longitudinal edges 142 of cooling fins 140 occupying the annular recess 141 on the shell 106 do not protrude radially outwards beyond the top fastening portion 131 or lid 120; the edges also lying in the same vertical plane Vp. Each mounting bolt 127 passes vertically through its respective bolt through hole 126 in the intermediate mounting flange 125 of the lid and directly threadably engages the shell via the threaded bores 130 formed through the upward facing annular end surface 111 at the top end 101 of the shell.

In order to keep the outer diameter of the canister assembly to minimum for providing the desired compact small profile lid construction which emulates existing small profile welded rather than bolted canister lids for packaging in radiation shielded outer overpacks such as cask 20 previously described herein, special spatial relationships are created by the present lid as shown in FIG. 11. The radial distance R1 between the longitudinal axis LA of canister 100 and bolt axes BA/bolt circle BC is less than both the radial distance R6 between upper outer surface 108a of shell 106 and axis LA, and radial distance R3 between outer surface 125-3 of lid mounting flange 125 and axis LA. Radial distance R1 however is greater than radial distance R5 between axis LA and inner surface 107 of shell 106, and radial distance R4 between axis LA and outer surface 124-1 of lid lower portion 124 inside shell cavity 105. Radial distance R1 is also greater than radial distance R7 between axis LA and outer lower surface 108b of shell 106. Radial distance R2 between longitudinal axis LA and outer surface 123-1 of lid upper portion 123 is less than R1, R3, and R6, but greater than R4 and R5 in one embodiment. R2 may be substantially the same as R7 in one embodiment.

By keeping the outer diameter of the canister as small as possible, the outer transport/storage cask 20 dimensions are advantageously minimized which reduces fabrication costs and facilitates handling the large heavy casks with lifting equipment.

To seal the lid 120 to shell 106, a pair of circumferential seals is provided including an annular inner seal 150 and annular outer seal 151. Inner seal 150 seals the lower portion 124 of the lid to the inner surface 107 of shell 106. A piston type seal arrangement may be provided as shown comprising an outward facing annular piston groove 152 formed in the outer surface 124-1 of lid lower portion 124 in which inner seal 150 is retained. When the lid 120 is placed on the top fastening portion 131 of the shell, the smaller diameter lid lower portion 124 is inserted into inside the upper portion of shell cavity 105. Inner seal 150 slides down along the inner surface 107 of the shell until the lid is fully seated on the canister.

The circumferential outer seal 151 seals the step-shaped lower shoulder 128 of lid 120 to the top annular end surface 108 of the shell 106. An annular groove 153 is formed at the innermost corner edge of end surface 108 which retains the outer seal 151. The inner and outer seals 150, 151 provide two independent high integrity leak barriers advantageously creating redundant protection against leakage of gaseous matter from inside the canister 100. Any suitable annular seals may be used. In one embodiment, the seals may be O-rings formed of a suitable sealing material such as without limitation flexible elastomeric materials.

FIGS. 15-25 depict a spent nuclear fuel (SNF) canister 200 with compact bolted lid according to a second embodiment of the present disclosure in further detail. SNF canister 200 is similar to canister 100. Similar parts will not be described in detail or numbered in the figures for the sake of brevity. There are some notable differences in design. For example, the shell 206 of canister 200 is substantially similar to shell 106 of canister 100 with exception that is does not have a step-shaped outer surface with annular recess. Instead, the inner surface of the shell is step shaped as further described below. In addition, canister 200 may be finless as shown, or alternatively may be equipped with external cooling fins if heat emitted by the SNF is considerable. Top closure lid 220 has a different configuration than lid 120 of canister 100; however, it retains the small profile bolted joint to the canister shell as further described below. In addition, lid 220 of canister 200 has a different sealing arrangement.

Referring now to FIGS. 15-25, canister 200 includes an elongated cylindrical body 203 comprising a single shell 206 including an open top 201, an open bottom 202, and sidewall 209 extending therebetween along a vertical longitudinal axis LA of the canister. Axis LA coincides with the geometric vertical centerline of the canister. Canister 200 further includes a bottom baseplate 210 and a top closure lid 220. In this finless embodiment of a shell 206, the baseplate preferably does not protrudes radially outwards beyond the lower portion of the shell to keep the outside diameter of the canister to a minimum for placement inside the outer radiation shielded overpack or cask 20. Shell 206 may be of monolithic unitary structure in one embodiment formed of a single material.

Shell 206 further includes an inner surface 207 and opposing outer surface 208. A longitudinally-extending fuel cavity 205 extends between the top and bottom ends 201, 202 of the shell along longitudinal axis LA. Cavity 205 is similarly configured to that of canister 100 to hold a conventional fuel basket 60 comprising a prismatic array of longitudinally-extending fuel storage cells 62, as previously described herein.

To structurally reinforce the canister shell 206 for the bolting, the top end 201 of shell 206 is radially thickened but in an inwards direction creates a uniform outer surface 208 but a step-shaped inner surface 207. This is dissimilar to shell 106 of canister 100 previously described herein which is radially thickened in an outward direction. Shell 206 therefore comprises an inwardly protruding annular mounting boss 232 integrally formed with the shell 206 at its top end 201. Boss 206 extends around the entire circumference of the upper portion of the shell. The boss defines top fastening portion 231 of the shell 206 having a greater transverse wall thickness T3 than the wall thickness T4 of the portions of the shell below between the bottom end 202 of the shell and the fastening portion 231. A plurality of upwardly open threaded bores 230 similar to bores 130 previously described herein are arranged and spaced circumferentially around the top end 201 of shell 206. Bores 230 penetrate upward facing annular end surface 211 of the shell.

Figure 23:
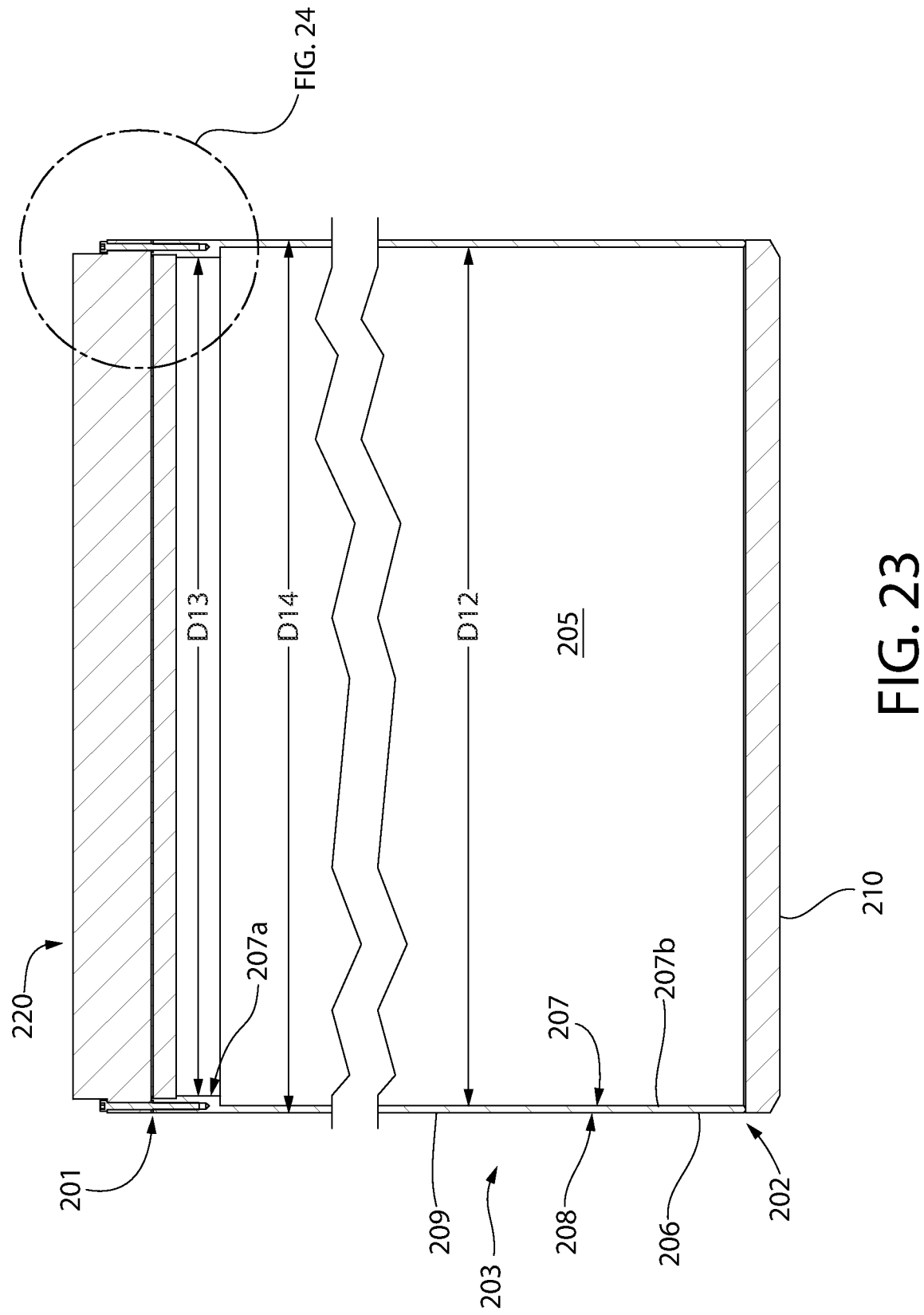
FIG. 23 is a side cross-sectional view of the second canister.
Figure 24:
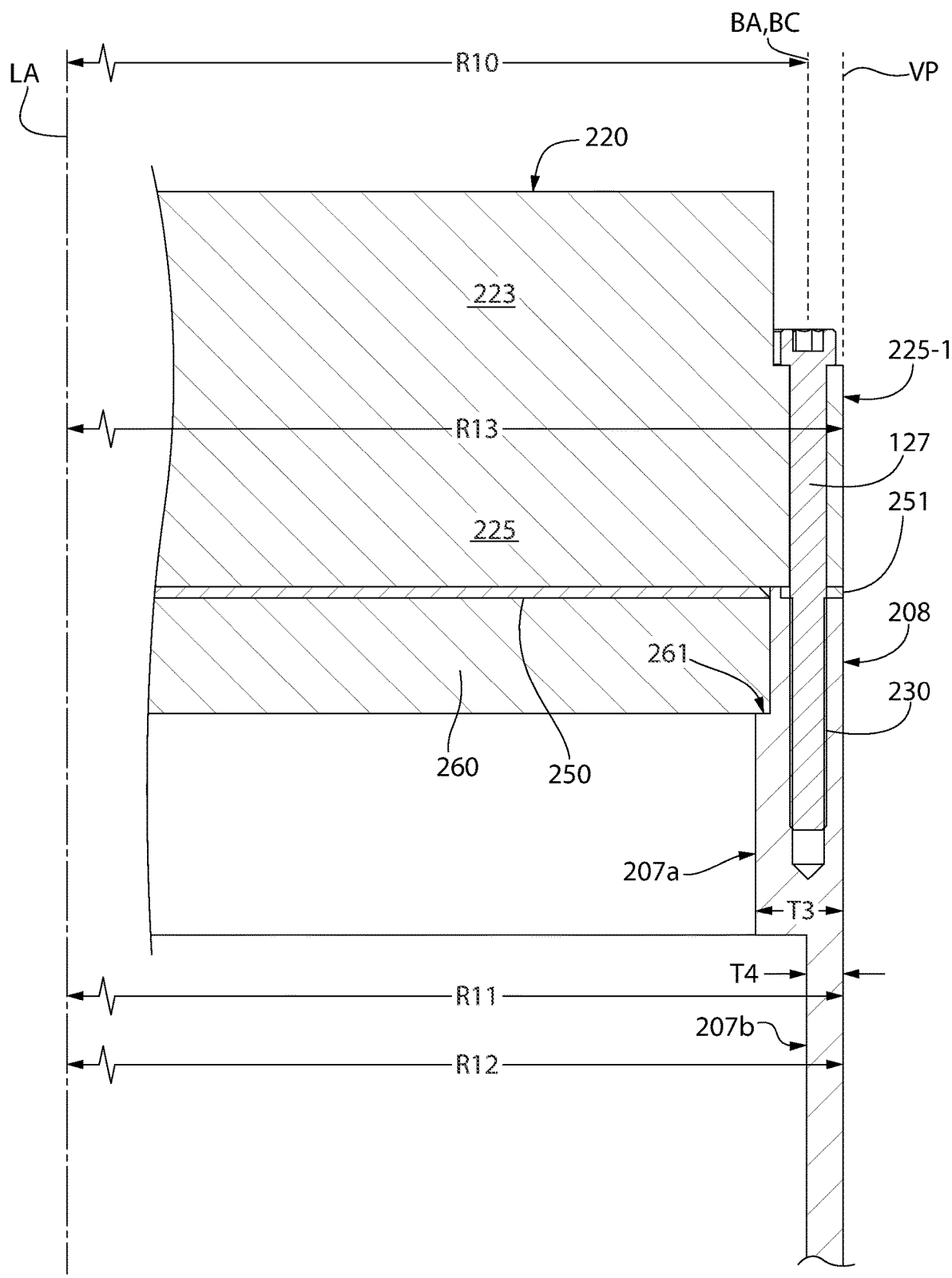
FIG. 24 is a detail view taken from FIG. 23.
Figure 25:
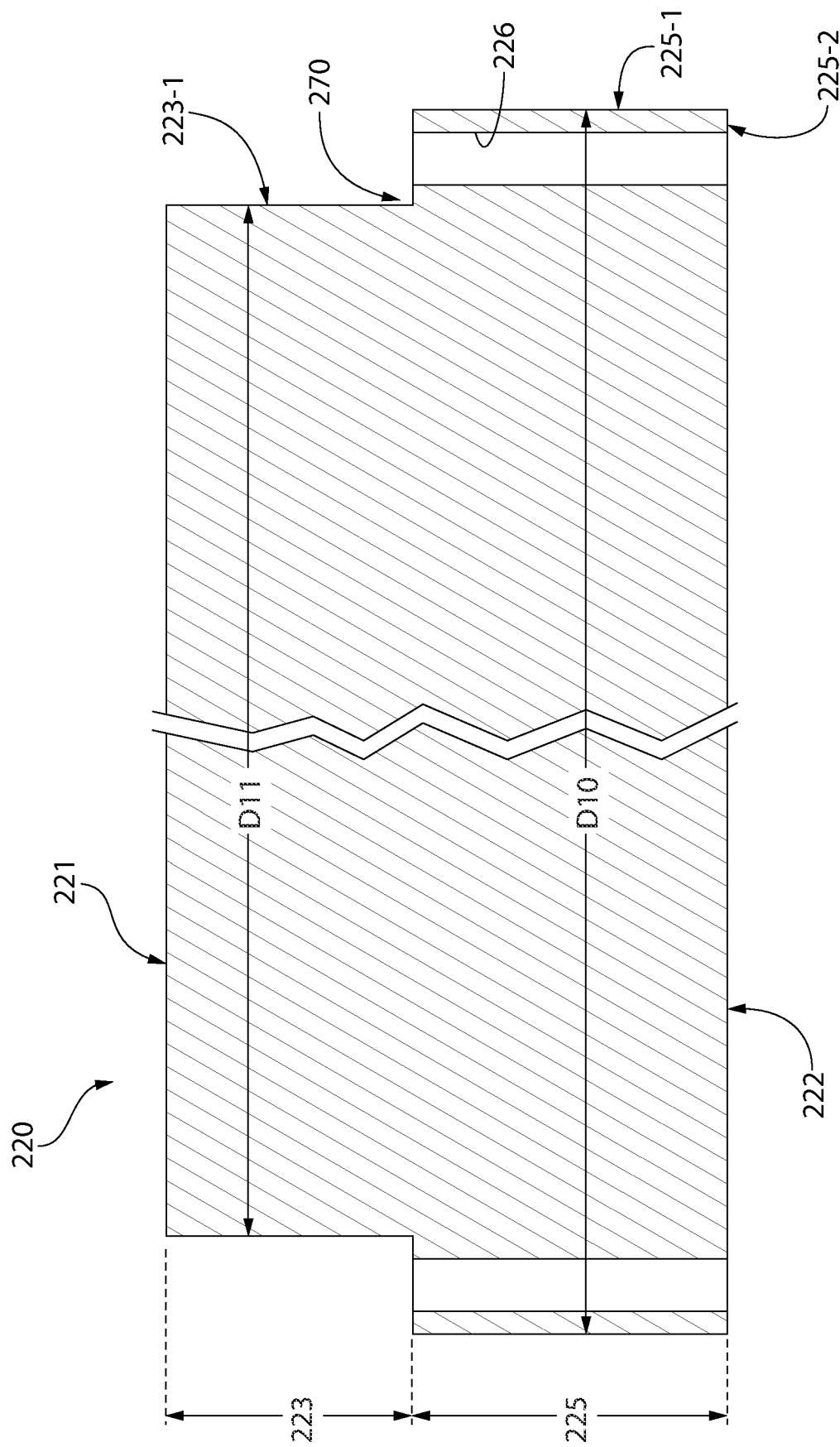
FIG. 25 is a side cross sectional view of the lid of the second canister.
Figure 26B:
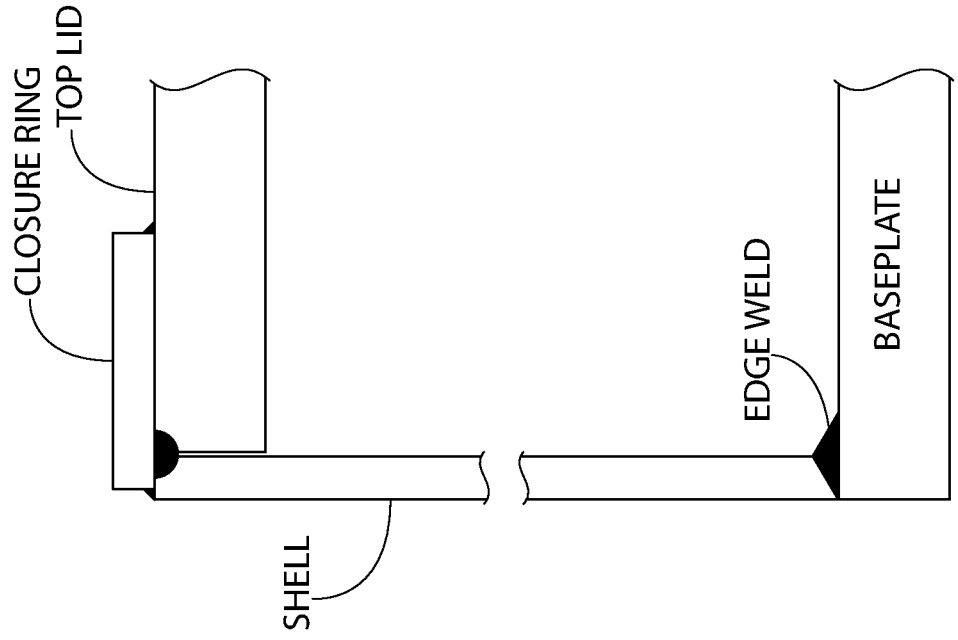
FIG. 26B is a view thereof showing an additional top partial closure ring.
Figure 26A:
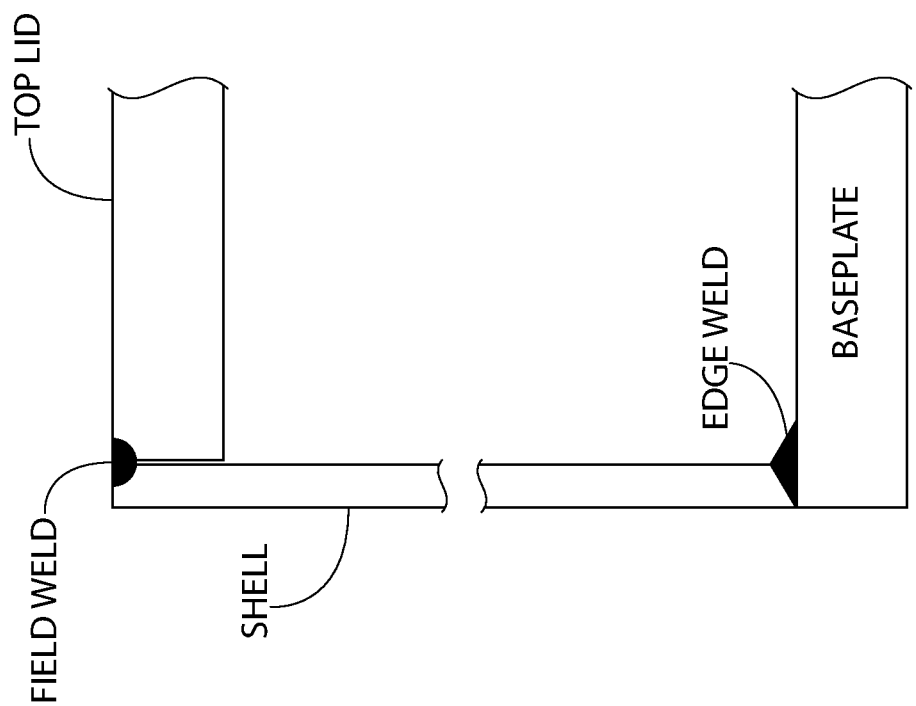
FIG. 26A is a cross sectional side view of a known nuclear waste material storage canister.

Referring particularly to FIGS. 23-25, the present lid 220 may have a stepped construction in one embodiment comprising a circular body including a top surface 221, bottom surface 222, an upper portion 223 adjacent the top surface, and a lower portion defining a radially protruding annular mounting flange 225 which is part of the bolted lid-to-shell joint. 124 adjacent the bottom surface, and in immediate portion 125. The mounting flange has an outside diameter D10 which is larger than outside diameter D11 of upper portion 223 of lower portion 124 and inside diameter D13 at the fastening portion 232 of shell 106. An annular step 270 is formed between the upper portion and mounting flange. Preferably, in one embodiment, diameter D10 is substantially the same as outside diameter D14 of the shell 206 such that flange 225 does not protrude substantially outwards beyond the shell in the radial direction. This advantageously maintains the narrow profile and dimensions of the canister 200 which keeps the inside diameter of the outer overpack or cask 20 as smaller as possible. The canister thus has an overall and collective diameter (i.e. D11 and D14) commensurate with existing SNF canisters having seal welded lids. The underside (i.e. downward facing surface) of mounting flange 225 defines an annular sealing surface 225-2 configured for positioning on the top end surface 211 of the shell when the lid is emplaced thereon (see, e.g. FIG. 24). The interface between the sealing surface 225-2 and end surface 211 is preferably one of flat-to-flat for accommodating annular outer seal 251. Seal 251 may be a planar self-energizing or raised face gasket in one embodiment that forms the outermost secondary confinement barrier to prevent gaseous products from leaking from the canister cavity 205 to the outer environment. Any suitable metallic or non-metallic seal material may be used.

In the present lid 220 design, it bears noting that no portion of the lid protrudes downwards into the top portion of the canister cavity 205 in contrast to lid 120 previously described herein. Instead, a circular disk-shaped shield plate 260 is provided which sits immediately down and inside the top end of the cavity 205 as shown in FIGS. 23-24. The circumferential peripheral edge of the shield plate 260 is supported by an upward facing annular support surface 261 defined by an annular step-shaped shoulder formed in the upper inner surface 207a of shell 206 proximate to its top end 201, but spaced vertically downward therefrom as shown. The support surface 261 is thus formed in the radially thickened upper fastening portion 232 of the shell. Shield plate 260 forms part of the primary containment boundary of the canister 200. The shield plate may be sealed by an inner seal which may comprise a circular disk-shaped diaphragm seal 250 disposed between the shield and bottom surface 222 of the lid 200. Both the shield plate and diaphragm seal may be formed of a suitable metallic material, such as stainless steel in one embodiment.

Canister 200 further includes Lid 120 further includes an annular step-shaped upper shoulder 127 at a transition between the intermediate mounting flange 125-1 and upper portion 123, and an annular step-shaped lower shoulder 128 at a transition between mounting flange and the lower portion 124. Lower shoulder 128 engages the inside edge of the top end of the shell 106 inside cavity 105 at to center the lid on the shell. Lower shoulder 128 further provides a sealing interface, as further described herein.

Mounting flange 125-1 comprises a plurality of longitudinal bolt through bores or holes 126 which extend completely through the flange. Bolt through holes 126 are configured for receiving the at least partially threaded shanks 127-1 of threaded fasteners which may be bolts 127 in one embodiment (see, e.g. FIGS. 10-12). Bolts 127 further have a diametrically enlarged tooling head 127-2 configured for engaging and applying a tool thereto to tighten or loosen the bolts. The underside of tooling heads 127-2 engage the upward facing surface of the mounting flange 125-1 (best shown in FIG. 11). Through holes 126 may be unthreaded in one preferred embodiment, but can be threaded in other embodiments. Top portion 123 may have any suitable outside diameter D6 which is smaller than diameter D5 of the intermediate portion 125/mounting flange 125-1 to provide access to the through holes 126 for inserting the bolts therethrough.

FIGS. 23 and 24 shows the lid 220 fully seated, bolted, and sealed to the top fastening portion 232 of canister shell 106. The outer surface 225-1 of the mounting flange 225 of lid 220 does not project radially outwards beyond the outer surface 108 formed by the top fastening portion 231 defined by the annular mounting boss 232 of the shell. Accordingly, surfaces 125-1 and 208 lie in the same circular vertical plane Vp. Each mounting bolt 127 passes vertically through its respective bolt through hole 226 in the mounting flange 225 of the lid and directly threadably engages the shell via the threaded bores 230 formed through the upward facing annular end surface 211 at the top end 201 of the shell. Shield plate 260 is recessed in the top end 201 of shell 206 inside cavity 205 such that the top surface of the shield plate does not protrude upwards beyond the top end 201 of the shell. The inner diaphragm seal 250 lies in the same horizontal sealing plane as the outer annular seal 251.

Special spatial relationships are created by the present lid 220 as shown in FIG. 24 to maintain the compact lid and canister profiles. The radial distance R10 between the longitudinal axis LA of canister 200 and bolt axes BA/bolt circle BC is less than both the radial distance R11 between outer surface 208 of shell 206 and axis LA, and radial distance R13 between outer surface 225-1 of lid mounting flange 225 and axis LA. R13 and R11 may be substantially the same providing a flush lid to shell transition and outer surfaces. Radial distance Radial distance R10 may be substantially the same are radial distance R12 between axis LA and the lower inner surface 207b of shell 206.

II. Inventive Concept 2

With reference to FIGS. 26A-35, a second inventive concept will be described.

Figure 28:
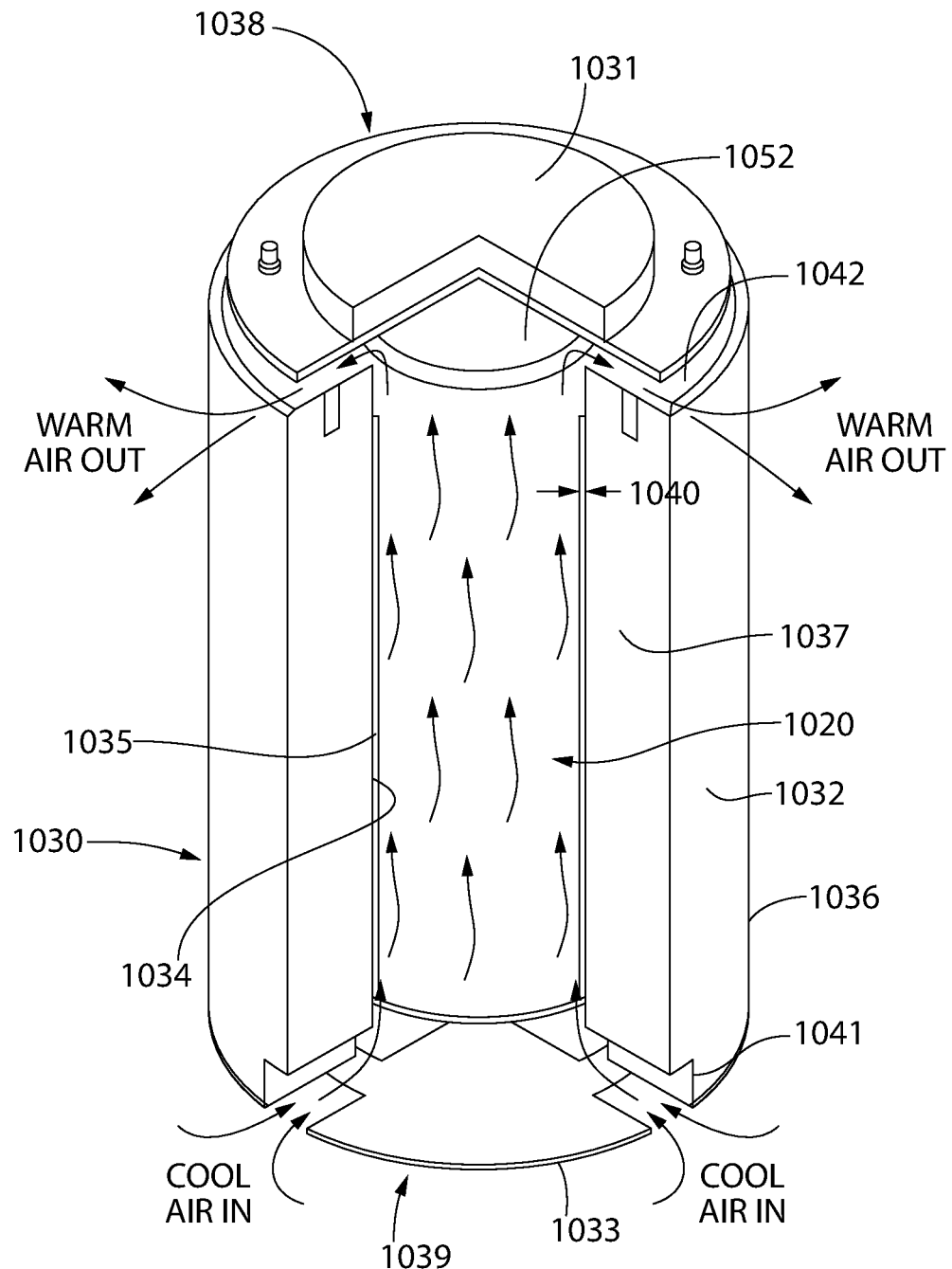
FIG. 28 is perspective view of a dry storage system according to the present disclosure comprising an inner canister for holding nuclear waste materials and an outer storage overpack or cask.

FIG. 28 shows a vertical dry storage system according to the present disclosure for long term storage of radioactive nuclear waste materials such as spent nuclear fuel (SNF) or other waste materials which may have been radioactively contaminated such as in a nuclear power generation facility. The dry storage system comprises an inner canister 1020 which is removably inserted inside an outer radioactively shielded storage overpack or cask 1030. The cask and canister are configured for upright vertical storage of the nuclear waste materials.

The storage cask 1030 is a heavy-walled steel and concrete cylindrical vessel having a composite construction comprising a cylindrical inner metal shell 1035, a cylindrical outer metal shell 1036, and a cylindrical intermediate concrete structure 1037 disposed between the metal shells. A removable lid 1031 closes the open top end 1038 of the cask 1030 and a bottom plate 1033 closes the opposing open bottom end 1039. The cask is a generally massive and heavy structure which absorbs the neutron and gamma fluxes emanating from the spent nuclear fuel (SNF) stored in the canister 1020. Cask 1030 defines an internal cavity 1034 extending between opposing top and bottom ends 1038, 1039 of the inner shell 1035 which is sized and configured to fit the canister 1020 therein.

Preferably, an annular gap 1040 is formed between the inner shells 1035 and the canister 1020 which provides a pathway for cooling air to flow upwards and remove heat generated from the radioactively decaying spent nuclear fuel inside the canister 1020. One or more circumferentially spaced apart cooling air inlets 1041 and cooling air outlets 1042 are formed at the bottom and top ends 1039, 1038 of cask 1030 which are in fluid communication with the annular gap 1040. In operation, air in the annular gap 1040 heated by the SNF inside canister 1020 flows upwards via natural circulation between the canister 1020 and cask 1030. The heated cooling air is discharged radially and/or upwardly outwards from the upper portion of the gap through the air outlets 1042, thereby drawing fresh ambient cool air radially and/or upwardly inwards through the air inlets 1041 into the lower portion of the annular gap 1040 (see directional cooling air flow arrows showing flow path).

Figure 29:
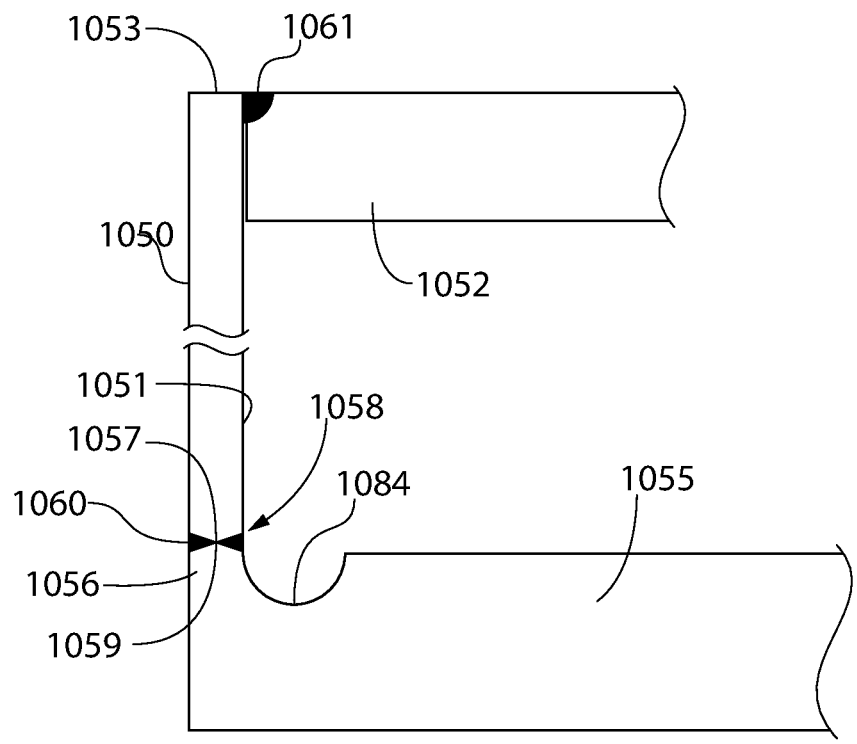
FIG. 29 is a partial side cross sectional view of welded joints in FIG. 28 between the shell of the canister and the base plate and top lid.
Figure 30:
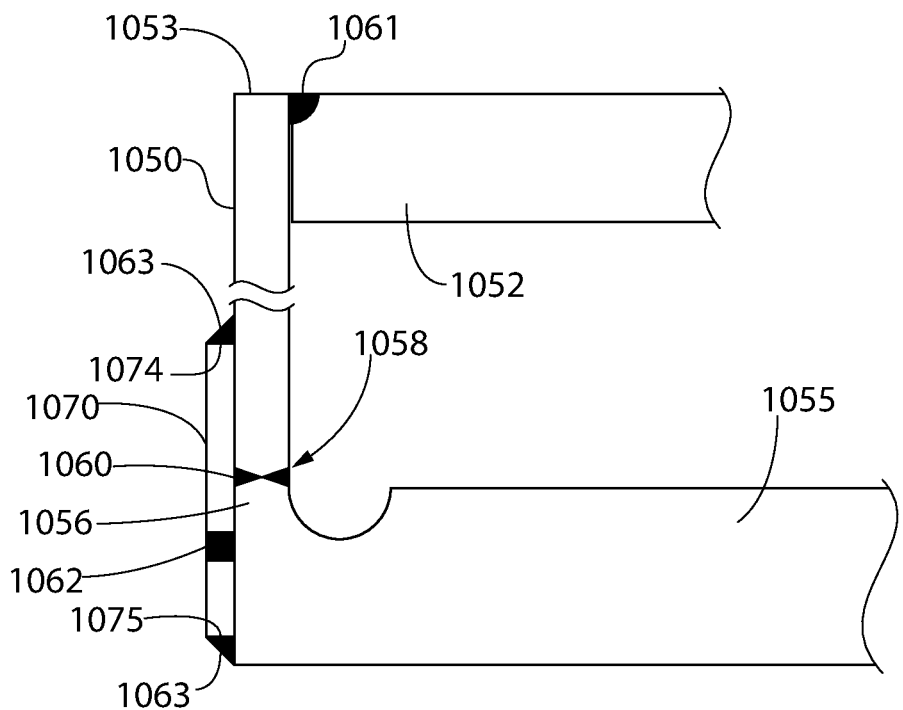
FIG. 30 is a side view thereof showing the addition of a partial secondary containment barrier in the form of an annular shell skirt.

Referring to FIGS. 28-30, canister 1020 has an elongated cylindrical hollow body comprising a tubular shell 1050 defining an internal cavity 1051 for storing nuclear waste material. A SNF basket such as disclosed in U.S. Pat. No. 5,898,747 (incorporated herein by reference in its entirety) may be disposed in the cavity to facilitate storage of the used fuel rods. A top lid 1052 is sealably attached to a top end 1053 of the shell 1050 and an end closure 1054 is sealably attached to an opposing bottom end 1057 of the shell. The lid and end closure preferably may be circular in shape to conform to the circular tubular shell. In some arrangements, the lid 1052 may be partially or completely received into the cavity 1051 through top end 1053 of shell 1050 as shown. The upwards facing top surface of the lid 1052 may therefore be flush with the top end of the shell in one implementation as best shown in FIGS. 29 and 30, or in other configurations may recessed therein or extend partially above the top end of the shell. The canister 1020 has a fully welded construction which hermetically seals the internal cavity 1051 storing the spent nuclear fuel therein.

In one embodiment, the bottom end closure 1054 of canister 1020 comprises a primary base plate 1055 and a peripheral upturned annular closure flange 1056 disposed on the annular peripheral area or portion of the base plate. The annular edge 1059 of the flange is horizontally orientated and defines an abutment edge 1059 having an end surface which faces upwards for forming a butt joint with the downward facing end surface of the bottom end of canister shell 1050, as further described herein. The edge 1059 of flange 1056 may be substantially flush with the top surface of the base plate 1055 in some embodiments as illustrated in FIGS. 29 and 30 lying the same horizontal surface plane. However, in other possible embodiments the flange 1056 may project upwards for a short distance beyond the horizontal plane defined by the top surface of the base plate 1055. Flange 1056 is preferably formed integrally with the base plate 1055 as a unitary structural part thereof so that there is a single annular joint between the shell 1050 and base plate. However, in other possible embodiments, the flange may be a separate component such as a ring welded to the base plate but with the same overall configurations as shown herein.

In one embodiment, the lid 1052 and base plate 1055 of canister 1020 may preferably be substantially thicker than the shell 1050 following standard construction approaches used to nuclear waste material dry storage canisters. The shell, lid, and bottom end closure of canister 1020 are preferably made of a suitable corrosion resistant metal, such as without limitation stainless steel including ferritic, austenitic (e.g. 316L and 317L), and Duplex (e.g. Alloy S31803 and S32205) stainless steels. Duplex stainless is a dual-phase stainless steel with a grain structure that comprises both ferrite and austenite. Other suitable metallic materials including boron containing metals may be used for fabricating the SNF storage canisters.

With continuing reference to FIGS. 28-30, a circumferentially-extending butt joint 1058 may be formed between the horizontally oriented edge 1059 of the peripheral annular closure flange 1056 and the bottom end 1057 of tubular shell 1050. A circumferentially-extending butt weld 1060 permanently hermetically seals and joins the bottom end closure 1054 to the shell of canister 1020. Advantageously, the standard corner joint configuration and partial thickness groove/edge welds used in prior canister shell/base plate junctions (see, e.g. FIG. 26A) are therefore replaced by the full thickness butt weld configuration which extends completely through the joint from interior to exterior as shown for example in FIGS. 29 and 30. The butt weld provides several benefits. First, the butt weld joint 1058 facilitates improved non-destruction examination (NDE) testing of the shell/base plate joint by such techniques as radiography and ultrasonic (volumetric) as may be required by government regulatory agencies. The integrity of prior art edge welds due to their geometric configuration of such joints are less amenable to NDE techniques used to identify possible subsurface irregularities or inclusions such as radiography and ultrasonic testing. In addition, the butt weld joint disclosed herein also helps minimize the residual stresses trapped in the weld which can serve as nuclei for stress corrosion cracking (SCC) in certain ambient environments.

The butt joint 1058 is preferably positioned proximate to base plate 1055. In one embodiment, a circumferentially-extending upwardly concave surface depression 1084 may be formed in the top surface of base plate 1055 between the base plate and annular closure flange adjacent to the annular flange 1056 and butt joint 1058 to allow the joint to be located as close as possible to the top surface horizontal plane of the base plate as in the illustrated embodiment of FIGS. 29 and 30. The edge 1059 of the annular flange and butt joint are therefore substantially flush in position with the top surface of the base plate 1055. The depression 1084 creates greater access to the interior side of the butt joint 1058 to facilitate both forming the butt welded joint and subsequent NDE of weld in such a closely coupled arrangement. In other less preferred but still satisfactory embodiments, however, the annular closure flange 1056 of bottom end closure 1054 may protrude upwards for a short distance above the top surface of the base plate 1055 (not shown) forming a sort of short vertical circular stub wall which is then butt welded to the bottom end shell 1050. Either arrangement may be used.

The annular peripheral edge of the top lid 1052 may be fully welded and hermetically sealed to the top end 1053 of the canister shell 1050 using any suitable type weld such as a groove weld 1061. In one embodiment shown in FIGS. 29 and 30, the weld 1061 which extends circumferentially around the entire top end of the canister may be a bevel groove weld as shown; however, other suitable types of groove or other welds may be used depending on the lid to canister interface configuration. It is well within the ambit of those skilled in the art to select an appropriate type of weld, weld filler material, and corresponding lid/shell edge profile as needed.

Because the lower portion of the canister 1020 exposed to the colder air is the most susceptible location to stress corrosion cracking (SCC) as discussed above, the present disclosure provides several techniques for mitigating the initiation or propagation of this failure mechanism. In vertical dry storage systems, the bottom end region of the canister 1020 is the problematic area for SCC since the coldest cooling air enters the outer overpack or cask 1030 at this location (see, e.g. FIG. 28).

For vertical dry storage canisters 1020, a double-walled/multi-walled canister construction may be used to combat SCC. The multi-wall canister, as the name implies, comprises designing the canister with two discrete sealed enclosures that are configured such that a thru-wall crack originating in one will not propagate into the other, thereby providing a redundant or back-up sealed shell to guard against possible radioactive contamination leakage from the canister. For this purpose, the two shells are preferably located intimately close to each other forming as extremely small interstitial space between them but are not physically bonded together by explosive or other techniques which would permit a crack originating in one shell to migrate into the next shell. As further described below, double wall shell construction geometry at various levels of enveloping the radioactive material confinement boundary are presented in the embodiments which follow.

Figure 27A:
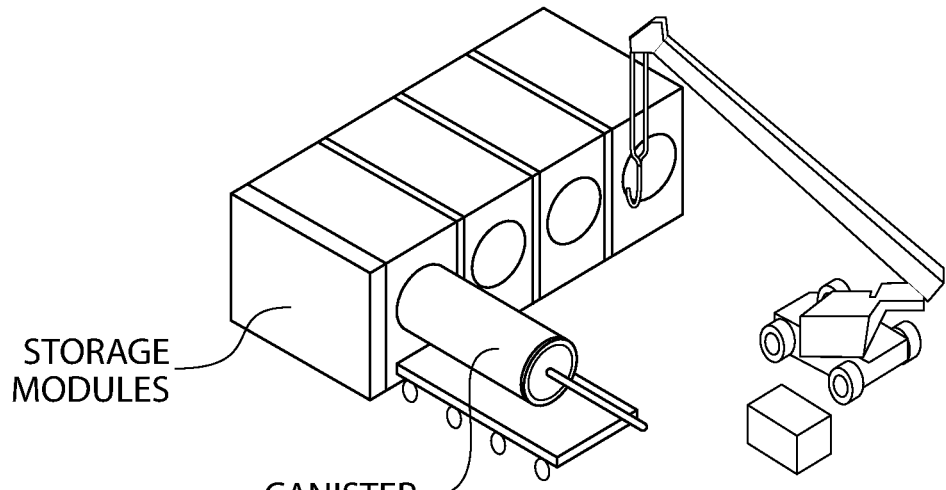
FIG. 27A is general schematic diagram of an existing horizontal dry storage system.
Figure 27B:
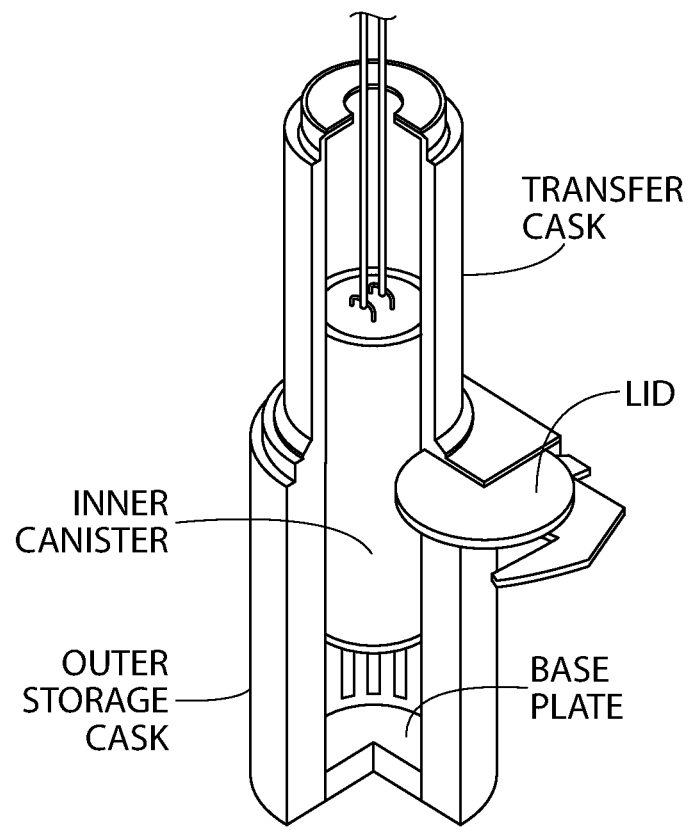
FIG. 27B is a general schematic diagram of a existing vertical dry storage system.

FIG. 30 depicts a first skirted multi-wall canister construction comprising partial double wall shell coverage for a vertical dry storage canister 1020 usable in the vertical dry storage system shown in FIG. 27B above. In this embodiment, a partial annular second outer shell skirt 1070 envelopes only a lower region or portion of the inner shell 1050 to target the coldest area of the canister 1020 as a final containment barrier. Skirt 1070 extends around the full circumference of the shell 1050. Preferably, the skirt 1070 has a height less than the full height of the inner shell 1050, and more preferably less than or equal to half the full height of the inner shell. The skirt 1070 has an arcuate concave shape which conforms to the diameter and geometry of the inner canister shell 1050. In one embodiment, a plurality of welds are used to hermetically seal the outer shell skirt 1070 to the lower portion of the inner shell 1050. This may include a plurality of circumferentially spaced apart plug welds 1062 formed around the skirt to secure it preferably to the base plate 1055 of the canister 1020 which has a greater material thickness than the inner shell providing a more robust connection. The annular-shaped top end 1074 of the shell skirt 1070 may be sealed to the inner shell 1050 via a full circumferential fillet weld 1063. The annular-shaped bottom end 1075 of the skirt may be sealed to base plate 1055 via another full circumferential fillet weld 1063. Other types of welds may be used in other embodiments. The outer shell skirt 1070 is hermetically sealed to the inner shell 1050 to form a secondary pressure retention boundary corresponding to the extent of the inner shell covered by the skirt.

Figure 35:
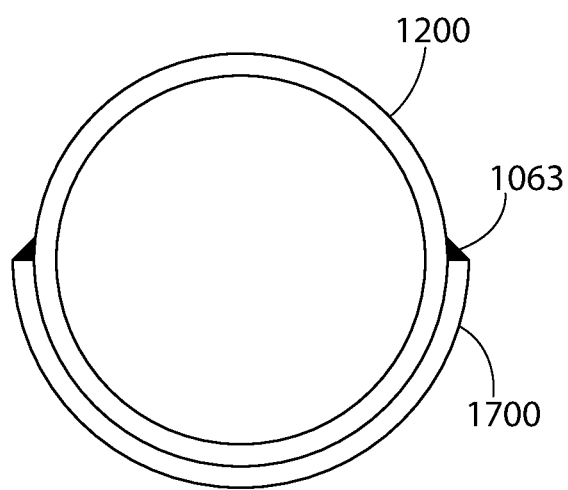
FIG. 35 is an end view of a horizontal canister having a partial shell skirt on a lower portion of the canister shell.

FIG. 35 shows a partial coverage shell skirt 1700 adapted for a horizontal dry storage canister 1200 such as those used in the horizontal dry nuclear waste material storage system shown in FIG. 27A above. The skirt 1700 has a concave shape which conforms to the diameter and geometry of the storage canister shell. The skirt 1700 has a circumferential extent less than the fully circumference of the inner shell 150 and preferably a length at least coextensive with the length of the inner shell. In one embodiment, the skirt 1700 may cover the entire lower half of the canister 1200 as shown, or in other embodiments a greater or less circumferential extend of the canister shell. Fillet welds 1063 or other suitable welds may be used to hermetically seal the outer shell skirt 1700 to the canister 1200.

Figure 31:
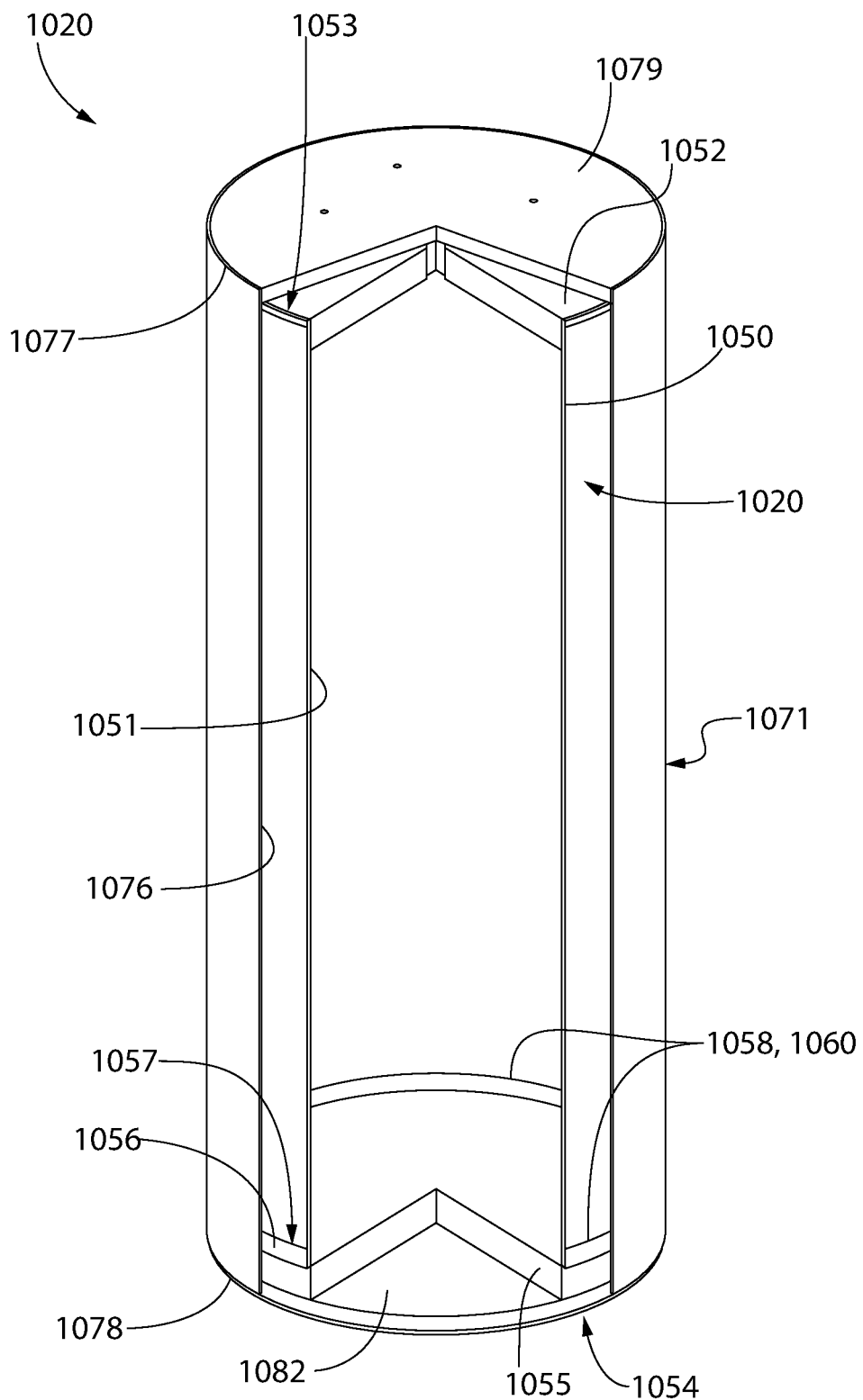
FIG. 31 is a perspective breakaway view of a double-walled canister system comprising an inner canister and outer shell assembly forming a full coverage secondary containment barrier encapsulating the inner canister.
Figure 32:
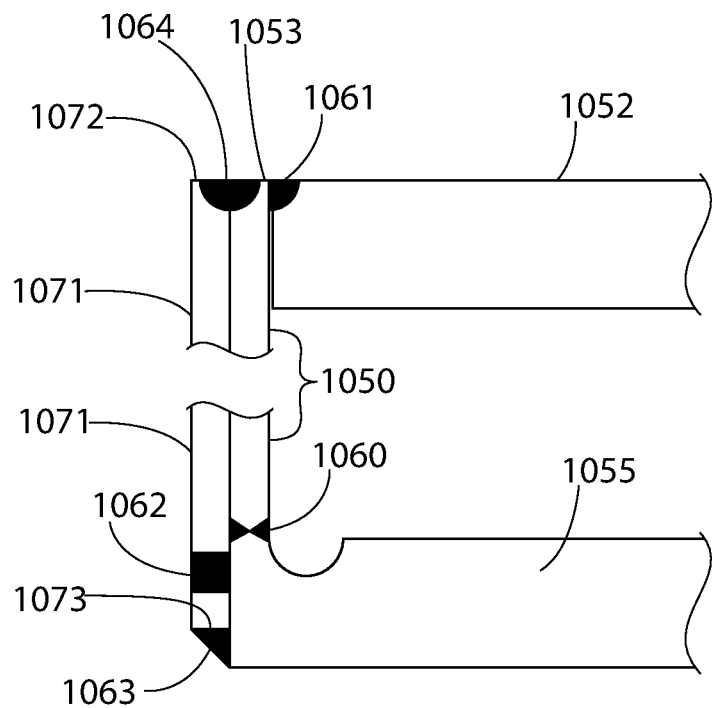
FIG. 32 is a partial side cross sectional view of welded joints used in a canister system having a double-walled shell and single top lid.
Figure 33:
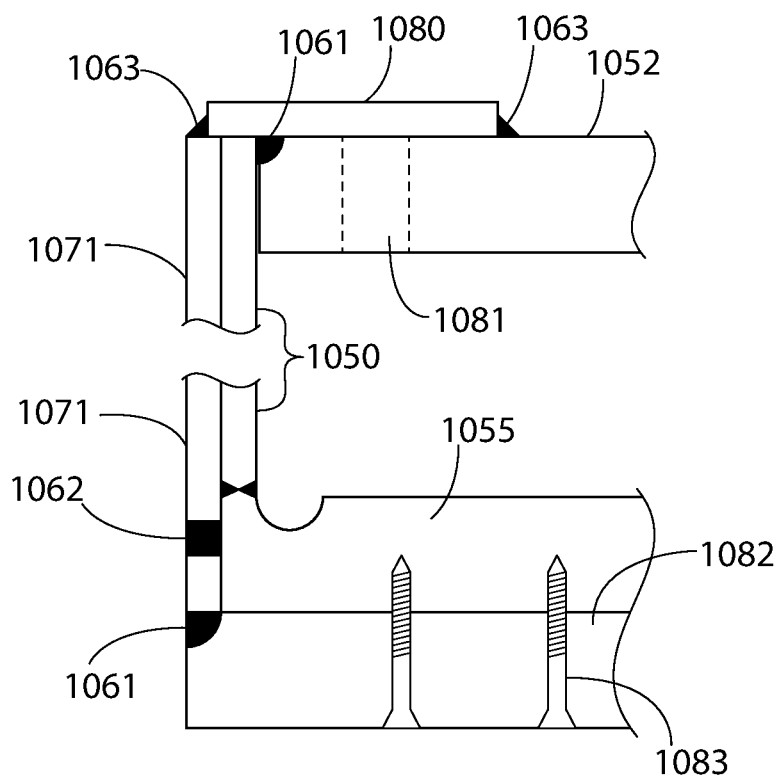
FIG. 33 is a partial side cross sectional view of FIG. 32 showing the addition of a secondary base plate, optional partial closure ring on top, and optional stay fastener supporting the second base plate.

FIGS. 31-34 depict examples of a more complete coverage multi-wall canister construction each commonly comprising a complete double wall shell system as a starting point. In the embodiment of FIGS. 33-33, a tubular second outer shell 1071 adjoins and envelopes the entire inner shell 1050 for at least the full height of the inner shell 1050 extending from at least the top end 1053 to bottom end 1057 of the inner shell. The outer shell 1071 defines an internal cavity 1076 configured and dimensioned to hold inner shell 1050. Outer shell 1071 is preferably in very close proximity to the inner shell 1050 as much as practicable to minimize the size of any annular interstitial space formed therebetween to minimize the amount of air trapped therein which may be evacuated and filled with an inert gas.

Outer shell 1071 has a greater height than the inner shell 1050 in one embodiment such that the lower end of the outer shell extends below the lower end of the inner shell for welding to the base plate 1055 of the inner shell. The top ends of the inner and outer shells 1050, 1071 may be at the same elevation or height as shown. The annular-shaped top end of the outer shell 1071 may be sealed to the inner shell 1050 via a full circumferential groove weld 1064 between the top ends 1072, 1053 of the outer and inner shells, respectively. The annular-shaped bottom end 1073 of the outer shell 1071 may be sealed to base plate 1055 via the same plug welds 1062 and full circumferential fillet welds 1063 described above (see, e.g. FIG. 32). Other types of welds may be used in other embodiments. The outer shell 1071 is hermetically sealed to the inner shell 1050 to form a secondary pressure retention boundary corresponding to the full extent of the inner shell 1050 covered.

Full shell and base plate coverage may be provided in an alternative embodiment of a multi-wall canister 1020 as shown in FIGS. 32 and 33. In this configuration, the primary base plate 1055 welded to primary inner shell 1050 may be covered/enclosed and protected by a secondary base plate 1082 welded to the secondary outer shell 1071. This embodiment includes a single primary top lid 1052. Optionally, the top lid 1052 may also include annular closure ring 1080 as already described above. The outer secondary base plate 1082 adjoins and completely covers the downward facing bottom surface of the inner primary base plate 1055 being in very close proximity thereto. The interstitial space between the inner and outer boundaries of the shells 1050, 1071 and base plates 1055, 1082 may be evacuated and filled with an inert gas (e.g. helium or nitrogen). The outer shell 1071 may be hermetically sealed to the secondary base plate 1082 by a circumferentially-extending suitable weld such as a groove weld 1061. In this embodiment, the bottom end 1073 of outer shell 1071 may be coextensive with the bottom surface of the inner base plate 1055 as shown in FIG. 33.

In the embodiment of FIG. 33, an annular top closure ring 1080 may optionally be welded to the top lid 1052 and top ends 1072, 1053 of the inner and outer shells 1050, 1071, respectively. Any suitable type of weld may be provided. In one embodiment, a full circumferential fillet weld 1063 may be provided on the inner and outer sides of the closure ring 1080 to hermetically seal the ring to the canister 1020. The ring 1080 preferably has a sufficient width to cover and closes all through-ports 1081 or other apertures that extend completely through the lid into the cavity 1051 of the canister which may be used to evacuate air from and dry the interior of the canister during the canister drying process described above.

In some embodiments, the secondary base plate 1082 may optionally be buttressed by a plurality of stay fasteners 1083 of any suitable type, as shown in FIG. 33. Fasteners 1083 extend completely through the outer base plate 1082 and only partially into the inner base plate 1055 to a depth which provides sufficient purchase to secure the fasteners in thereto. In one embodiment, threaded fasteners such as bolts or screw may be used to reinforce the attachment between the inner and outer base plates 1055, 1082. The stay fasteners may be necessary if the secondary base plate 1082 and its junction with the outer shell 1071 are not structurally sufficient to withstand the internal pressure under the hypothetical scenario in which the inner confinement shell is assumed to have developed a through leak. This forms a secondary or backup pressure retention barrier.

Figure 34:
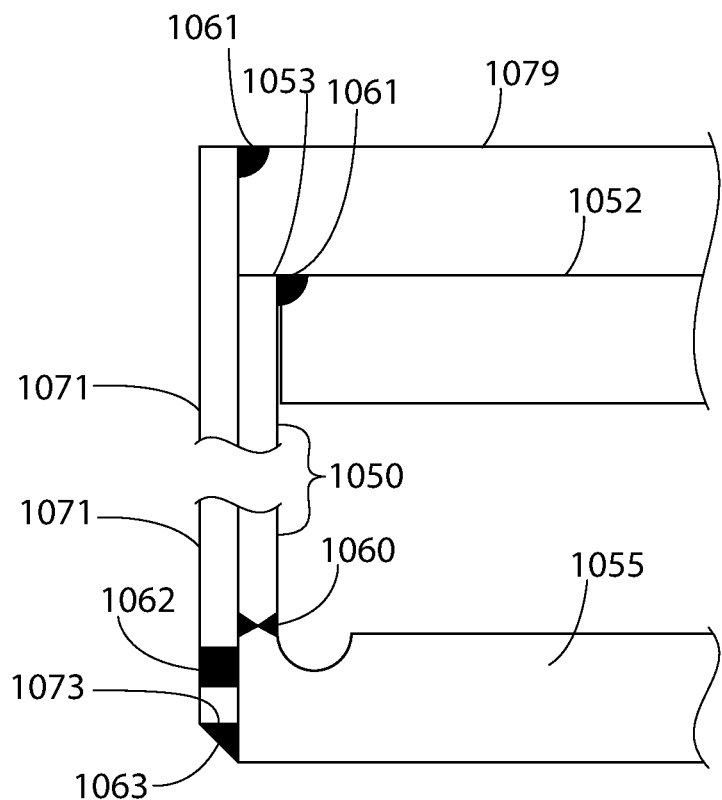
FIG. 34 is a partial side cross sectional view of welded joints used in the canister system of FIG. 31 having a double-walled shell and secondary top lid.

In an alternative embodiment and variation of the multi-wall (double shell) canister construction shown in FIGS. 31 and 34, complete top, bottom, and side confinement boundary coverage may be provided for the inner shell, its base plate, and its bottom closure assembly. This configuration envisages surrounding the entire primary confinement boundary of canister 1020 formed by inner shell 1050 by a complete secondary confinement boundary. An outer secondary top lid 1079 is sealably welded along its peripheral edge to the top end 1077 of the outer shell 1071, which thereby fully covers and encloses the top lid 1052 on the inner shell 1050. A full circumferential groove weld 1061 may be used to seal the lid 1079 to the shell 1071 (see, e.g. FIG. 34). The top lid 1079 is preferably in close proximity to the top lid 1052. In this construction, the outer shell 1071 extends above the top end 1053 of the inner shell 1050 (see, e.g. FIG. 31) in contrast to the arrangement without a secondary top lid 1079 in which the ends of the inner and outer shells are flush with each other (see, e.g. FIGS. 32 and 33). The primary base plate 1055 at the bottom end of the inner shell 1050 is already covered and enclosed by the secondary base plate 1082 as described herein.

As a further defense-in-depth measure, the interstitial space between the two walls of the inner and outer shells 1050, 1071 in the foregoing multi-wall constructions may be evacuated and filled with an inert gas such as without limitation helium or nitrogen. It also bears noting that whether a partial or full outer shell is provided for a multi-wall canister 1020, the cavity 1034 of the outer storage cask 30 is still sized to insert and accommodate the canister therein in a manner which maintains the annular gap 1040 between the canister and cask for natural convective cooling.

It will be appreciated that any of the foregoing double-walled or skirted canister assembles may be stored in the overpack or cask 1030 shown in FIG. 28 by sizing the cavity 1034 appropriately to accommodate the larger diameter portions of the double-walled or skirted canisters. It will also be appreciated that all welds disclose herein with the exception of plug welds 1062 are full circumferential welds extending completely around the canister and its shell, lids, or base plates as applicable to form a fully hermetically sealed pressure boundaries.

III. Inventive Concept 3

With reference to FIGS. 36-43, a third inventive concept will be described.

To devise the remedial measures, it is important to recognize that the weld seams in the canister are locations of the highest tensile stress. The through-thickness welds extending from the interior to exterior of the shell plates or sheets made to join the shell courses, as explained later, are intrinsically vulnerable locations where the stress field on the surface is severely tensile. Predictably, these locations are prime candidates for initiation of stress corrosion cracking (SCC). The proven method to deal with this problem is surface "peening" which involves applying concentrated impulsive pressure on the target surface to create a layer of compressive in-plane stress which serves as an armor against nucleation of SCC sites under a sustained exposure to salt air. However, surface peening can only produce a compressive layer to a limited depth in the shell base material such as for example as deep as 4 mms which, as test data shows, may be generally adequate to protect against SCC in many ambient environments. In certain harsh marine environments, however, peening alone may be not provide sufficient protection and service life.

Although surface peening can be used as a generally effective means to make the stress field in the welded region compressive over its external surface in the weld zone subsequent to the manufacturing of the canister, the techniques presented in this disclosure can be used as supplemental to peening or as stand-alone measures to further enhance protection against SCC and extend the service life of the MPC and other weldments.

Figure 36:
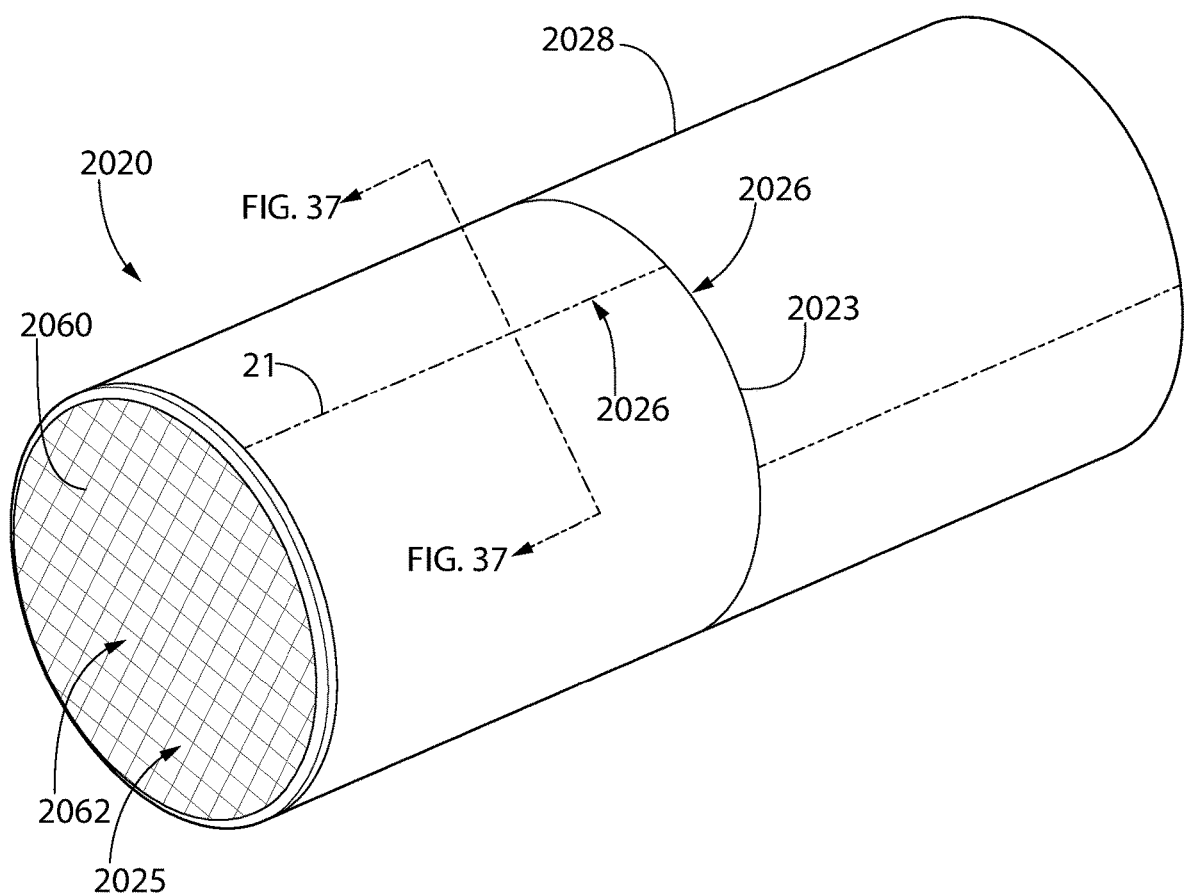
FIG. 36 is a perspective view of the shell weldment of a nuclear waste canister for storing spent nuclear fuel.
Figure 37:
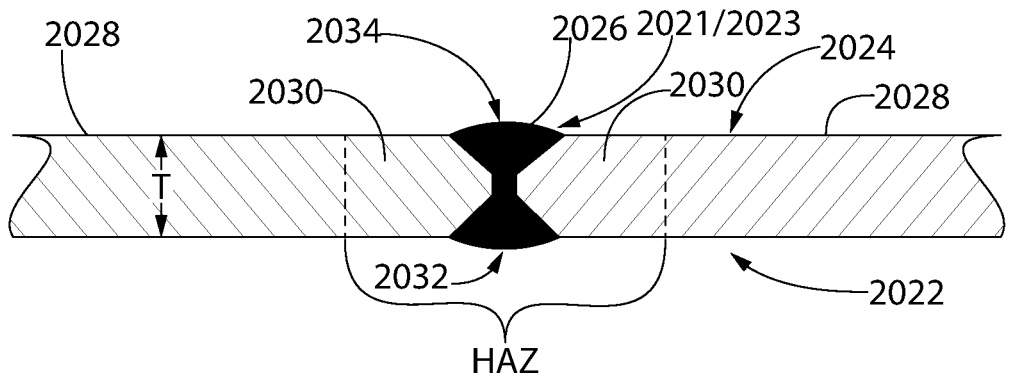
FIG. 37 is a cross-sectional view taken through line FIG. 37-FIG. 37 in FIG. 36 of a first type of full thickness butt weld used to form the shell.

Referring to FIGS. 36 and 37, the method or process for fabricating a welded spent nuclear fuel (SNF) canister 2020 to mitigate or postpone the onset of SCC begins with first forming the circumferential and/or longitudinal welds 2026 at the seams or joints in the shell 2028 of the SNF canister. The shell 2028 of a nuclear waste canister 2020 is generally formed from plates or sheets of stainless steel such as austenitic stainless steel having a thickness T. As shown, the shell 2028 of canister 2020 may typically be a welded structure formed from a plurality of linearly stacked cylindrical shell courses or segments welded together at circumferential joints 2023. Each shell segment may in turn be a welded component including one or more longitudinal joints 2021 at which opposing longitudinal ends or edges of the shell segment are welded to seal the segment. The welds 2026 used for joining sections of the shell at either the longitudinal joints 2021 or circumferential joints 2023 are full thickness through welds extending from the interior surface 2022 of the canister to the exterior surface 2024. The term "exterior surface" means the surface of the weldment that will be exposed to a corrosive halide or chloride environment that has the potential for initiating SCC. The canister shell 2028 has a cylindrical shape that defines an interior space 2025 configured for holding a fuel storage basket 2060 having a multiplicity of open cells 2062 that hold the spent nuclear fuel assemblies, as is well known in the art. Spent fuel canisters having such basket structures are disclosed in commonly-owned U.S. Pat. No. 9,748,009, which is incorporated herein by reference in its entirety. All canister butt welds 2026 are preferably hermetically sealed welds to prevent escape of radioactive contaminants to the outer environment from nuclear fuel stored inside the canister 2020.

The first measure proposed herein to mitigate the onset of SCC is selecting a type of weld 2026 and/or forming the weld in a manner that minimizes the heat input to the shell 2028. This will reduce the size of the heat affected zone (HAZ) which creates the initiation sites for SCC due to the tensile stresses created in the HAZ resulting from heating the shell base material during the welding process. FIG. 37 shows a conventional double bevel joint or double V-groove butt weld that may be used with aspects of the present invention and process for forming a welded SNF canister. The weld seam or joint shown may be longitudinal or circumferential joint 2021 or 2023. Two opposing shell ends or edges 2030 are shown in spaced apart relationship forming an open weld joint 2021 or 2023. The joint thus formed may be linear in one embodiment (see, e.g. FIG. 36) whether longitudinally or circumferentially extending. The edges 2030 may be substantially coplanar and parallel to each other (allowing for shop fabrication dimensional tolerances) to form a generally uniform gap therebetween for receiving the weld material deposited by a consumable welding rod, wire, or electrode (not shown). In FIG. 37, the shell end weld preparations for welding are configured to create a profile that forms a standard double V-groove as shown.

Figure 38:
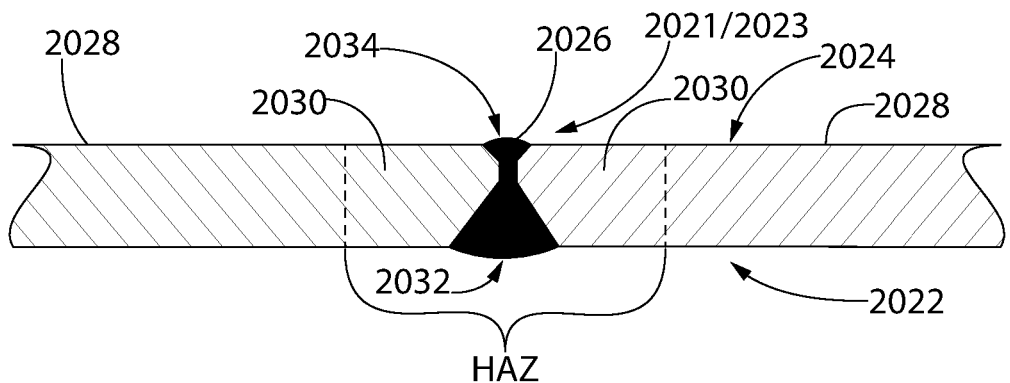
FIG. 38 is a cross-sectional view taken through line FIG. 37-FIG. 37 in FIG. 36 of a second type of full thickness butt weld used to form the shell.

According to one aspect of the present invention, if a double bevel joint or double V-groove weld is used as shown in FIG. 37, the bevel at the interior surface 2022 of the shell 2028 preferably may be made larger instead and the bevel at the exterior surface 2024 may be made as small as possible when the joint is welded. FIG. 38 shows such a configuration. The enlarged interior weld mass 2032 of the weld is noticeably larger than the enlarged exterior weld mass 2034. Advantageously, this reduces the heat input during the welding process to make the smaller exterior weld bevel, thereby resulting in smaller tensile stress field in the HAZ on the exterior which is the potential initiation site for SCC that is exposed to the corrosive salt-laden marine environment. As opposed to the completely symmetrical shell weld end preparations of the standard double V-groove weld shown in FIG. 37, the end preparations in FIG. 38 are asymmetrical such that the exterior V-groove is smaller than the interior V-groove for receiving the weld material.

In conjunction with formation of the asymmetrical double V-groove weld shown in FIG. 38, the weld 2026 at the joints 2021 or 2023 is preferably made from the outside first followed by the weld from the inside. This is opposite to the standard practice used in welding cylindrical vessels, which seeks to minimize welding inside confined spaces. Accordingly, the exterior weld mass 2034 is formed first followed by the interior weld mass 2032. Therefore, this welding sequence which is the obverse of the welding sequence in FIG. 37 will minimize the tensile stress in the outer surface and the associated heat affected zone (HAZ). The interior weld may be ground flush after formation. A small convex weld crown left on the outside may be left for further mechanical work to further mitigate the onset of SCC, as further described herein. Preferably, the welding process is performed to avoid angular distortion of the workpiece. It bears noting that in all applicable embodiments describe herein, the interior and exterior weld masses 2032, 2034 are joined in the intermediate section of the joint 2021/2023 which forms the full thickness butt weld.

Formation of the full thickness welds 2026 in FIG. 38 may be completed via any suitable conventional welding process in a manner known in art generally involving the use of a non-consumable electrode or consumable welding electrodes, wires, or rods to deposit or form weld material in the joints 2021 or 2023 via successive passes through the weld joints. With each pass of the welding electrode or rod, the weld material is fed into the joint and gradually built up in layers or beads to the final profile shown. The weld bevels shown includes a convexly shaped broad face or crown at one end and a narrow root at the base of the weld bevel. Non-limiting examples of weld processes that may be used include gas metal arc welding (GMAT), gas tungsten arc welding (GTAW), shield metal arc welding (SMAW), flux cored arc welding (FCAW), submerged arc welding (SAW), and others. These welding processes are well known in the art without undue elaboration.

Figure 39:
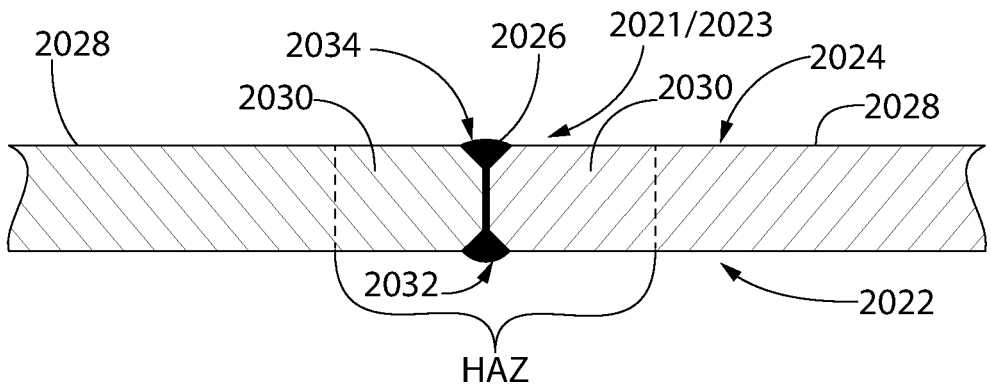
FIG. 39 is a cross-sectional view taken through line FIG. 37-FIG. 37 in FIG. 36 of a third type of full thickness butt weld used to form the shell.

According to another aspect of the invention, narrow joint or groove type welding techniques may also be used to minimize the extent of the HAZ in the base material of the shell 2028 adjacent the joint for mitigating initiation of SCC. FIG. 39 depicts a full or through thickness double sided submerged arc butt weld having a narrow profile groove. As seen, both the interior and exterior weld masses 2032, 2034 having weld bevels generally smaller than conventional double V-groove welds as shown in FIG. 37. The lateral width of the weld between the bevels is also narrower than the conventional double V-groove weld. The narrow weld profile of FIG. 39 results in a reduced width HAZ and concomitantly smaller tensile stress field which is beneficial for mitigating the onset of SCC.

Figure 40:
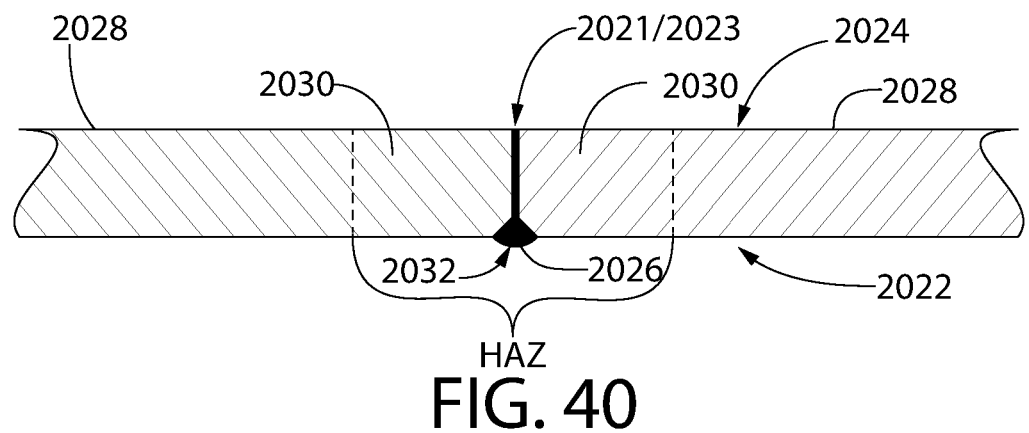
FIG. 40 is a cross-sectional view taken through line FIG. 37-FIG. 37 in FIG. 36 of a fourth type of full thickness butt weld used to form the shell.
Figure 41:
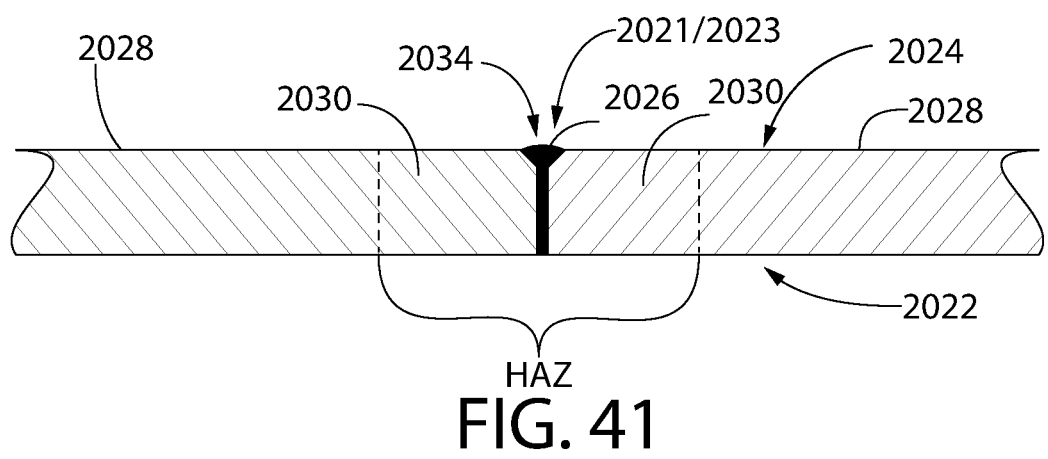
FIG. 41 is a cross-sectional view taken through line FIG. 37-FIG. 37 in FIG. 36 of a fifth type of full thickness butt weld used to form the shell.
Figure 42:
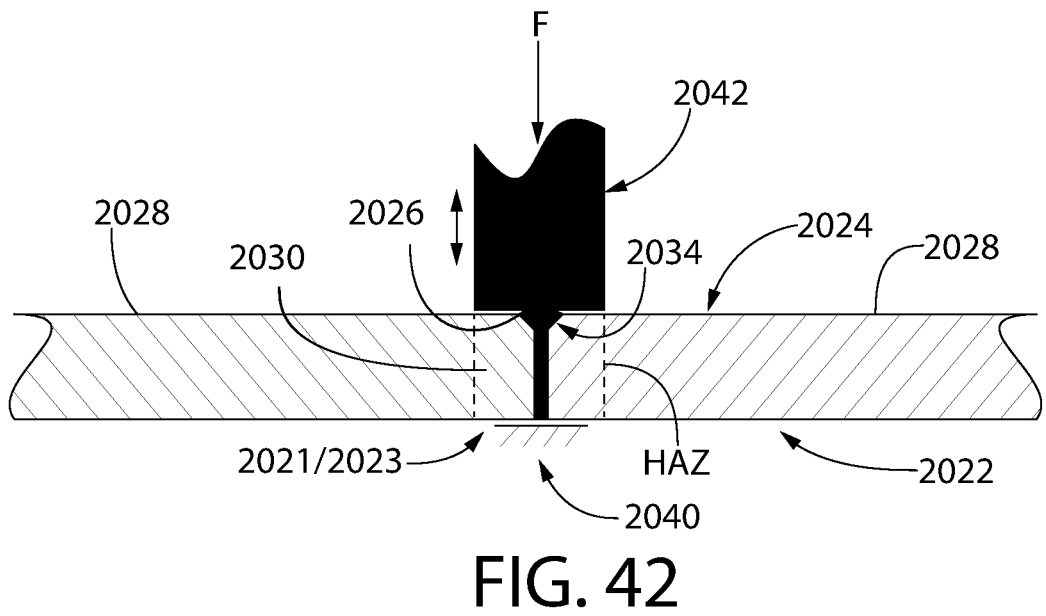
FIG. 42 is a cross-sectional view of the butt weld of FIG. 41 showing a mechanical weld compaction device used to compress the weld for a full thickness of the shell and flatten the crown of the weld.

FIG. 40 depicts another example of a full or through thickness hybrid laser weld having a narrow profile groove formed by the hybrid laser arc welding (HLAW) technique. Hybrid laser welding generally combines the use of a laser with GMAW or GTAW and is well known in the art without undue elaboration. This welding technique absolutely and advantageously minimizes the heat input imparted to the shell required to complete the butt weld. HLAW requires less than ¼th of the heat input required by the some non-laser welding processes noted above and produces a smaller crown on the inside (FIG. 40) or outside (FIG. 41) whose size can be adjusted by the weld wire feed rate. The result is an extremely narrow weld profile with greatly reduced HAZ in the canister shell base material. Forming the HLAW weld from inside of the canister shell 2028 which is the obverse of standard industry practice results in no significant crown on the exterior surface of the shell, as shown in FIG. 40. This is further advantageous for reducing the probability of SCC initiation at the exterior surface of the shell in the HAZ.

According to another aspect of the invention, a second measure to mitigate the onset of SCC at the exterior surface of the canister shell 2028 in the HAZ is full or through-thickness compaction (TTC). It will be recalled that the welding process creates a tensile stress field in the HAZ of the canister shell (which includes the weld mass), which is one of three conditions necessary for SCC initiation. In one embodiment, the process for fabricating a welded SNF canister 2020 comprises mechanically working the weld and HAZ to change the stress field in the weld and HAZ region from tensile to compressive for the full thickness T of the material using TTC. This process is referred to herein as "through-thickness compaction (TTC)." It is important to note that TTC contrasts to and is different from the effect of surface peening, which is only capable of inducing a compressive in-plane stress field in a 2 to 4 mm depth of the shell base material from the exterior surface 2024 of the canister shell 2028, but leaves a corresponding tensile stress field in the layer below to the interior surface 2022. Advantageously, the TTC process changes the stress field to compressive from the exterior surface 2024 of the shell 2028 to the interior surface 2022 for an added level of protection against SCC.

The TTC method or process generally comprises two steps or stages. First, shape the outer surface of the weld crown during the weld formation process, as guided by an elastic-plastic finite element analysis explained below to the optimal size. The extent of required crown is quite small; it should be based on the extent of flattening via TTC needed to induce at least 5%, but no more than 10%, maximum compressive strain in the weld mass and HAZ after TTC. Second, the use a mechanical compression or compaction process to flatten the crown rendering the top surface of the HAZ flush or coplanar with the adjacent exterior surface 2024 of the shell 2028. The term coplanar means that for a flat sheet or sheet of shell material, the crown would be lie in the same flat plane as the portions of the sheet(s) adjoining the weld. For a rolled or contoured shell, the crown would lie in the same cylindrical plane as the sheet(s) adjoining the weld.

Cold rolling or flattening the crown and adjoining HAZ by applying a targeted compressive force on it (see, e.g. FIG. 42), as the classic theory of plasticity teaches, will produce a compressive in-plane stress field in the weld mass and its adjacent heat affected zone. The compaction force F should preferably be of sufficient magnitude to convert the residual tensile stress field resulting from welding to a compressive stress for the full thickness T of the canister shell 2028. Accordingly, the in-plane stress field will be compressive across the entire thickness of the welded region (i.e. weld and HAZ) for the interior to exterior surface 2022, 2024.

Mechanically working the weld and HAZ via TTC can be performed using a variety of commercially available processes and machines. As one example, the compaction device may be a suitably sized "rolling mill" using rollers as a compaction member 2042 to apply the necessary compaction or compressing pressure or force F to the canister shell base material in the HAZ and weld for in-plane flattening. The interior side of the weld 2026 and HAZ inside the canister shell 2028 is supported via a rear support member 2040, which may be flat steel plate or other type structure in some embodiments. The weld and HAZ of the canister shell is compressed or compacted between the back support member 2040 and the compaction member 2042 in a squeezing type action. In other embodiments, TTC flattening may be performed by a suitable forging technique. For example, a hammer forge type machine may be used as the compaction device which comprises an axially reciprocating die or hammer for the compaction member 2042 to shape the weld crown by creating localized compressive forces in the weld and adjoining HAZ material. The hammer may be pneumatically driven to repetitiously strike the crown of the weld 2026 and adjoining HAZ with sufficient compaction force F for a predetermined period of time to flatten the weld crown in-plane with the canister shell outer surface 2024 and concomitantly create a full depth compressive stress field in the HAZ and weld. It is well within the ambit of those skilled in the art to select an appropriate mechanical compaction or compression machine and process parameters to achieve the foregoing desired results and end product weldment. It will be appreciated that required force F for TTC cannot be delivered via manual means (e.g. manually wielded hammers or similar methods).

The shell weldment resulting from TTC will exhibit a compressive stress field for the full thickness T of the shell in the weld and HAZ. Such a stress field condition could be verified by SEM (scanning electron microscope) or other metallurgical examination techniques used in the art. These examination techniques are capable of generally identifying the microstructure of the weld and HAZ material to disclose information about the types of processes used on the material during fabrication such as TTC.

Following the TTC treatment of the weld 2026 and adjoining HAZ of the shell base material, the top surface of the weld crown is flattened and rendered flush or coplanar with the adjacent portions of the exterior surface 2024 of the canister shell 2028. Notably, the top surface of the weld is coplanar with the exterior surface of the shell without the use of mechanical grinding, which is a technique commonly used in industry to eliminate the crowns of welds resulting in a flush outer surface. In some embodiment, the thickness T of the weld base material may actually be slightly smaller or thinner in thickness T at weld and HAZ location than adjacent portions of the shell 2028 due to the TTC process.

It bears noting that the TTC process may be performed when the shell sheet or sheets are either in a flat condition or a curved/contoured condition after rolling and bending. The former might be used if a shell segment includes more than one longitudinal weld joint.

Combining peening the welded region with TTC explained above after TTC can be used to further increase the compressive stresses in the top layer making the shell's exterior surface armor against salt air attack even stronger. The alleged drawback of surface peening, namely leaving an undesirable tensile stress field in the shell layers below 2-4 mm in depth will also be ameliorated because of the compressive pre-stress generated by the full "through-thickness compaction" before peening according to the TTC process disclosed herein.

Figure 43:
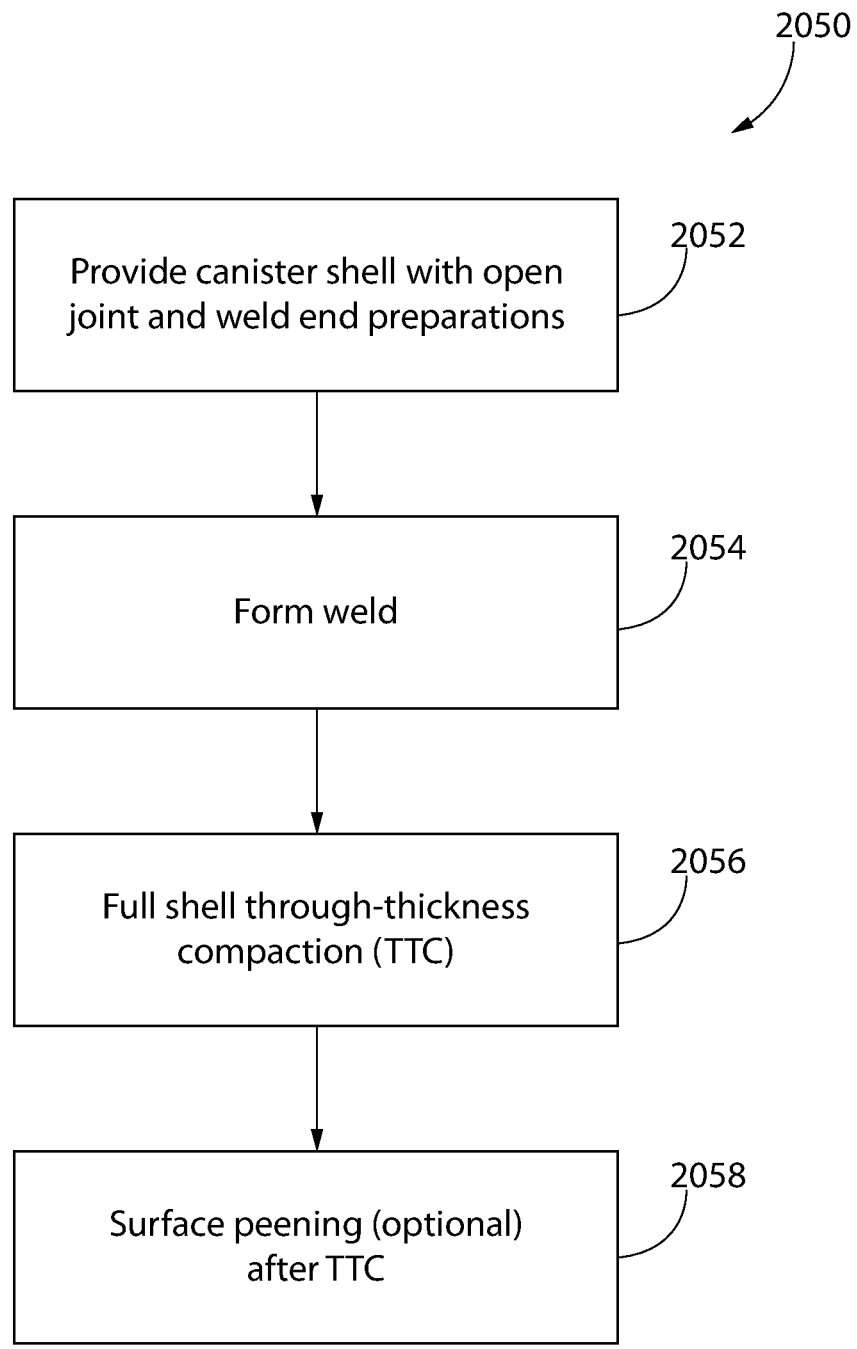
FIG. 43 is a flow chart showing steps in the process or method for fabricating the nuclear waste canister of FIG. 36.

FIG. 43 is a process flow chart summarizing the foregoing steps in fabricating a welded nuclear waste canister which is resistant to the onset of stress corrosion cracking (SCC). The process or method 2050 starts in step 2052 by providing a stainless steel shell 2026 having an open longitudinal joint 2021 or circumferential joint 2023 with shell weld end or edge 2030 preparations selected commensurate for the type of weld to be made. In one preferred but non-limiting embodiment, hybrid laser welding and end preparations may be used. In step 2054, the weld is formed as previously describe herein. In step 2056, through-thickness compaction (TTC) is performed. In a final optional step 2058, surface peening may be performed to add an additional layer of protection against SCC at the outer surface 2024 of the shell 2028 in the weld and HAZ.

IV. Inventive Concept 4

With reference to FIGS. 44-49, a fourth inventive concept will be described.

The process or method to protect the shell-type weldments from stress corrosion cracking (SCC) due to prolonged exposure to the halide bearing aqueous ambient environment according to the present disclosure is now further described. FIGS. 44-45 and 47-48 depict a cylinder shell-type welded assembly or "weldment" which may be formed using the SCC-inhibiting method disclosed herein.

Referring now to FIGS. 44-45 and 47-48, a shell weldment 3020 comprises a shell 3021 having a longitudinal axis LA which may be formed of one or more stacked and abutted welded shell segments 3022. In the non-limiting example shown, the shell 3021 may comprise a first segment 3022-1 and second segment 3022-2. Each segment is formed of an originally flat metal workpiece comprising a plate that has been rolled by a conventional mechanical rolling process into the cylindrical shape shown. Such mechanical rolling fabrication processes are well known in art without undue elaboration here. As a result of rolling formation, each segment 3022-1, 3022-2 comprises a single open longitudinal butt joint or seam 3024, which is then welded to structurally join the opposing adjacent paired longitudinal edges 3030 along the weld joint or seam together. This closes the seam and ultimately contributes to forming a hermetically sealed internal cavity 3023 of the shell.

Figure 44:
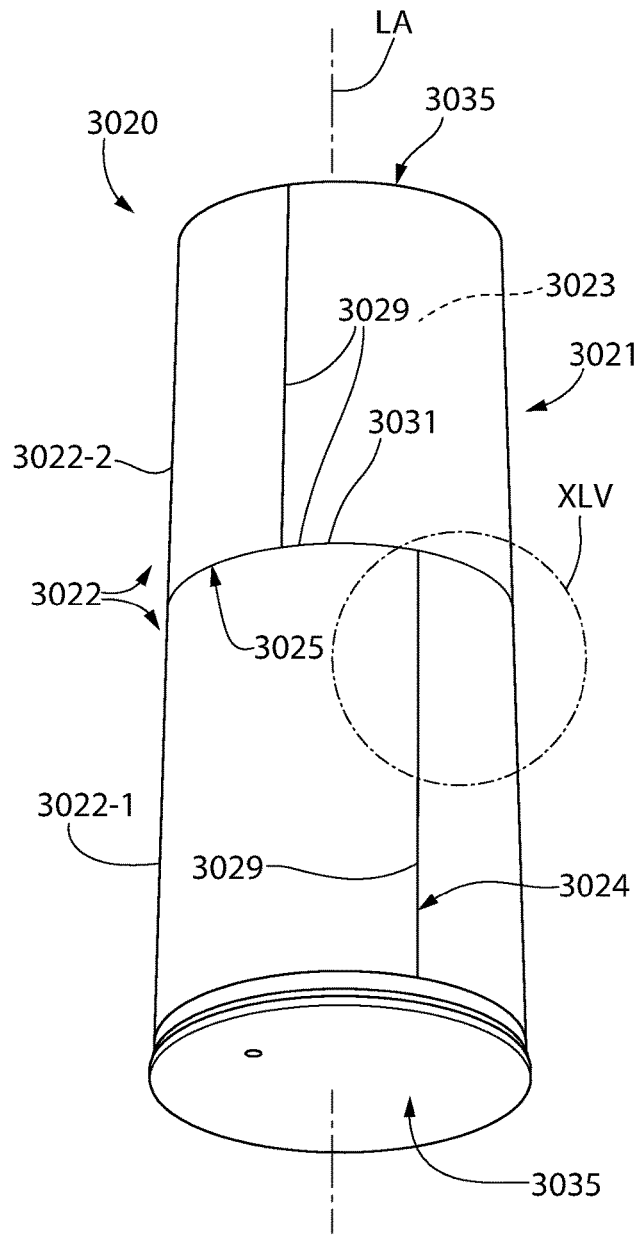
FIG. 44 is a perspective view of a rolled and welded cylindrical shell-type assembly or weldment in the form of a canister used for storing spent nuclear fuel and illustrating circumferential and longitudinal weld joints or seams.
Figure 45:
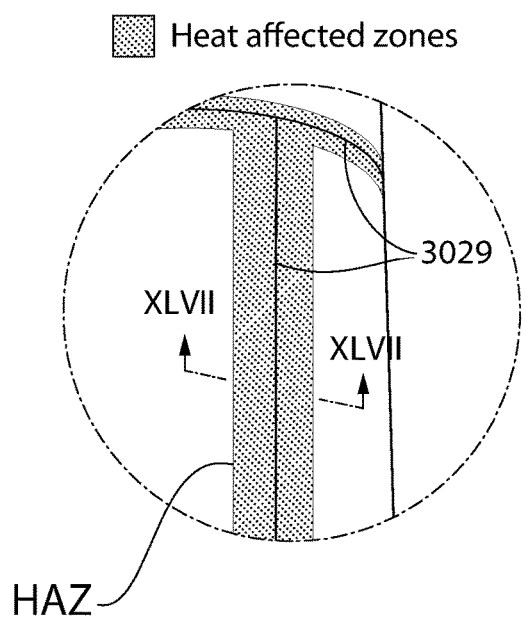
FIG. 45 is a close-up detail of a weld line taken from FIG. 44.
Figure 46:
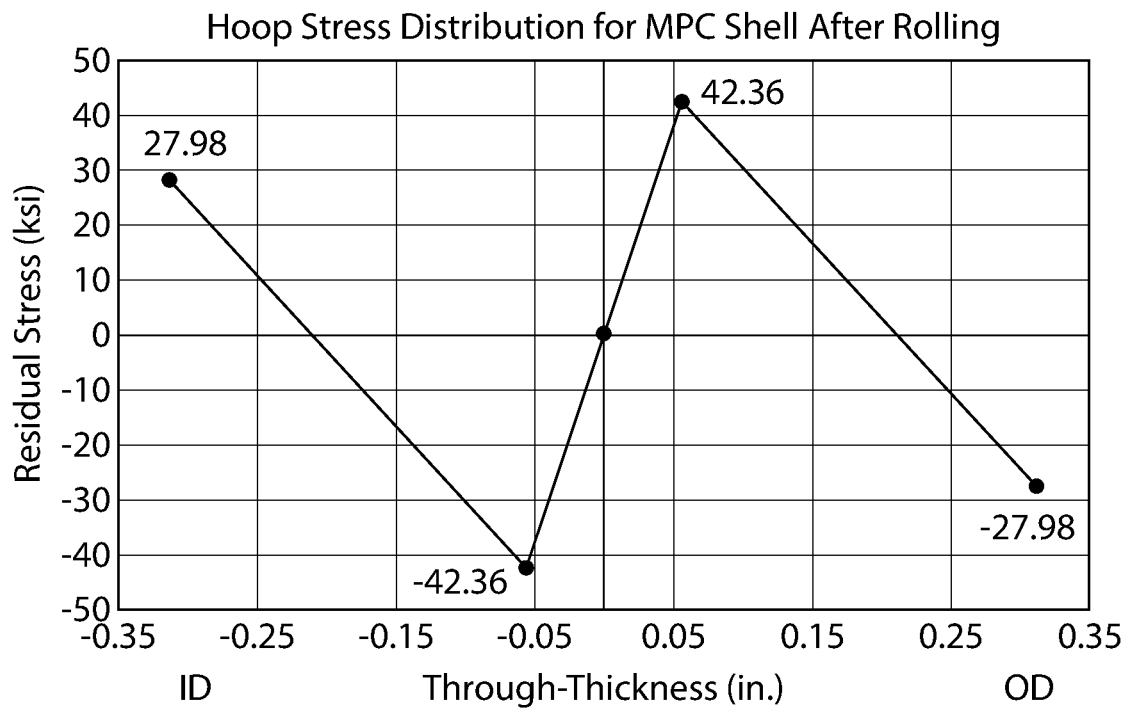
FIG. 46 is a graph showing typical residual stress distribution in the circumferential direction in the shell of the weldment subsequent to the mechanical rolling operation and prior to welding.

Shell segments 3022-1 and 3022-2 may be abutted in stacked end 3031 to end 3031 relationship to form a circumferential butt joint or seam 3025, which is then welded to form a weld 3029 and structurally join the two shell segments together, thereby collectively creating the entire shell weldment 3020. The circumferential welded seam 3025 is oriented perpendicularly to longitudinal axis LA. The circumferential welded seam 3025 between the segments 3022-1, 3022-2 may follow a straight arcuate and circular path (versus undulating) such that the ends 3031 of the shell segments share a common reference plane. The longitudinal welded seams 3024 may be linear and parallel to longitudinal axis LA as shown in FIG. 44.

Figure 47:
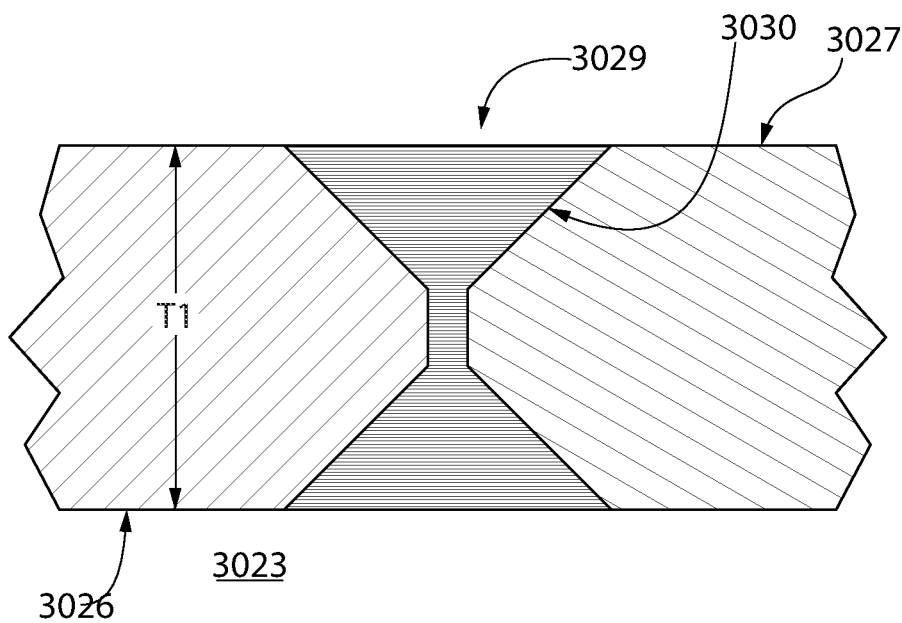
FIG. 47 is a transverse cross section through the full penetration depth weld of the weldment taken from FIG. 45.

The circumferential and longitudinal welds 3029 may each be full penetration or thickness welds having a transverse configuration or profile as shown in FIG. 47. This figure shows a transverse cross section through one of the welded longitudinal seams 3024, but is representative of the same transverse profile of the welded circumferential seam 3025 between the segments 3022-1, 3022-2. Each weld 3029 extends for the full thickness T1 of the shell segment base material from an interior surface 3026 to an exterior surface 3027 of the shell(s).

In one embodiment, the weld may be a double-V groove weld having the double-sided V-groove and weld profile shown in FIG. 47. This figure shows conventional double-V groove weld end preparations of the shell workpiece material for forming double-V welds having a corresponding double-V joint profile. Double-V groove welds typically require less weld filler material are generally preferred when the weld joint is accessible for welding from both sides of the shell (i.e. inside and outside) in contrast to a single-V joint welds. In addition, double-V welds may have concomitantly reduced residual stresses and longitudinal shrinkage; the former of which is advantageous to minimize exposure to SCC. Other type welds and weld profiles, however, may be used in other situations and embodiments.

In one embodiment, each shell segment 3022-1, 3022-2 may preferably be formed of a corrosion resistant metal particularly when used to form a spent nuclear fuel storage canister. The metal preferably may be stainless steel, and more preferably an austenitic stainless steel in one non-limiting example. The shell segments may have any suitable thickness T1 depending on the structural requirements for the vessel.

It bears noting that each longitudinal or circumferential weld is actually formed by multiple "passes" or "runs" by the welder (manual or automated welding machine); each of which deposits weld metal (i.e. weld bead) into the double-V groove joint to successively build the weld to the final shape and configuration shown in FIG. 47. The root pass or run is the first run or pass on the still open joint to deposit the initial weld bead in the inner-most portion of the groove. The root pass provides a base for subsequent filler passes to radially build out the complete double-V weld. Accordingly, each weld 3029 is collectively formed of a plurality of weld beads of weld filler metal, which is a well-known fact and concept in the art.

The completed shell weldment 3020 may further comprise an end plate 3035 on each end of the shell 3021 to completely enclose the internal cavity 3023 once the spent nuclear fuel has been emplaced in the shell. The top end plate 3035 may be a final cover plate sealed after emplacement of fuel in the shell canister. Each end plate 3035 may be welded to the shell via a suitable weld, which may be a fillet type weld in one embodiment or other. These end plate welds may optionally be subjected to the same peening operations described herein for the circumferential weld seam 3025 between the two shell segments 3022-1, 3022-2 and longitudinal weld seams 3024 of each segment, as further described herein.

The most vulnerable region in the shell weldment to SCC is the weld line and the contiguous adjoining metal mass of the shell known as the "heat affected zone" or HAZ, collectively referred to herein as the "SCC susceptible strip" or "SSS", or alternatively simply the weld zone. The fabrication method or process for forming the shell weldment 3020 presented herein to increase the resistance of this ambient-exposed SSS to SCC generally comprises of a judicious use three manufacturing/fabrication operations performed in proper sequence in one embodiment; namely: (1) Workpiece Rolling; (2) Welding; (3) Hard Rolling Weldment; and (4) Peening. Each operation is further described below in sequence.

Rolling: The manufacturing of the shell weldment 3020 begins with mechanically rolling the stainless steel workpiece plate to form the cylindrical shape of the first or second shell segment 3022-1, 3022-2. Preferably, cold rolling may be used if possible to provide exacting dimensions of the segments versus hot rolling. Rolling, as noted above, produces a compressive surface stress at the exterior surface 3027 of the shell 3021, which is an antidote to SCC. When the workpiece plate stock is first rolled into the cylinder, the entire external surface of the curved shell develops a compressive stress field that protects it against SCC.

Welding: Welding, in contrast to rolling, generally produces tensile stress in the SSS across the entire thickness of the weld mass due to weld shrinkage, with the highest values reached at the outer or exterior surfaces 3027 of the shell most susceptible to SSC given the proper ambient conditions. Unfortunately, this counteracts the benefit of initially shaping the shell 3021 by rolling as described above. While the tensile stress produced by welding cannot be entirely eliminated, it can be significantly mitigated by utilizing the bevel detail presented in FIG. 47 (or similar), carefully controlling the heat input, and preferably welding the outside/exterior weld 3029 bevel first proximate to exterior surface 3027, then followed by welding the inside weld 3029 bevel proximate to interior surface 3026 of the shell. Accordingly, the exterior weld bevel may be completely formed prior to forming the interior weld bevel of the double-V butt weld to decrease the tensile stress field on the exterior of the shell 3021 at the weld lines. This approach is contrary to the conventional wisdom and preferred manner in the art of forming double-V welds, which is to gradually build the weld radially outward from the deepest part or root of the weld joint uniformly from each side to prevent distortion of the workpiece. The conventional approach, however, is not beneficial for preventing SCC since creation of tensile stress on the outer or exterior surface of a shell most susceptible to SCC is not minimized to the greatest extent possible.

Any suitable welding process may be used for welding the longitudinal and circumferential seams. One non-limiting example of a suitable method is the submerged arc welding (SAW) process. Other welding processes may be used however to form the double-V groove butt welds in other instances such as without limitation shielded metal arc welding (SMAW), gas tungsten arc welding (GTAW), gas metal arc welding (GMAW), or others. The welding process used is not limiting of the invention.

Additional treatment, however, is still preferably desired to render the surface stresses compressive in the SSS ("SSC susceptible strip") after welding, as now further described below.

Hard Rolling of the Cylindrical Weldment: One advantageous ameliorative step to mitigate SSC is to next mechanically hard roll (i.e. cold roll) the entire shell 3021 again including along the SSS (i.e. weld line and adjoining HAZs) after welding the shell weldment 3020. In some embodiments, at least the SSS is hard rolled if not the entire shell. Hard rolling is a process of applying high compressive surface pressure via a mechanical roller such that the nominal contact stress at the roller-to-shell interface is in the plastic range of the base shell material. This has the effect of inducing a superficial compressive stress on the rolled shell surfaces at the SSS.

Figure 48:
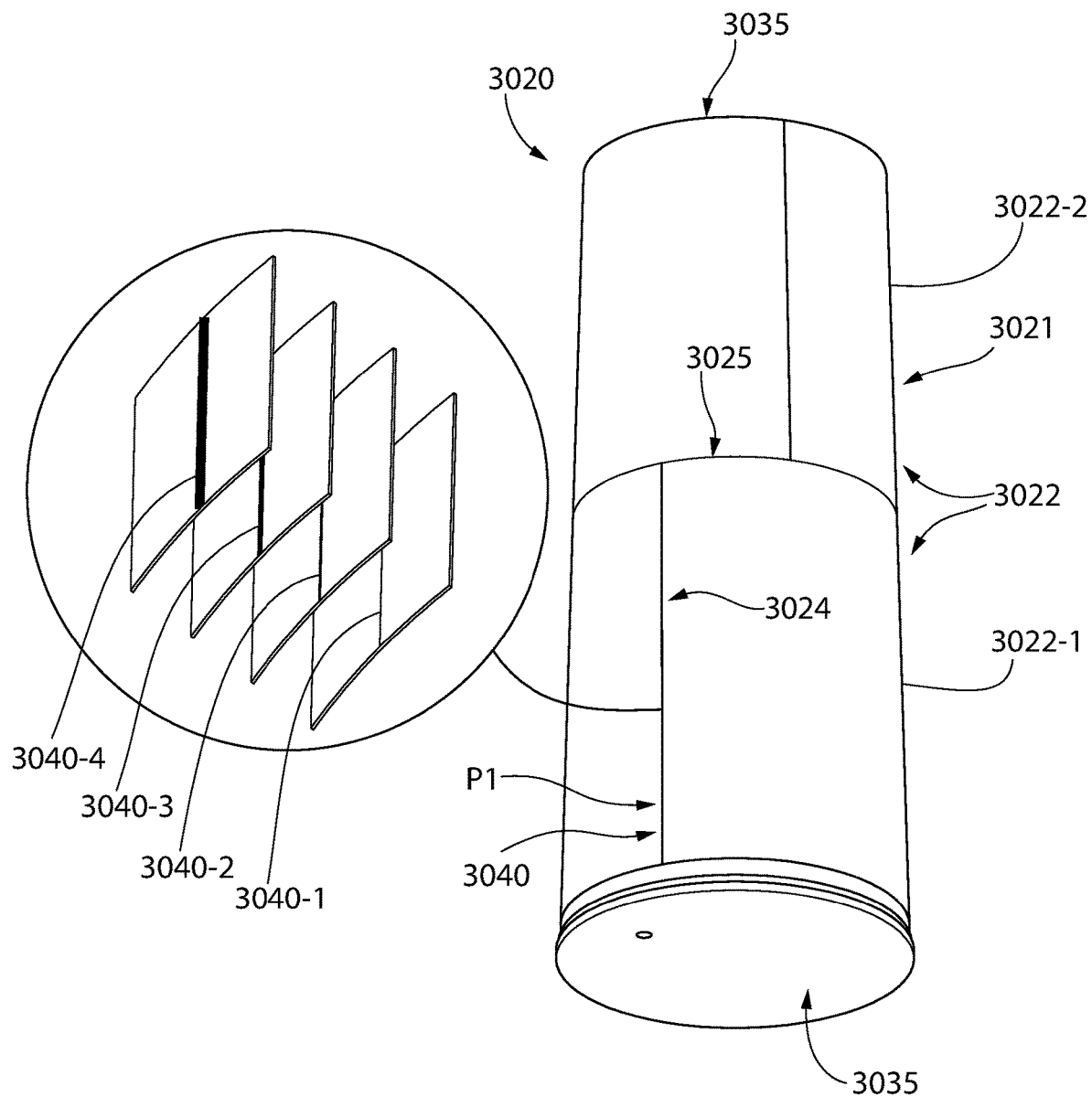
FIG. 48 is a perspective view showing a peening process used in the formation of the shell weldment of FIG. 44 which employs peening passes on the welds and respective heat affected zones (HAZs)

Peening: Surface peening P1 illustrated in FIG. 48 is preferably next applied after the foregoing initial rolling, welding, and second hard rolling operations have been completed. Peening is, in essence, a controlled bombardment of a metal surface with micro-impingements to develop a compressive state of stress on the surface and in its immediate vicinity. Several techniques of micro-impinging a target surface are in use in the industry, including mechanical, hydrodynamic, and laser peening methods. While the actual method of energy delivery to the target surface by each peening method varies, the underlying mechanics is the same. The concentrated localized force on the impacted or peened surface causes it to deform, thereby creating a compressive planar stress field due to the classical Poisson effect. The effectiveness of the method relies on the manner in which the Poisson stresses from successive local depressions interact with each other. The overlap between the successive impinged depressions, the magnitude of the impact energy, and the number of peening passes are critical parameters that are crucial in determining the depth and planar uniformity of the compressive stress field developed. Computer Code LS-DYNA has been invaluable in helping identify the above parameters to yield best results.

The most important requirement demanded of the peening process is that it will impart a deep layer of compressive stress in the most vulnerable region which is the welded region of the shell 3021 where the weld and adjoining HAZ lies. This can be achieved by repeating the peening on the welded region in multiple passes. However, it bears noting that peening or hammering the weld strip (weld and HAZ) has the perverse effect of generating a tensile stress on the surface of the shell adjacent to the peened area (also observed in LS-DYNA simulations).

To deal with this problem, it is proposed to successively and progressively widen the peening strip or region using subsequent passes, as shown in FIG. 48, such that the outer edges of peened region 3040 (where tensile stress will develop in the shell) is progressively pushed farther outwards and away from the SSS (SSC susceptible strip). Because the peening process targets the SSS associated with only the weld seams 3024, 3025, the peened region 3040 may resemble a somewhat narrow strip or band in shape confined to the general vicinity of the longitudinal and circumferential shell welds. If the multi-pass peening is adroitly applied (guided by LS-DYNA simulations), then it is possible to move the location of tensile stress well outside the SSS, and in the case of the circumferential weld seam 3025, make its magnitude small enough to be overshadowed by the compressive stress installed or imparted to the shell by the hard rolling operation performed immediately before the peening operation. In the longitudinal weld seam 3024 direction, the residual compressive stress created by hard rolling is less significant; therefore, the control of the heat input during welding and use of progressively wider peening strips 3040-1, 3040-2, 3040-3, and 3040-4 as illustrated are even more critical to the prevention of SCC.

It bears noting that in FIG. 48, the first peening pass is configured and designed to create the narrowest peened region 3040-1 in the SSS region. Subsequent peening passes are each selected to create progressively widen the peened regions 3040-2 to 3040-4, with the latter creating the widest peened region 3040-4 having edges at the interface between un-peened and peened areas of the shell (where the tensile stress will develop) located sufficiently distal to the weld and HAZ to prevent the onset of SCC associated at the weld seams.

In the illustrated embodiment, four peening passes are discloses which is not limiting of the number of peening passes that be used to create the peened regions 3040 along the weld lines. Other embodiments may thus use more or less peening passes.

The beneficial end result of the peening process is that the SSS most susceptible to the onset of SCC has now been converted from a tensile to a compressive stress field which resists SSC, while the portions of the shell base material proximate and adjacent to the final peened strip or region 3040-4 far removed from the SSS has a relatively narrow residual tensile stress field.

Thus, in summary, multi-step rolling in conjunction with multi step peening operations as presented herein advantageously ensures that the SSS (SSC susceptible strip comprising the weld and its adjoining HAZ) and the remainder of the shell is devoid of residual tensile surface stresses.

In one non-limiting example of a shell weldment 3020 which may form a spent nuclear fuel canister, the thickness T1 of the shell 3021 may typically be about ½ to ⅝ inches. The weld bevels used on the interior and exterior of the double-V welds 3029 may be about 37.5 degrees (nominal). The weld bevels may have a depth of about ⅛ to 3/16 inches. Other weld bevel angles, bevel dimensions, and shell thicknesses T1 may be used and is not limiting of the invention.

Figure 49:
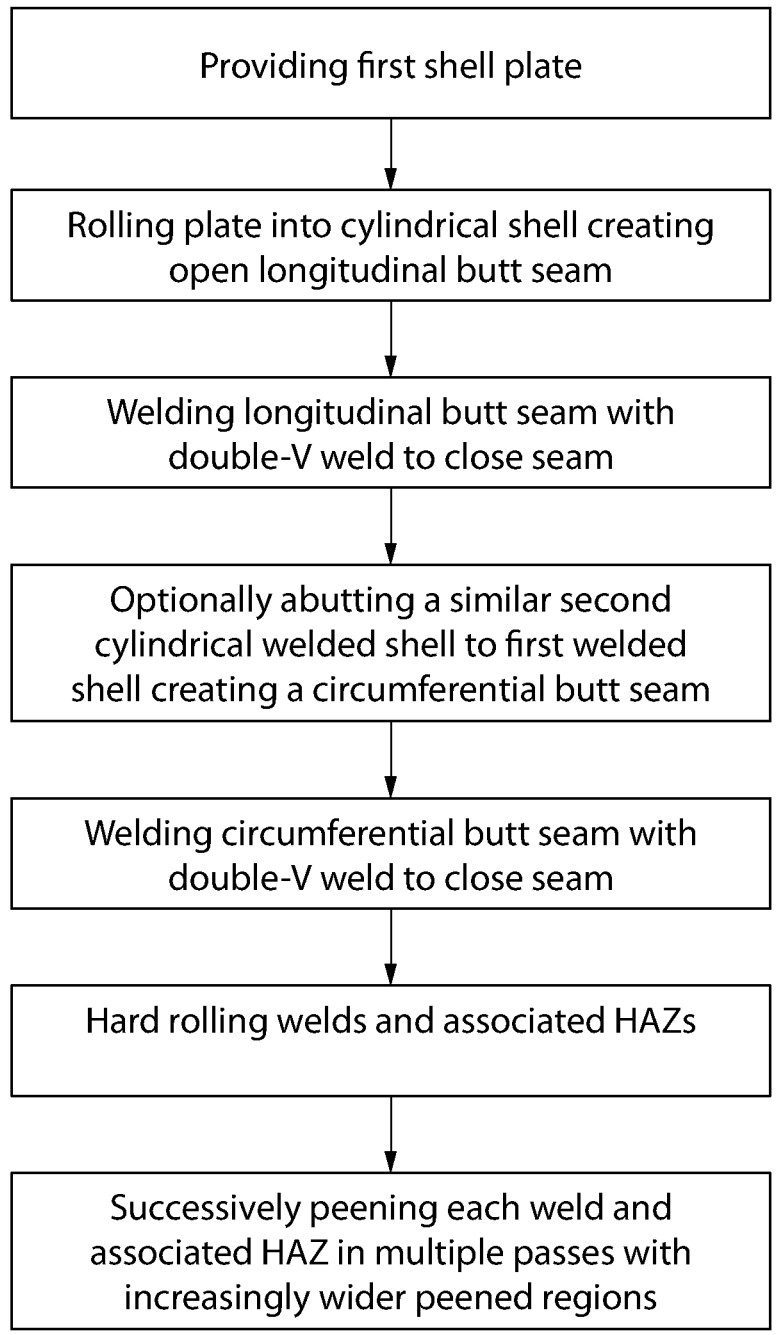
FIG. 49 is a flow chart showing an exemplary process or method for forming a cylindrical shell-type weldment according to the present disclosure.

FIG. 49 is a flow chart summarizing the steps of the foregoing method or process of forming a shell weldment 3020. This figure assumes, as a non-limiting example, that the weldment is formed by two longitudinally-abutted shell segments 3022-1, 3022-2 each comprising a longitudinal welded seam 3024. Other examples may include a third or more shell segments, or optionally may only include a single shell segment depending on the length of the vessel required and size-based fabrication limitations of the particular mechanical rolling machines used for initially forming the cylindrical shell shapes from flat plate stock.

The first step is providing the first shell plate in the form of a flat plate stock of metal such as austenitic stainless steel. Next, the flat plate is rolled into a cylindrical shape which creates an open longitudinal butt seam along the abutted side or lateral edges of the plate. If not already having the desired double-V weld edge preparation, such an edge preparation is formed creating the double-V joint profile shown in FIG. 47. Next, a double-V weld is formed in the seam by preferably forming the exterior weld bevel first completely, following by forming the interior weld bevel completely. This reduces the residual tensile stresses creating by welding at the exterior surface 3027 of the weld most susceptible to SCC. The first welded shell segment 3022-1 is now created.

Next, a similarly formed second cylindrical welded shell segment 3022-2 is axially butted end-to-end to first welded shell segment 3022-1 if a second segment is required. This creates a circumferential butt seam between the two end of the shell segments 3022-1, 3022-2. If not already having the desired double-V weld end preparation, such an end preparation is formed creating the double-V joint profile shown in FIG. 47. Welding the circumferential butt seam with double-V weld to close seam is the next step to join the two shell segments together.

Now that all welds (longitudinal and circumferential) have been formed, the process continues with hard rolling entire shell including all longitudinal and circumferential welds and their respective HAZs. This partially converts the residual tensile stresses created by welding particularly at the exterior surface of the shell 3021 into compressive stresses less susceptible to the onset of SCC. Next, each weld and associated HAZ are successively peened in multiple passes with increasingly and progressively wider peened regions 3040-1, 3040-2, 3040-3, and 3040-4. This advantageously further increases the compressive stress field on the exterior surface 3027 of the shell 3021 at the welds 3029 and HAZs (i.e. SSS region or weld zones), in addition to moving any residual tensile stresses in the shell adjacent to the final peened region 3040-4 farther away from the weld lines.

The end result of the foregoing shell weldment fabrication process is a vessel with residual substantially compressive stress fields at its exterior surface 3027, particularly along the weld lines and HAZs (i.e. SSS). Such a vessel fabricated in this manner therefore lacks the needed condition of an exterior tensile stress field along the weld lines, which is one of the required conditions for SCC to initiate in the SSS.

It bears noting that the initial shell rolling, welding, hard rolling, and peening operations of the foregoing shell fabrication process are preferably performed in the sequence described above to optimize the creation of residual compressive stresses in the shell weldment 3020 for SCC resistance.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A method for fabricating a canister system for dry storage of nuclear waste materials, the method comprising:
   providing a tubular first shell having a circumferentially-extending first end, a circumferentially-extending second end, and cavity extending between the first and second ends for storing nuclear waste materials, and a first base plate having an upturned annular flange defining a circumferential edge;
   abutting the circumferential edge of the annular flange against the first end of the first shell to form a butt joint;
   welding the circumferential edge to the first end of the first shell with a circumferentially-extending full thickness butt weld which extends completely through the butt joint in a radial direction from an exterior to an interior of the first shell to form a hermetic seal;
   welding an annular peripheral edge of a first lid to the second end of the first shell to form a hermetic seal; and
   welding an annular outer shell skirt to an exterior surface of the first shell, the outer shell skirt extending around an entire circumference of a lower portion of the first shell and covering the butt weld.

2. The method according to claim 1, wherein the circumferential edge of the upturned annular flange and butt joint are substantially flush in position with a top surface of the first base plate.

3. The method according to claim 2, wherein the first base plate comprises a circumferentially-extending upwardly concave surface depression formed in the top surface of the first base plate between the first base plate and the upturned annular closure flange.

4. The method according to claim 3, wherein the surface depression is located adjacent to the upturned annular flange and the butt joint which allows the butt joint to be located close to a horizontal plane defined by the top surface of the first base plate.

5. The method according to claim 4, further comprising a step of welding an annular outer shell skirt to an exterior surface of the first shell, the outer shell skirt extending around an entire circumference of a lower portion of the first shell and covering the butt weld.

6. The method according to claim 5, wherein the outer shell skirt has a height less than a full height of the first shell.

7. The method according to claim 6, wherein the outer shell skirt is welded to the first baseplate.

8. The method according to claim 7, further comprising forming a plurality of circumferentially spaced apart plug welds through the outer shell to secure the outer shell skirt to the first base plate.

9. The method according to claim 1, wherein the outer shell skirt has a height less than a full height of the first shell.

10. The method according to claim 9, wherein the outer shell skirt has a height less than or equal to half of the full height of the first shell.

11. The method according to claim 10, wherein the step of welding the outer shell skirt to the exterior surface of the first shell includes:
    forming a circumferential fillet weld between a top end of the outer shell skirt and the first shell to seal the top end of the shell skirt to the first shell; and
    forming a circumferential fillet weld between a bottom end of the outer shell skirt and the first shell to seal the bottom end of the shell skirt to the first shell.

12. The method according to claim 11, wherein the step of welding the outer shell skirt to the exterior surface of the first shell further includes forming a plurality of circumferentially spaced apart plug welds through the outer shell to secure the outer shell skirt to the first base plate.

13. The method according to claim 12, wherein the first base plate has a greater material thickness than the first shell.

14. The method according to claim 2, wherein the first base plate has a greater material thickness than the first shell.

* * * * *